US 8,730,219 B2

(12) United States Patent
Kohtoku

(10) Patent No.: US 8,730,219 B2
(45) Date of Patent: May 20, 2014

(54) DISPLAY DEVICE

(75) Inventor: Yukihide Kohtoku, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 218 days.

(21) Appl. No.: 13/504,597

(22) PCT Filed: Sep. 29, 2010

(86) PCT No.: PCT/JP2010/066921
§ 371 (c)(1),
(2), (4) Date: Apr. 27, 2012

(87) PCT Pub. No.: WO2011/052331
PCT Pub. Date: May 5, 2011

(65) Prior Publication Data
US 2012/0212467 A1 Aug. 23, 2012

(30) Foreign Application Priority Data

Oct. 30, 2009 (JP) ................................. 2009-250157

(51) Int. Cl.
*G06F 3/038* (2013.01)
(52) U.S. Cl.
USPC .......................................... 345/207; 345/204
(58) Field of Classification Search
USPC ................................... 345/76, 102, 204, 207
See application file for complete search history.

(56) References Cited

U.S. PATENT DOCUMENTS

| | | | | |
|---|---|---|---|---|
| 2005/0117813 | A1* | 6/2005 | Nishida et al. | 382/275 |
| 2006/0262054 | A1* | 11/2006 | Yamazaki et al. | 345/77 |
| 2009/0033645 | A1* | 2/2009 | Araya | 345/205 |
| 2009/0102823 | A1* | 4/2009 | Tateuchi | 345/204 |
| 2009/0231313 | A1* | 9/2009 | Teranishi et al. | 345/207 |
| 2009/0243993 | A1 | 10/2009 | Kuga | |
| 2009/0278766 | A1 | 11/2009 | Sako et al. | |

FOREIGN PATENT DOCUMENTS

| | | |
|---|---|---|
| JP | 2000-098991 A | 4/2000 |
| JP | 2005-121997 A | 5/2005 |
| JP | 2007-052105 A | 3/2007 |
| JP | 2007-101618 A | 4/2007 |
| JP | 2008-083290 A | 4/2008 |
| JP | 2008-146495 A | 6/2008 |
| JP | 2008-233379 A | 10/2008 |
| JP | 2008-292891 A | 12/2008 |
| JP | 2008-309967 A | 12/2008 |
| WO | 2008/050402 A1 | 5/2008 |

OTHER PUBLICATIONS

Official Communication issued in International Patent Application No. PCT/JP2010/066921, mailed on Nov. 9, 2010.

* cited by examiner

*Primary Examiner* — Viet Pham
(74) *Attorney, Agent, or Firm* — Keating & Bennett, LLP

(57) ABSTRACT

A display device (liquid crystal display device 100) includes a display panel (10) (liquid crystal panel 10), light receiving sensors (first light receiving sensors 122), and an image changing section (250). A display region (10a) of the liquid crystal panel (10) has a plurality of pixels (30) located therein. The first light receiving sensors (122) receive external light directed to the liquid crystal panel (10), at a plurality of positions in the display region (10a). In the image changing section (250), a reference value is predefined for light receiving information (a1 through d1) obtained by the first light receiving sensors (122). When light receiving information (a1 through d1) exceeding the reference value is obtained by the first light receiving sensors (122), the image changing section (250) changes an image to be displayed on the display region (10a), based on the light receiving information (a1 through d1).

9 Claims, 55 Drawing Sheets

DISPLAY DEVICE

TECHNICAL FIELD

The present invention relates to a display device, and specifically to a liquid crystal display device.

BACKGROUND ART

Display devices include, for example, liquid crystal display devices (LCD devices), organic electro-luminescence (OEL) display devices, plasma display panels (PDPs) and the like. A liquid crystal display device includes, for example, a liquid crystal panel including a pair of substrates which are combined together to face each other, and a backlight unit located so as to face a rear surface of the liquid crystal panel. The liquid crystal panel includes a liquid crystal layer between the pair of substrates, and can control the light transmissivity by controlling the voltage to be applied between the pair of substrates. The liquid crystal display device displays an image in a display region of the liquid crystal panel by irradiating the display region with light emitted from an illumination section located in the backlight unit while controlling the form of the liquid crystal layer of the liquid crystal panel. When the display region of such a liquid crystal display device is irradiated with external light, the external light is reflected by a surface of the liquid crystal panel, which may decrease the contrast of the displayed image. Herein, the term "external light" means light emitted by an other element than a display device (encompassing a liquid crystal display device). In the case where, for example, a liquid crystal display device is located in a room, light from an illumination device located in the room and light from outside the room are both "external light".

Patent Document 1 discloses a method for controlling the backlight unit. According to this method, a plurality of optical sensors are attached to a plurality of different positions in a peripheral portion on a front surface side (display surface side) of a liquid crystal display device, and light receiving information obtained by the optical sensors is subjected to comparative computation. Based on the comparative computation result, the backlight unit is controlled. As can be seen, according to the method disclosed in this publication, the contrast of the displayed image is adjusted based on the brightness of external light in the peripheral portion of the display region.

With a liquid crystal display device disclosed in Patent Document 2, a plurality of optical sensors are located in the display region to sense the distribution of external light in the display region. This liquid crystal display device controls the voltage to be applied to the liquid crystal layer of the liquid crystal panel based on the distribution of the external light in the display region, and adjusts the light transmittance of the liquid crystal layer area by area. As can be seen, the liquid crystal display device disclosed in this publication adjusts the contrast of the displayed image by adjusting the light transmittance of the liquid crystal layer.

Although not disclosing a method for adjusting the contrast of a displayed image, Patent Document 3 discloses a display control system including a management section for managing the display region. The management section of this display control system manages an unoccupied part of the image screen. When, for example, one image is displayed on the display region, the management section performs processing such as enlargement/reduction, movement or the like on another image, such that the another image is displayed in the unoccupied part of the display region where no image is displayed. In this manner, the display control system displays a plurality of images on one image screen at the same time.

CITATION LIST

Patent Document

Patent Document 1: Japanese Patent Laid-Open Publication No. 2005-121997
Patent Document 2: Japanese Patent Laid-Open Publication No. 2008-233379
Patent Document 3: Japanese Patent Laid-Open Publication No. 2008-146495

SUMMARY OF THE INVENTION

Technical Problem

For an application like a TV receiver or the like, a large display device having a side longer than 1 meter may be produced. With such a large display device, the brightness of external light directed to the display region is liable to differ part by part. When, for example, such a liquid crystal display device is located indoors, the brightness of the external light directed to the display region is different between a part irradiated with illumination light in the room or light coming through a window and a part not irradiated with such light. In such a case, a part of the image displayed on the display region becomes difficult to see, and the viewer may feel stressed when viewing the displayed image. Especially in the case of a display device installed outdoors, how the display region is irradiated with light differs part by part in accordance with the time zone, weather or the like. For this reason, such a problem is liable to occur.

The present invention, made in light of such a problem, has an object of providing a liquid crystal display device which, when the displayed image is made difficult to see by external light directed to the display region, alleviates the stress felt by the viewer.

Solution to the Problem

A display device according to the present invention includes a display panel, light receiving sensors, and an image changing section. A display region of the display panel has a plurality of pixels located therein. The light receiving sensors receive external light directed to the display panel, at a plurality of positions in the display region. In the image changing section, a reference value is predefined for light receiving information obtained by the light receiving sensors. When light receiving information exceeding the reference value is obtained by the light receiving sensors, the image changing section changes an image to be displayed on the display region, based on the light receiving information.

Therefore, when external light of a high intensity exceeding a predefined reference value is directed to the display region, for example, the image to be displayed on the display region can be changed, such that an image easy to see is provided to the viewer. In this manner, when external light of a high intensity exceeding a predefined reference value is directed to the display region, the image to be displayed on the display region can be optionally changed to an image easy to see. Owing to this, the stress felt by the viewer when he/she tries to recognize the image difficult to see can be alleviated. In addition, erroneous recognition of the content of the displayed image by the viewer can be prevented. This display device is especially preferably usable for, for example, an information display located outdoors, the display region of which is liable to be irradiated with external light having a high intensity and is viewed only for a short time duration.

DESCRIPTION OF EMBODIMENTS

Figure 1:
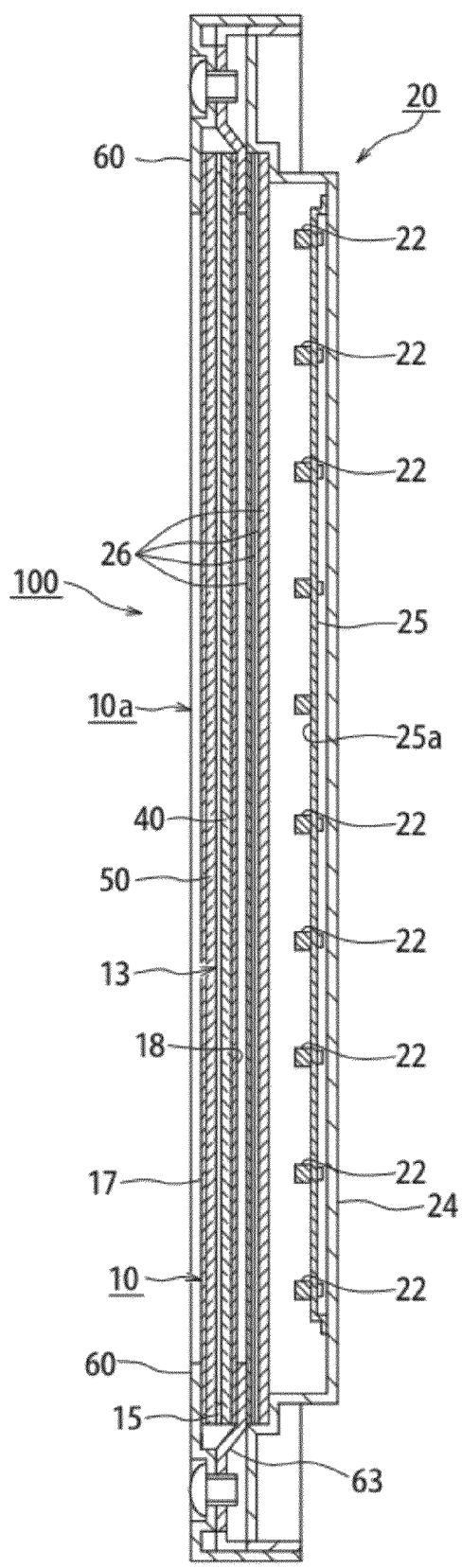
FIG. 1 is a cross-sectional view of a liquid crystal display device according to an embodiment of the present invention.

Hereinafter, a liquid crystal display device 100 will be described as an example of display device according to one embodiment of the present invention. The figures are provided for easier understanding of the present invention and embodiments thereof. Therefore, the sizes in the figures do not reflect the sizes of actual products embodying the present invention. The figures, even illustrating the same embodiment, do not necessarily match each other. Elements having the same functions bear the same reference characters for the sake of convenience of explanation.

EXAMPLE 1

Figure 2:
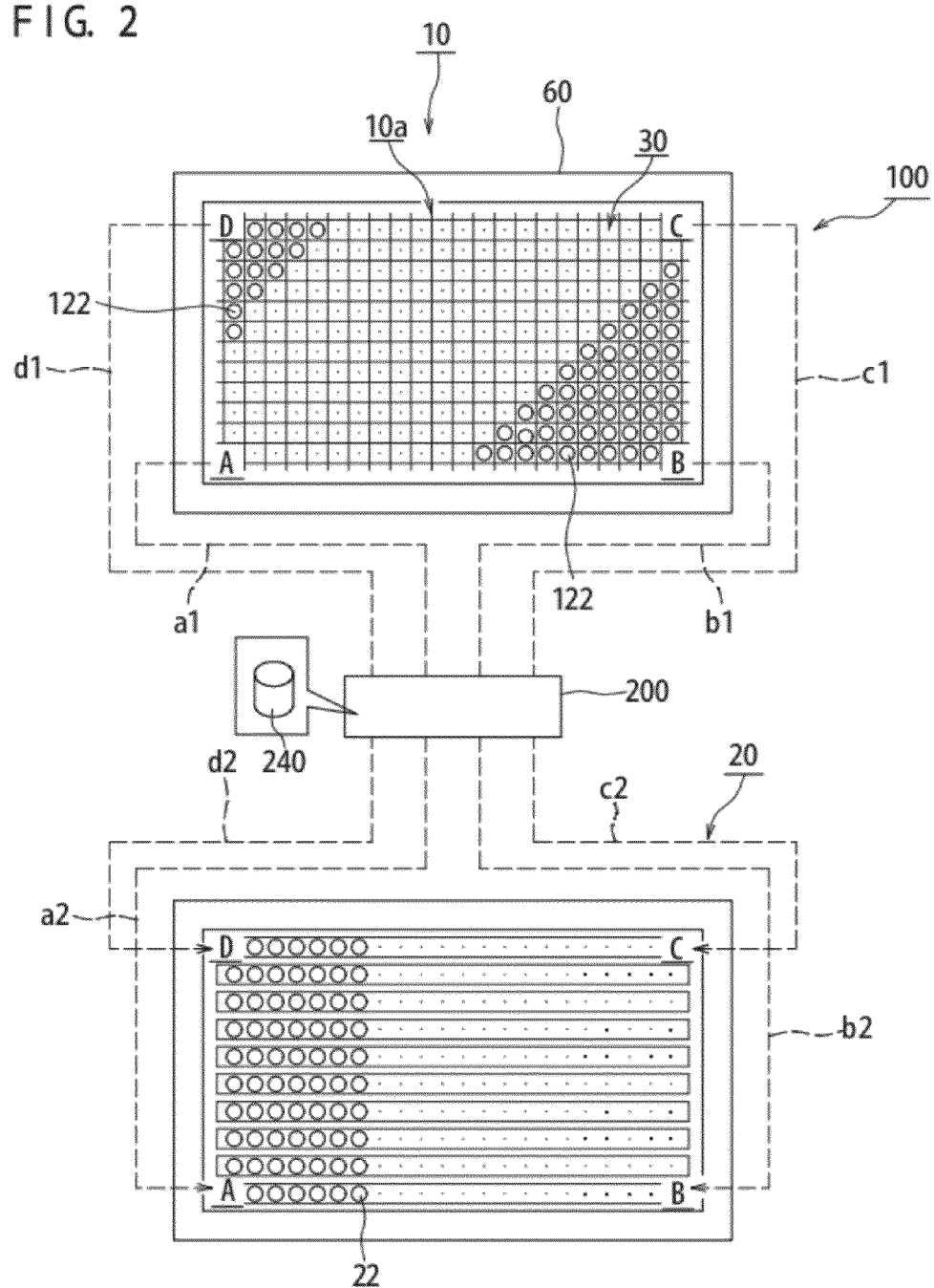
FIG. 2 is a block diagram schematically showing a liquid crystal display device according to an embodiment of the present invention.

FIG. 1 is a vertical cross-sectional view of the liquid crystal display device 100 according to one embodiment of the present invention. FIG. 2 is a block diagram schematically showing a structure of the liquid crystal display device 100. In FIG. 2, a liquid crystal panel 10 and a backlight unit 20 are shown separately for the sake of explanation.

As shown in FIG. 1, the liquid crystal display device 100 includes the liquid crystal panel 10 and the backlight unit 20. The liquid crystal panel 10 includes a plurality of pixels 30 located in a display region 10a. The backlight unit 20 is located so as to face a rear surface of the liquid crystal panel 10, and includes a plurality of irradiation sections 22 for irradiating the rear surface of the liquid crystal panel 10 with illumination light. The liquid crystal display device 100 also includes first light receiving sensors 122 and a backlight control section 240. As shown in FIG. 2, the first light receiving sensors 122 receive external light directed to the liquid crystal panel 10, at a plurality of positions in the display region 10a to obtain light receiving information a1 through d1. The backlight control section 240 controls the plurality of irradiation sections 22 respectively based on the light receiving information a1 through d1 obtained by the first light receiving sensors 122, such that the brightness of the illumination light is adjusted independently for each of a plurality of areas A through D obtained as a result of dividing the display region 10a.

With the liquid crystal display device 100, the brightness of the illumination light is appropriately adjusted independently for each of the plurality of areas A through D obtained as a result of dividing the display region 10a, based on the light receiving information obtained by the first light receiving sensors, which receive the external light directed to the liquid crystal panel 10 at the plurality of positions in the display region 10a. Owing to this, the influence of the external light directed to the liquid crystal panel 10 is alleviated, and thus the displayed image becomes easier to see.

Hereinafter, the liquid crystal display device 100 in this embodiment will be described. First, a structure of the liquid crystal panel 10 and a structure of the backlight unit 20 will be described sequentially, and then control performed by the liquid crystal display device 100 will be described.

<Liquid Crystal Panel 10>

The liquid crystal panel 10 includes the display region 10a, which is an area where an image is to be displayed. In the display region 10a of the liquid crystal panel 10, the plurality of pixels 30 are located. In this embodiment, the liquid crystal panel 10 has a generally rectangular overall shape, and the display region 10a also has a generally rectangular overall shape. The liquid crystal panel 10 includes a pair of light-transmissive substrates 40 and 50 (in this example, glass plates) holding the liquid crystal layer 13 therebetween. In this embodiment, among the pair of light-transmissive substrates 40 and 50, the substrate on the rear side (on the side of a rear surface; the backlight unit side) is an array substrate 40 (TFT substrate), and the substrate on the front side (on the side of a front surface; the display side) is a color filter substrate 50 (CF substrate).

As shown in FIG. 1, the array substrate 40 and the color filter substrate 50 are located to face each other. Between the array substrate 40 and the color filter substrate 50, a seal 15 is provided so as to enclose a peripheral portion of the rectangular display region 10a (external peripheral edge portion) in a circumferential direction. In a space enclosed by the array substrate 40, the color filter substrate 50 and the seal 15, the liquid crystal layer 13 is formed. In the liquid crystal layer 13, a liquid crystal material containing liquid crystal molecules is enclosed. In such a liquid crystal material, the alignment direction of the liquid crystal molecules is manipulated by an electric field generated between the array substrate 40 and the color filter substrate 50. Optical characteristics of the liquid crystal panel 10 are changed in accordance with the alignment direction of the liquid crystal molecules.

Figure 3:
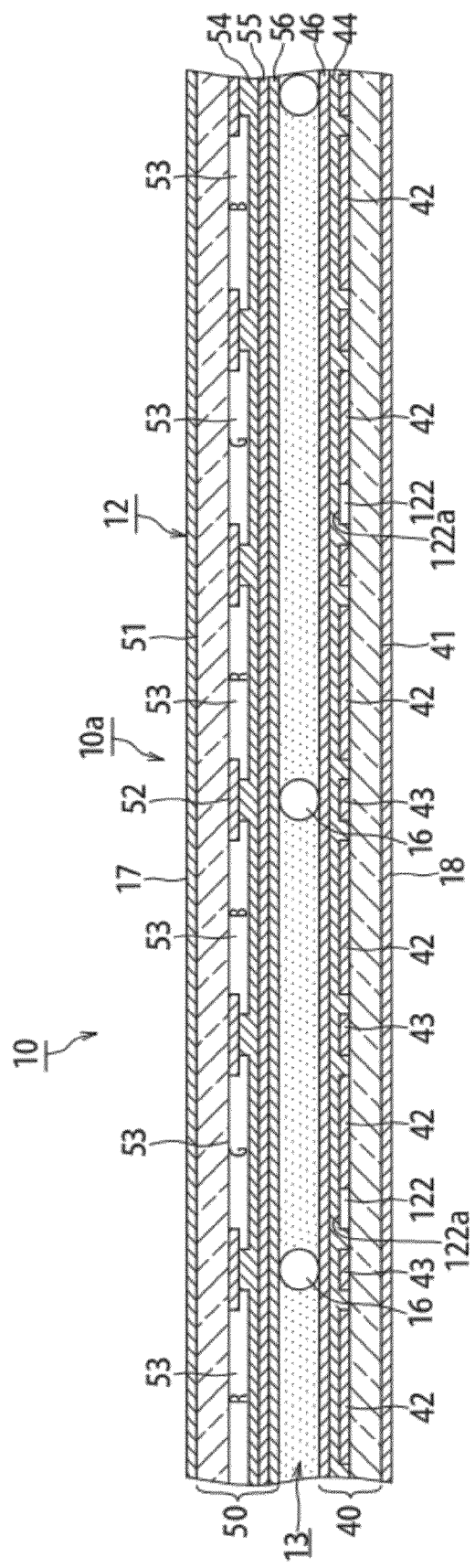
FIG. 3 is an enlarged cross-sectional view of a liquid crystal panel.

FIG. 3 is an enlarged cross-sectional view of the liquid crystal panel 10. As shown in FIG. 3, spacers 16 are provided between the array substrate 40 and the color filter substrate 50. The array substrate 40 and the color filter substrate 50 are kept distanced from each other by a prescribed gap by means of the spacers 16. Now, a structure of the array substrate 40 and a structure of the color filter substrate 50 will be described in detail sequentially.

Figure 4:
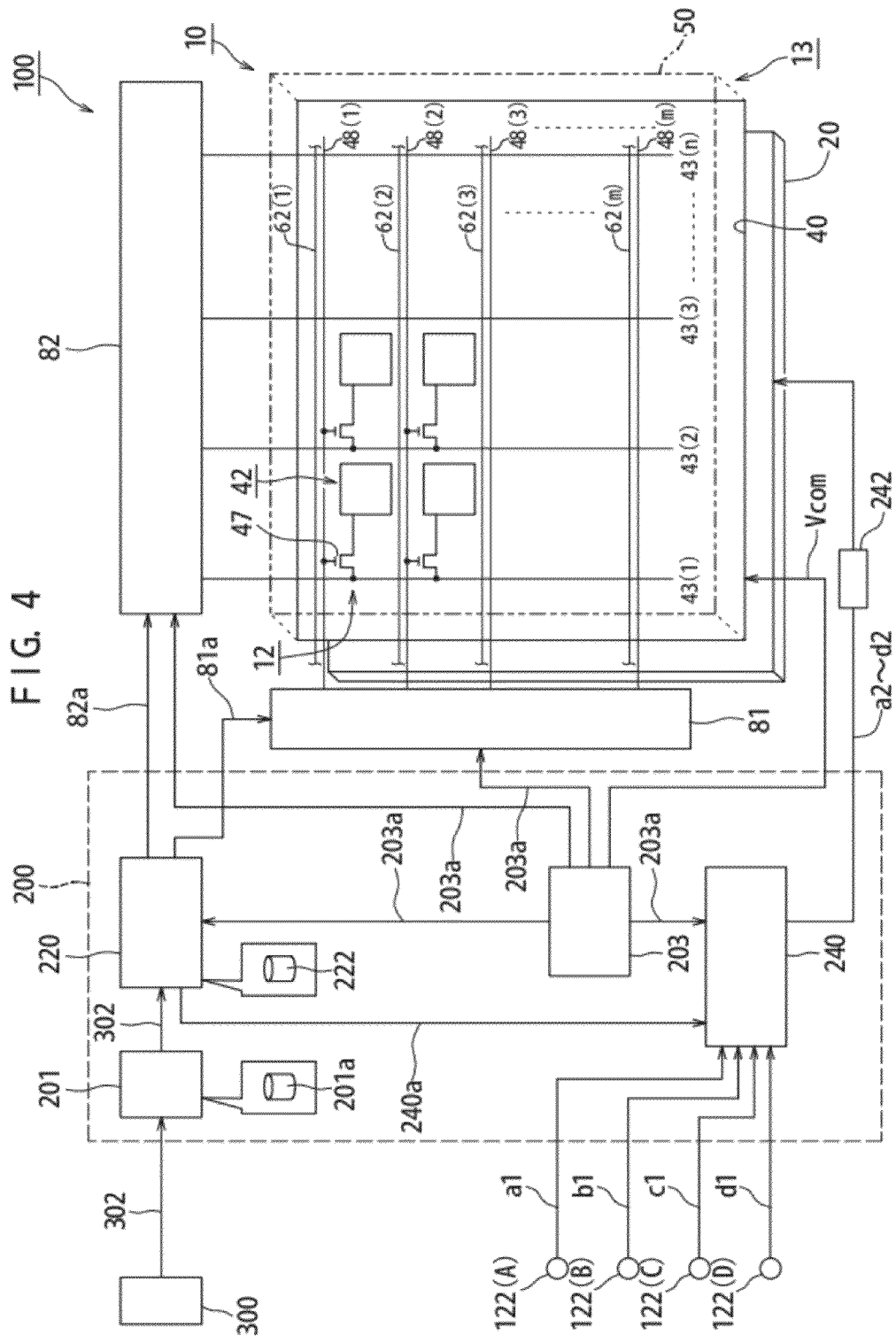
FIG. 4 is a block diagram schematically showing a liquid crystal display device according to an embodiment of the present invention.
Figure 5:
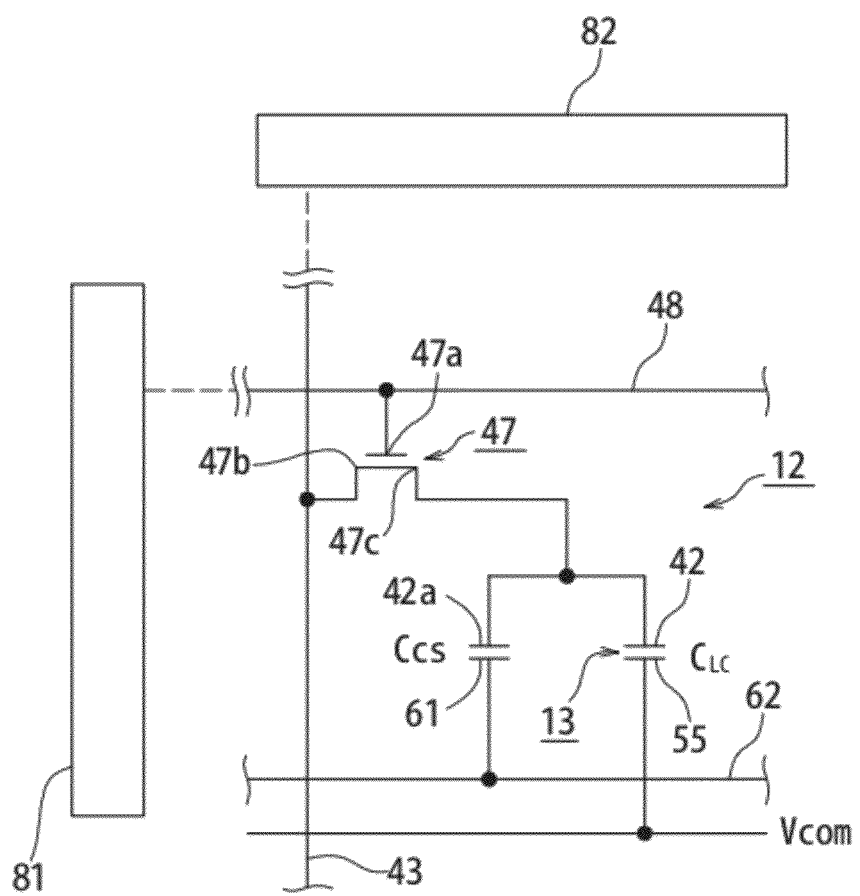
FIG. 5 is a circuit diagram schematically showing a pixel.

As shown in FIG. 3, the array substrate 40 includes pixel electrodes 42, bus lines 43, a flattening layer 44, an alignment film 46, and thin film transistors 47 (TFTs; see FIG. 4 and FIG. 5), which are formed on the side of a front surface of a glass plate 41 (on the liquid crystal layer 13 side). Each of the pixel electrodes 42 is formed of ITO (indium tin oxide), which is a transparent conductive material, and is formed in each pixel 30. These pixel electrodes 42 are each supplied with a voltage in accordance with an image via corresponding bus lines 43 and a corresponding thin film transistor 47 at a prescribed timing. The flattening layer 44 is formed of an insulating material and covers the pixel electrodes 42 and the bus lines 43. On the flattening layer 44, the alignment film 46 formed of polyimide or the like is formed. As shown in FIG. 4, the bus lines 43 transmit data signals to the thin film transistors 47. As shown in FIG. 4 and FIG. 5, the array substrate 40 includes the data signal lines 43 and also various other signal lines. The wiring structure of the signal lines and control thereon in the array substrate 40 will be described later.

As shown in FIG. 3, the color filter substrate 50 includes a black matrix 52, coloring layers 53, a flattening layer 54, a counter electrode 55, and an alignment film 56 (horizontal alignment film), which are formed on the side of a rear surface of a glass plate 51 (on the liquid crystal layer 13 side). The black matrix 52 is formed of a non-light-transmissive material (e.g., metal such as Cr (chromium) or the like), and is provided between the coloring layers 53 so as to demarcate the pixels 30. The coloring layers 53 are filters for adjusting the tone of colors. In this embodiment, each of the coloring layers 53 absorbs light of a wavelength corresponding to colors other than the color thereof to adjust the color tone of transmitted light. In this embodiment, the coloring layers 53 of three colors of red (R), green (G) and blue (B) are sequentially formed for each pixel 30 on the glass plate 51. As shown in FIG. 3, the flattening layer 54 of the color filter substrate 50 is formed so as to cover the black matrix 52 and the coloring layers 53. The counter electrode 55 formed of ITO (indium tin oxide) is formed so as to cover the flattening layer 54. The alignment film 56 is formed so as to cover the counter electrode 55. The alignment film 56 faces the alignment film 46 of the array substrate 40. The alignment direction of the liquid crystal molecules in the state where no voltage is applied is determined by the alignment films 46 and 56 of the substrates 40 and 50. In this embodiment, the alignment direction provided by the alignment film 56 of the color filter substrate 50 and the alignment direction provided by the alignment film 46 of the array substrate 40 are different by 90° from each other.

As shown in FIG. 1 and FIG. 3, polarizing plates 17 and 18 are respectively bonded on the side of a front surface of the color filter substrate 50 (glass plate 51) and on the side of a rear surface of the array substrate 40 (glass plate 41). In the case where the liquid crystal display device 100 is a so-called normally white type liquid crystal display device, the two polarizing plates 17 and 18 are located such that polarization axes thereof are perpendicular to each other. In the case where the liquid crystal display device 100 is a so-called normally black type liquid crystal display device, the two polarizing plates 17 and 18 are located such that the polarization axes thereof are parallel to each other.

As shown in FIG. 1 and FIG. 2, the liquid crystal panel 10 is supported while being held between a bezel 60 attached on the front side (on the side of the front surface) of the liquid crystal panel 10 and a frame 63 attached on the rear side (on the side of the rear surface) thereof. As shown in FIG. 2, the bezel 60 is a frame portion provided along an outer periphery of the display region 10a of the liquid crystal panel 10 and has an opening at a position corresponding to the display region 10a. The frame 63 is also a frame portion provided along the outer periphery of the display region 10a of the liquid crystal panel 10 and has an opening at a position corresponding to the display region 10a of the liquid crystal panel 10.

<Backlight Unit 20>

The backlight unit 20 is located so as to face the rear surface of the liquid crystal panel 10. The backlight unit 20 includes a backlight chassis 24 as a housing, which is a generally rectangular box-like member. The backlight chassis 24 has a recessed portion having substantially the same shape as that of the display region 10a. The backlight unit 20 is located so as to face the rear surface of the liquid crystal panel 10 in the state where the recessed portion is directed toward the liquid crystal panel 10.

Figure 6:
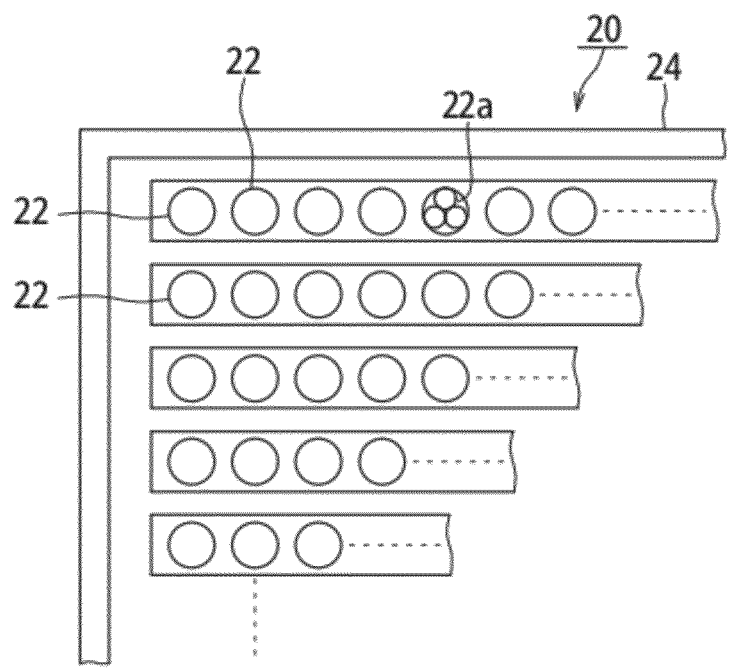
FIG. 6 is an enlarged plan view of a backlight unit.

FIG. 6 is an enlarged plan view schematically showing the backlight unit 20. As shown in FIG. 6, the backlight unit 20 includes the plurality of irradiation sections 22 for irradiating the rear surface of the liquid crystal panel 10 with light. In this embodiment, as shown in FIG. 1, a reflector plate 25 is attached inner to the backlight chassis 24. The irradiation sections 22 are located on a surface 25a (reflecting surface) of the reflector plate 25 which faces the liquid crystal panel 10. As shown in FIG. 6, the irradiation sections 22 each include a plurality of point light sources 22a. The liquid crystal display device 100 according to this embodiment can adjust the illumination light emitted by the backlight unit 20 part by part adjusted by controlling each of the irradiation sections 22 each including the plurality of point light sources 22a. In this embodiment, as shown in FIG. 6, the irradiation sections 22 are provided in a lattice. The arrangement of the irradiation sections 22 is not limited to the lattice. The irradiation sections 22 may be arranged such that, for example, the irradiation sections 22 of every other line are positionally shifted (houndstooth check or zigzag arrangement).

In this embodiment, a light emitting diode (LED) is used as each of the point light sources 22a. In this embodiment, one irradiation section 22 is formed of a plurality of light emitting diodes 22a. As the light from the backlight unit 20, white light may be desirable occasionally. In this embodiment, each irradiation section 22 is formed of light emitting diodes 22a of three colors of R (red), G (green) and blue (B), and the white illumination light is produced by mixing the light emitted by the light emitting diodes 22a of the RGB three colors. The method of producing white light as the illumination light is not limited to this. The irradiation sections 22 may be formed of, for example, white LEDs for emitting white light. The white LEDs may be of a system of obtaining white color by combining a short-wavelength LED chip with RGB fluorescent substances, a system of obtaining white color by combining a blue LED chip with a yellow fluorescent substance, a system of obtaining white color as a mixture of light of LED chips of the RGB three colors, a system of obtaining white color as a mixture of light of LED chips of two complementary colors, or the like.

The brightness of the illumination light is adjusted by control on the power to be put to each light emitting diode 22a of each irradiation section 22. In this embodiment, when the power to be put to the irradiation sections 22 is increased, the illumination light is made brighter (the luminance is increased); whereas when the power to be put to the irradiation sections 22 is decreased, the illumination light is made darker (the luminance is decreased). The power to be put to the irradiation sections 22 may be controlled by, for example, a pulse width modulation (PWM) system or the like.

In this embodiment, a plurality of optical sheets 26 are located between the liquid crystal panel 10 and the backlight unit 20. The optical sheets 26 are held between a front surface of the backlight chassis 24 and a rear surface of the frame 63 attached to the liquid crystal panel 10, and covers the recessed portion of the backlight chassis 24. The optical sheets 26 include a plurality of sheets each having a required function (e.g., a diffuser, a diffusion sheet, a lens sheet and a luminance increasing sheet) which are provided in a stacked manner.

So far, the structure of the liquid crystal display device 100 according to this embodiment has been described. The liquid crystal display device 100 includes a control section 200. FIG. 4 schematically shows a wiring structure of the liquid crystal display device 100 and the control section 200. As shown in FIG. 4, the control section 200 is connected to the liquid crystal panel 10 and the backlight unit 20 via signal lines, and controls the liquid crystal panel 10 and the backlight unit 20 such that the liquid crystal display device 100 exhibits required functions.

<Control Section 200>

The control section 200 is an electronic processing device, and includes computation means including an MPU, a CPU or the like and having a computation function, and storage means including a nonvolatile memory or the like. The control section 200 controls the liquid crystal display device 100 (liquid crystal panel 10, backlight unit 20) by use of a pre-stored program or a mounted electric or electronic circuit. (Hereinafter, regarding the control section 200, the pre-stored program or the mounted electric or electronic circuit will be referred to as the "program, etc." when appropriate.) The control on the liquid crystal display device 100 by means of the control section 200 is appropriately set or modified by the above-mentioned program, etc.

In this embodiment, as shown in FIG. 4, the control section 200 includes a liquid crystal panel control section 220 and the backlight control section 240.

The liquid crystal panel control section 220 controls the liquid crystal panel 10 based on an image signal 302 representing an image to be displayed on the display region 10a to adjust the light transmissivity of the liquid crystal panel 10. In more detail, the liquid crystal panel control section 220 creates liquid crystal panel control signals 81a and 82a based on the image signal 302. The liquid crystal panel control signals 81a and 82a are sent to the liquid crystal panel 10. In the liquid crystal panel 10, a voltage is applied between the color filter substrate 50 and the array substrate 40 based on the liquid crystal panel control signals 81a and 82a to manipulate the alignment direction of the liquid crystal molecules in the liquid crystal layer 13. In this manner, the light transmittance of the liquid crystal panel 10 is adjusted independently for each pixel 30 (in more detail, independently for each sub pixel defined by each of R, G and B).

In this embodiment, the plurality of pixels 30 are arranged in a lattice in the display region 10a of the liquid crystal panel 10. As shown in FIG. 4 and FIG. 5, each pixel 30 includes a thin film transistor 47 as a switching element. The thin film transistor 47 is provided in the array substrate 40, which is an active matrix substrate. The array substrate 40 also includes the signal lines 43 arranged in a lattice (in a matrix).

In this embodiment, as shown in FIG. 4, a plurality of scanning signal lines 48(1) through (m) and a plurality of data signal lines 43(1) through (n) are provided. The numerical figure in each ( ) is provided in order to distinguish each scanning signal line 48 and each data signal line 43. The scanning signal lines 48 and the data signal lines 43 will be described with the numerical figures in ( ) when necessary. The scanning signal lines 48(1) through (m) are each connected to the thin film transistor 47 of a corresponding pixel 30, and the plurality of data signal lines 43(1) through (n) are each connected to the thin film transistor 47 of a corresponding pixel 30. The numerical figures in ( ) have the same meaning for storage capacitance lines 62 described later. As shown in FIG. 5, the scanning signal lines 48 are each connected to a gate electrode 47a of the corresponding thin film transistor 47. The data signal lines 43 are each connected to a source electrode 47b of the corresponding thin film transistor 47. A drain electrode 47c of the thin film transistor 47 is connected to one of the electrodes which form a storage capacitance $C_{CS}$ described later, i.e., an electrode 42a, and is further connected to the pixel electrode 42 via the electrode 42a.

As shown in FIG. 3 and FIG. 5, in each pixel 30, the pixel electrode 42 of the array substrate 40 and the counter electrode 55 of the color filter substrate 50 face each other with the liquid crystal layer 13 held therebetween. The pixel electrode 42 and the counter electrode 55 form a capacitor $C_{LC}$ for manipulating the liquid crystal layer 13.

The above-mentioned storage capacitance $C_{CS}$ is formed of a pair of electrodes 42a and 61 facing each other with an insulating layer held therebetween. One of the pair of electrodes forming the storage capacitance $C_{CS}$, i.e., the electrode 42a is connected to the drain electrode 47c as described above. By contrast, the other electrode 61 forming the storage capacitance $C_{CS}$ is provided in a corresponding storage capacitance line 62. The storage capacitance $C_{CS}$ exhibits a function of maintaining the voltage applied to the pixel 30 (capacitance $C_{LC}$ for manipulating the liquid crystal layer 13) upon receiving a control signal from the storage capacitance line 62.

In this embodiment, as shown in FIG. 4, the scanning signal lines 48(1) through (m) are provided parallel to each other while having a prescribed gap therebetween. Namely, the scanning signal lines 48(1) through (m) are provided in one direction of the lattice. The scanning signal lines 48(1) through (m) are further provided in the other direction of the lattice, parallel to each other while having a prescribed gap therebetween, so that each of the pixels 30 arranged in a lattice is connected to a corresponding scanning signal line 48. As shown in FIG. 6, the storage capacitance lines 62(1) through (m) are also provided in one direction of the lattice. The storage capacitance lines 62(1) through (m) are further provided in the other direction of the lattice, parallel to each other while having a prescribed gap therebetween, so that the electrode 61 of the storage capacitance $C_{CS}$ of each of the pixels 30 located in the lattice is connected to a corresponding storage capacitance line 62 (see FIG. 5).

The scanning signal lines 48(1) through (m) are connected to a gate driver 81. The data signal lines 43(1) through (n) are connected to a source driver 82. The gate driver 81 and the source driver 82 are each connected to the liquid crystal panel control section 220. The liquid crystal panel control section 220 is connected to a signal input section 201 and a power source 203.

To the signal input section 201, the control signal 302 representing an image to be displayed on the display region 10a is input. In this embodiment, the image signal 302 is input from an external system 300 to a broadcast receiving signal 201a of the signal input section 201. The signal input section 201 sends the image signal 302 to the liquid crystal panel control section 220. The liquid crystal panel control section 220 creates the liquid crystal panel control signals 81a and 82a based on the image signal 302. In this embodiment, the liquid crystal panel control section 220 includes a timing controller 222, and sends the liquid crystal panel control signals 81a and 82a respectively to the gate driver 81 and the source driver 82 via the timing controller 222. For this operation, the timing controller 222 adjusts the timing to send the liquid crystal panel control signals 81a and 82a to the gate driver 81 and the source driver 82.

The power source 203 supplies an operating power source 203a to each element of the liquid crystal display device 100 (liquid crystal panel 10, backlight unit 20, etc.). As shown in FIG. 4, the power source 203 supplies a common electrode voltage (Vcom) to the counter electrode 55 (see FIG. 3) of the color filter substrate 50 in addition to the operating power source 203a. The common electrode voltage (Vcom) supplied to the counter electrode 55 is used as a voltage to be applied to the liquid crystal layer 13 held between the array substrate 40 and the color filter substrate 50.

The gate driver 81 creates a scanning signal based on the liquid crystal panel control signal 81a and sends the scanning signal to each of the scanning signal lines 48(1) through (m). The source driver 82 crates a data signal based on the liquid crystal panel control signal 82a and sends the data signal to each of the data signal lines 43 (1) through (n). In the pixels 30, in accordance with the input of the scanning signal to each of the scanning signal lines 48(1) through (m), the thin film transistors 47 are turned ON. Namely, the thin film transistors 47 of the pixels 30 arranged in each line provided in one direction of the lattice are turned ON at a time. At the timing when the thin film transistors 47 are turned ON, the data signal is sent to each of the data signal lines 43(1) through (n). In this manner, image information based on the liquid crystal panel control signal 82a is written to the pixels 30 arranged in each line in one direction of the lattice at a time. At the timing when the image information is written to the pixels 30, the data signal is sent also to each of the storage capacitance lines 62. Owing to this, the storage capacitances $C_{CS}$ act to maintain the voltage applied to the liquid crystal layer 13 ($C_{LC}$) even after the thin film transistors 47 are turned OFF. In this manner, the liquid crystal panel 10 adjusts the voltage to be applied to the liquid crystal layer 13 in accordance with the image signal 302 and thus can adjust the light transmissivity independently for each pixel 30.

<Control on the Backlight Unit 20>

Now, the backlight control section 240 will be described. The backlight control section 240 controls each of the plurality of irradiation sections 22 such that the brightness of the illumination light is adjusted part by part. In this embodiment, the backlight control section 240 creates backlight control signals a2 through d2 based on the image signal 302. The power controlled based on the backlight control signals a2 through d2 is put to the irradiation sections 22 of the backlight unit 20. Owing to this, the illumination light emitted by the backlight unit 20 is adjusted. The control section 200 controls the liquid crystal panel 10 and the backlight unit 20 in this manner to display a desired image on the display region 10a. In this embodiment, the backlight control section 240 can control the power to be put to each light emitting diode (point light source) 22a included in each irradiation section 22, and thus can adjust the brightness or the color tone of the illumination light emitted by the backlight unit 20.

In this embodiment, a liquid crystal panel control signal 240a is input to the backlight control section 240 from the liquid crystal panel control section 220. The backlight control section 240 creates the backlight control signals a2 through d2 based on the liquid crystal panel control signal 240a, such that the brightness or the color tone of the illumination light directed to the rear surface of the liquid crystal panel 10 from the backlight unit 20 is adjusted part by part in accordance with the luminance distribution of the image to be displayed on the liquid crystal panel 10. In this embodiment, the liquid crystal display device 100 is connected to a power input section 242 for adjusting the power to be put to each light emitting diode 22a. The power input section 242 puts a prescribed level of power to each light emitting diode 22a (irradiation section 22) based on the backlight control signals a2 through d2 generated by the backlight control section 240. Owing to this, the brightness or the color tone of the illumination light emitted by the backlight unit 20 is adjusted part by part in accordance with the luminance distribution of the image to be displayed on the liquid crystal panel 10.

So far, the basic structure of, and the control on, the liquid crystal display device 100 in this embodiment have been described. As shown in FIG. 2, the liquid crystal display device 100 includes the first light receiving sensors 122 for receiving the external light directed to the liquid crystal panel 10, at a plurality of positions in the display region 10a and obtaining the light receiving information a1 through d1. The backlight control section 240 can adjust the brightness of the illumination light independently for each of the plurality of areas A through D obtained as a result of dividing the display region 10a, based on the light receiving information a1 through d1 obtained by the first light receiving sensors 122. Hereinafter, a structure of the first light receiving sensors 122 will be described, and then control performed by the backlight control section 240 will be described.

<First Light Receiving Sensors 122>

The first light receiving sensors 122 receive the external light directed to the liquid crystal panel 10, at a plurality of positions in the display region 10a. In this embodiment, as shown in FIG. 2, the first light receiving sensors 122 are located in a dispersed manner in the display region 10a of the liquid crystal panel 10. Therefore, the first light receiving sensors 122 can obtain the light receiving information on the external light directed to the display region 10a, at various sites of the display region 10a.

In this embodiment, as shown in FIG. 3, the first light receiving sensors 122 are respectively located in areas where the plurality of pixels 30 are located as seen in a plan view of the liquid crystal panel 10. Therefore, the first light receiving sensors 122 can obtain the light receiving information a1 through d1 on the external light directed to the display region 10a, independently for each pixel 30. In this embodiment, one light receiving sensor 122 is provided for each pixel 30, but the present invention is not limited to such a form. For example, one light receiving sensor 122 may be provided for each of pixel groups, each of which includes a plurality of pixels (pixel group of 8 pixels×8 pixels, pixel group of 10 pixels×10 pixels). In this case, the light receiving information a1 through d1 on the external light directed to the display region 10a can be obtained for each pixel group. In this case, the pixel group can be arbitrarily set.

In this embodiment, each pixel 30 of the liquid crystal panel 10 includes R (red), G (green) and B (blue) sub pixels. Each first light receiving sensor 122 is provided for one of the R (red), G (green) and B (blue) sub pixels. In this embodiment, each first light receiving sensor 122 is provided for the G (green) sub pixel.

As each of the first light receiving sensors 122, a sensor for generating electric information in accordance with the received light is usable. As the first light receiving sensor 122, for example, a sensor for generating a photoelectromotive force by the external light received by a light receiving section 122a is usable. As such a first light receiving sensor 122, a photodiode, a phototransistor or the like is usable. Alternatively, as the first light receiving sensor 122, a photoresistor having an electric resistance thereof changed in accordance with the intensity of the received light is usable. The specific content of the "light receiving information" varies in accordance with the type of the sensor, the circuit configuration or the like. In this embodiment, as the first light receiving sensor 122, a photodiode is used. It is preferable that the first light receiving sensor 122 is located such that, as shown in FIG. 3, the light receiving section 122a is directed toward the front surface of the liquid crystal panel 10 to receive the external light.

In this embodiment, as shown in FIG. 4, the first light receiving sensors 122 are connected to the backlight control section 240 via signal lines. The photoelectromotive forces generated by the first light receiving sensors 122 are sent to the backlight control section 240 as the "light receiving information a1 through d1".

<Backlight Control Section 240>

Figure 7:
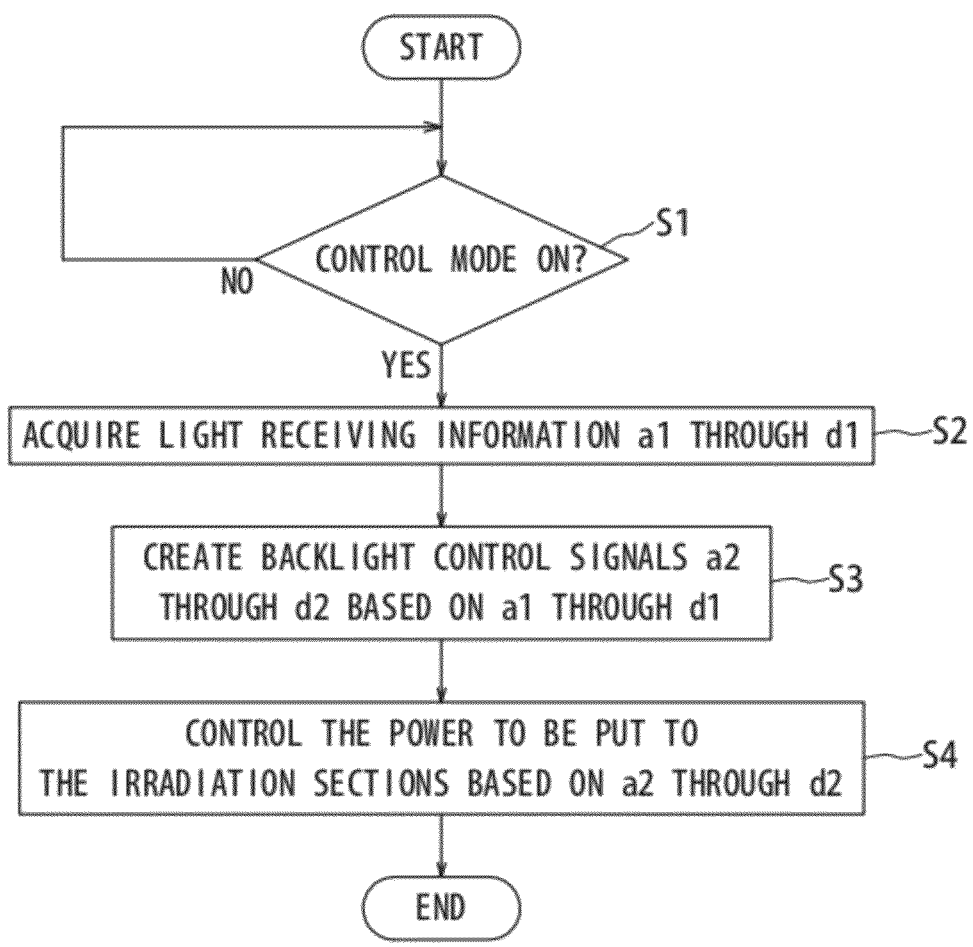
FIG. 7 is a flowchart schematically showing control performed by a backlight control section.

The backlight control section 240 adjusts the brightness of the illumination light independently for each of the plurality of areas obtained as a result of dividing the display region 10a, based on the light receiving information a1 through d1 obtained by the first light receiving sensors 122. Hereinafter, such control performed by the backlight control section 240 will be described. FIG. 7 is a flowchart of the control on the irradiation sections 22 performed by the backlight control section 240. Herein, a mode in which the irradiation sections 22 are controlled based on the light receiving information a1 through d1 obtained by the first light receiving sensors 122 will be referred to as the "control mode". By contrast, a mode in which the control mode is not carried out will be referred to as the "non-control mode". In this embodiment, the control mode and the non-control mode are switched to each other by a prescribed operation.

As shown in FIG. 2 and FIG. 7, the backlight control section 240, for example, starts the control on the irradiation sections 22 based on the light receiving information a1 through d1 from the first light receiving sensors 122 when the control mode is switched ON by a prescribed operation (S1). In the control mode, the backlight control section 240 first acquires the light receiving information a1 through d1 from the first light receiving sensors 122 (S2). Next, the backlight control section 240 creates the backlight control signals a2 through d2 respectively corresponding to the plurality of areas A through D obtained as a result of dividing the display region 10a, based on the light receiving information a1 through d1 obtained by the first light receiving sensors 122 (S3). Based on the backlight control signals a2 through d2 created by the backlight control section 240, the power to be put to the irradiation sections 22 (light emitting diodes 22a) is controlled independently for each of the areas A through D (S4).

In this manner, with the liquid crystal display device 100, the plurality of irradiation sections 22 are each controlled based on the light receiving information a1 through d1 obtained by the first light receiving sensors 122. For performing this control, with the liquid crystal display device 100, the light receiving information a1 through d1 corresponding to the luminance distribution of the external light directed to the display region 10a is obtained by the first light receiving sensors 122. Based on the light receiving information a1 through d1, the brightness or the color tone of the illumination light emitted by the backlight unit 20 is adjusted part by part, i.e., independently for each of the plurality of areas A through D obtained as a result of dividing the display region 10a. By such part-by-part adjustment on the brightness of the illumination light emitted by the backlight unit 20, the influence of the external light directed to the display region 10a can be alleviated and thus an image easy to see can be displayed.

Hereinafter, specific examples will be described.

There are cases where, for example, a top part of the display region 10a of the liquid crystal panel 10 is brighter than a bottom part thereof by the influence of external light such as illumination light in the room or the like. In such a case, in this embodiment, the backlight control section 240 increases the brightness of the illumination light directed to the areas C and D set in the top part of the display region 10a, based on the light receiving information a1 through d1 obtained by the first light receiving sensors 122. In this manner, the liquid crystal display device 100 can optionally correct the apparent luminance distribution caused in the top part and the bottom part of the displayed image on the display region 10a (luminance distribution of the displayed image actually observed by the viewer).

There are cases where the external light directed to the display region 10a is brighter for a left part of the display region 10a than for a right part thereof. In this case, the backlight control section 240 increases the brightness of the illumination light directed to the areas A and D set in the left part of the display region 10a, based on the light receiving information a1 through d1 obtained by the light receiving sensors 122. In this manner, the liquid crystal display device 100 can optionally correct the apparent luminance distribution caused in the right part and the left part of the display region 10a.

With the liquid crystal display device 100, the power to be put to the irradiation sections 22 is controlled based on the light receiving information a1 through d1 obtained by the first light receiving sensors 122. In this case, when the intensity of the external light directed to the display region 10a is weakened, the power to be put to the irradiation sections 22 is decreased such that the illumination light is not unnecessarily bright. In this manner, the liquid crystal display device 100 can decrease the total amount of power used for turning on the irradiation sections 22 and thus can save the driving power.

Figure 8:
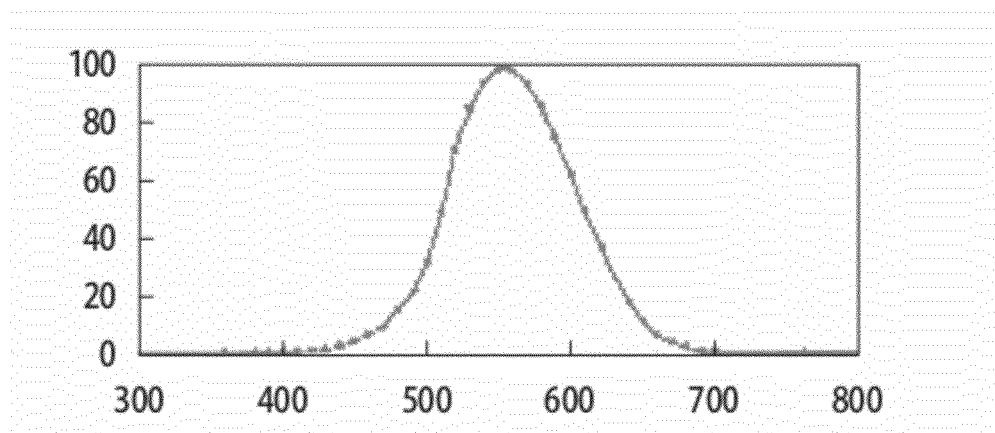
FIG. 8 is a graph showing a range of light visible to the human.

As shown in FIG. 8, light visible to the human eye is generally about 360 nm to 830 nm. By contrast, when silicon photodiodes are used as the first light receiving sensors 122, light having a wavelength exceeding such a range of visible light (e.g., light having a wavelength in the range of 190 nm to 1100 nm) can be received. Therefore, the first light receiving sensors 122 acquire light receiving information even when receiving light of a wavelength which cannot be sensed by the human eye. If the irradiation sections 22 are controlled based on such light receiving information, the brightness of the adjusted illumination light may possibly be diverged from the brightness easy to see to the viewer.

For avoiding this, it is preferable that the first light receiving sensors 122 are each located in an area where one of the plurality of coloring layers 53 is formed as seen in a plan view of the liquid crystal panel 10. It is preferable that, for example, the first light receiving sensors 122 are located so as to receive the external light through the color filter substrate 50 of the liquid crystal panel 10. With such an arrangement, the first light receiving sensors 122 output the light receiving information a1 through d1 on the external light transmitted through the one of the coloring layers 53. The backlight control section 240 controls the irradiation sections 22 respectively based on such light receiving information a1 through d1 obtained by the first light receiving sensors 122. In this manner, the first light receiving sensors 122 can receive the light within the range visible to the human eye by receiving the external light through the coloring layers 53. Owing to this, the backlight control section 240 allows an image easy to see to the viewer to be displayed in consideration of the influence of a part of the external light which is within the range visible to the human eye.

In the case where the coloring layers 53 of the plurality of colors are of the RGB colors, it is preferable that the first light receiving sensors are each located in the area where the green coloring layer 53(G) is located. Light of a wavelength of green (495 nm to 570 nm) is easiest to see for the visual characteristics of the human eye. In this manner, when the irradiation sections 22 are controlled based on the light receiving information on the external light transmitted through the green coloring layer 53(G), the brightness of the illumination light can be adjusted in accordance with the visual characteristics of the human eye.

In this embodiment, the irradiation sections 22 each include point light sources (light emitting diodes) 22a of a plurality of colors (RGB three colors). In this embodiment, the backlight control section 240 controls each of the point light sources 22a of the plurality of colors. In this case, the backlight control section 240 controls the point light sources 22a of the plurality of colors respectively based on the light receiving information a1 through d1 obtained by the first light receiving sensors 122, and thus can adjust the color tone of the illumination light emitted from the irradiation sections 22. For example, the first light receiving sensors 122 are each located so as to receive the external light through each of the coloring layers of the RGB colors of the color filter substrate 50 of the liquid crystal panel 10. By such an arrangement, the color tone of the external light can be detected based on the light receiving information from the first light receiving sensors 122. In this case, the backlight control section 240 can adjust the color tone of the illumination light emitted by the backlight unit to an appropriate color tone in accordance with the color tone of the external light detected by the first light receiving sensors 122.

In this embodiment, the liquid crystal panel control section 220 controls the voltage to be applied to the liquid crystal layer 13 independently for each pixel 30, based on the light receiving information a1 through d1 obtained by the first light receiving sensors 122. Specifically, the liquid crystal panel control section 220 creates the liquid crystal panel control signals 81a and 82a based on the light receiving information a1 through d1 obtained by the first light receiving sensors 122 and also based on the image signal 302, and sends the liquid crystal panel control signals 81a and 82a respectively from the gate driver 81 and the source driver 82 to each pixel 30. The gate driver 81 and the source driver 82 create control signals (scanning signal, data signal) based on the liquid crystal panel control signals 81a and 82a, and thus controls the voltage to be applied to the liquid crystal layer 13 independently for each pixel 30. In this manner, the liquid crystal panel control section 220 controls the voltage to be applied to the liquid crystal layer 13 based on the light receiving information a1 through d1 obtained by the first light receiving sensors 122 and also based on the image signal 302, and thus can adjust the light transmissivity independently for each pixel 30. Owing to this, the liquid crystal display device 100 can adjust the contrast of the displayed image in small units based on the light receiving information a1 through d1.

So far, the liquid crystal display device 100 according to this embodiment of the present invention has been described. The liquid crystal display device 100 may be modified in various manners. Hereinafter, modification examples of the liquid crystal display device 100 according to this embodiment will be described.

<Modification Examples of the First Light Receiving Sensors 122>

In the above-described embodiment, the first light receiving sensors 122 are each located for each pixel group including a plurality of pixels. The positioning arrangement of the first light receiving sensors 122 is not limited to this. The first light receiving sensors 122 only need to be located so as to receive the external light directed to the liquid crystal panel 10 at a plurality of positions in the display region 10a, and there is no other limitation. Hereinafter, the positioning arrangements of the first light receiving sensors 122 will be described.

The first light receiving sensors 122 may be located, for example, in a dispersed manner along a line which is set to cross the display region 10a in a horizontal direction or in a vertical direction. With such an arrangement, the light receiving information on the external light directed to the display region 10a can be acquired along the line which is set to cross the display region 10a in the horizontal direction or in the vertical direction. In this case, for example, the brightness of the external light can be detected along the line which is set to cross the display region 10a in the horizontal direction or in the vertical direction. In this case, as compared with the case where the first light receiving sensors 122 are located for each pixel group including a plurality of pixels, the number of the first light receiving sensors 122 can be decreased. By such a decrease of the number of the first light receiving sensors 122, the circuit or the lines for acquiring the light receiving information on the external light can be simplified.

Figure 9:
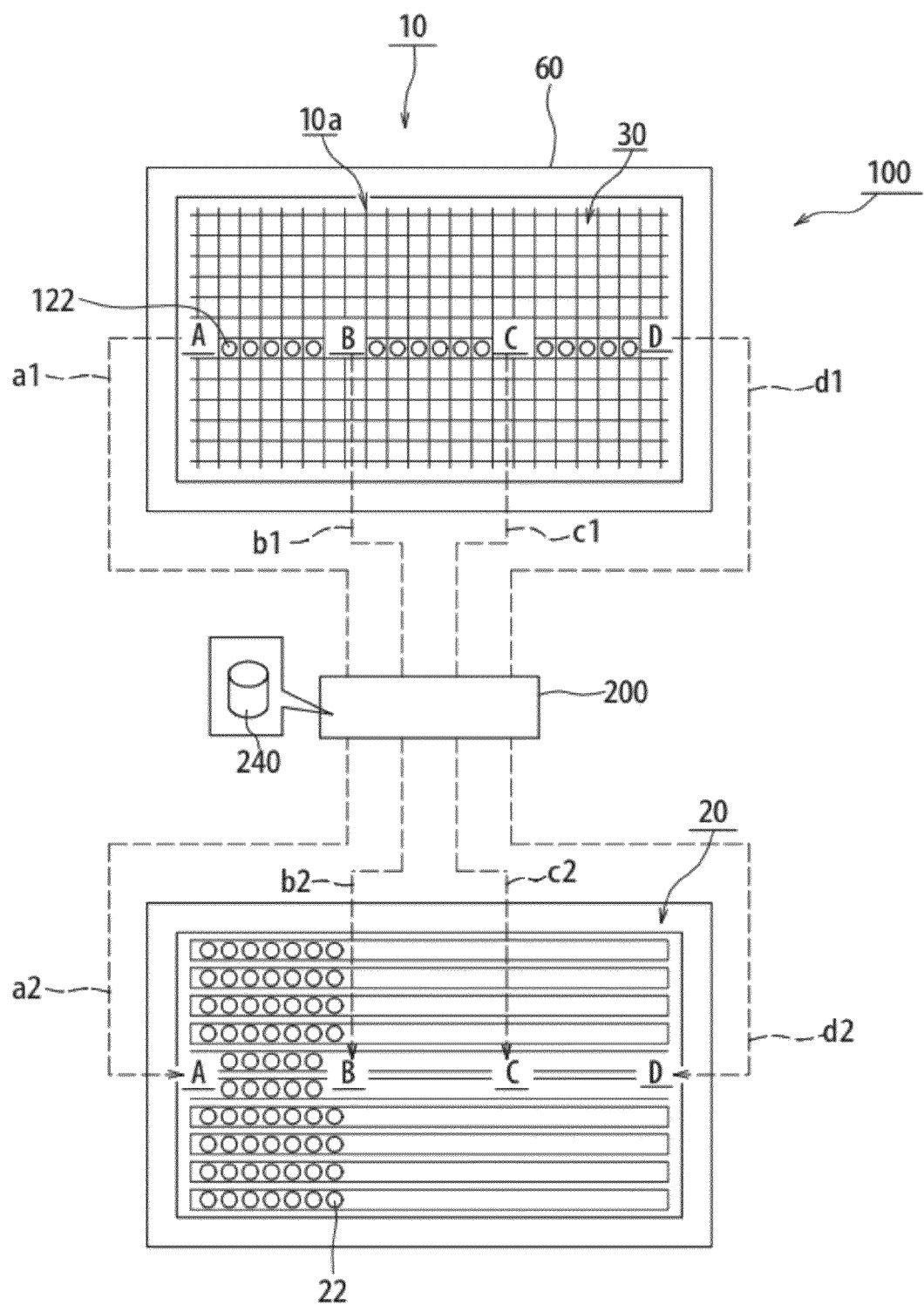
FIG. 9 is a block diagram schematically showing a liquid crystal display device according to an embodiment of the present invention.
Figure 10:
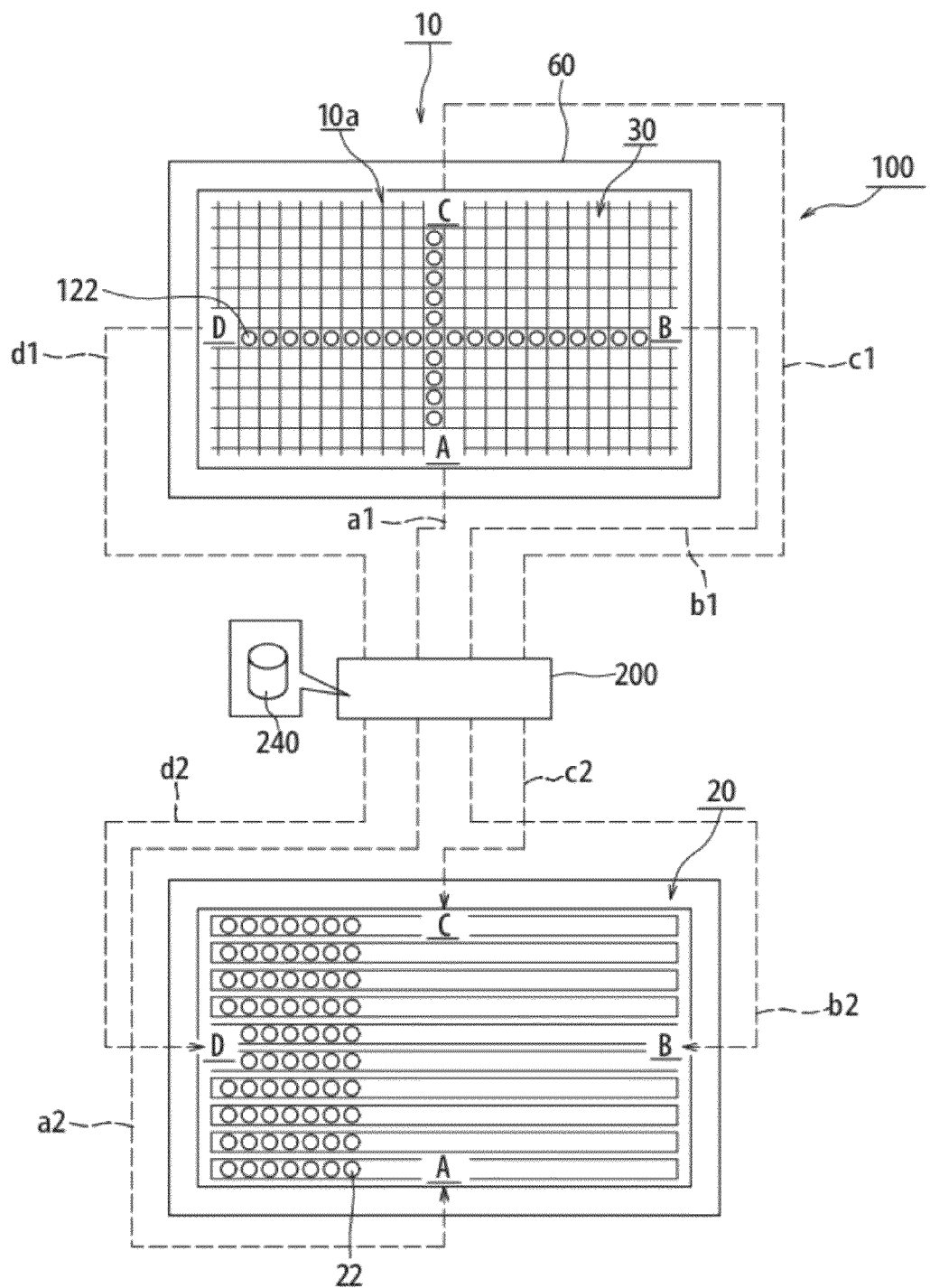
FIG. 10 is a block diagram schematically showing a liquid crystal display device according to an embodiment of the present invention.

In the case where, for example, the display region 10a is rectangular, as shown in FIG. 9 and FIG. 10, the first light receiving sensors 122 may be located along a line connecting intermediate points of at least two opposing sides of the four sides of the display region 10a. In this case, the first light receiving sensors 122 can obtain the light receiving information a1 through d1 on the external light directed to the display region 10a, along the line connecting the intermediate points. In this case, as compared with the case where the first light receiving sensors 122 are respectively located in areas where the plurality of pixels 30 are located as seen in a plan view of the liquid crystal panel 10, the number of the first light receiving sensors 122 can be reduced. In this manner, the circuit or the lines for acquiring the light receiving information on the external light can be simplified, and thus the production cost can be suppressed low. In the case where the liquid crystal display device 100 includes the rectangular display region 10a, as shown in FIG. 9, the first light receiving sensors 122 may be located along a line connecting intermediate points of two shorter sides of the display region 10a. In this case, the light receiving information a1 through d1 on the external light in the longitudinal direction of the rectangular display region 10a can be obtained. Therefore, the light receiving information a1 through d1 generally reflecting the luminance distribution of the external light in the entirety of the display region 10a can be obtained. In the case where the light receiving information a1 through d1 on the external light in the shorter direction of the display region 10a is to be accurately acquired, as shown in FIG. 10, the first light receiving sensors 122 may be located along the line connecting intermediate points of two shorter sides of the display region 10a and also along a line connecting intermediate points of two longer sides of the display region 10a.

Figure 11:
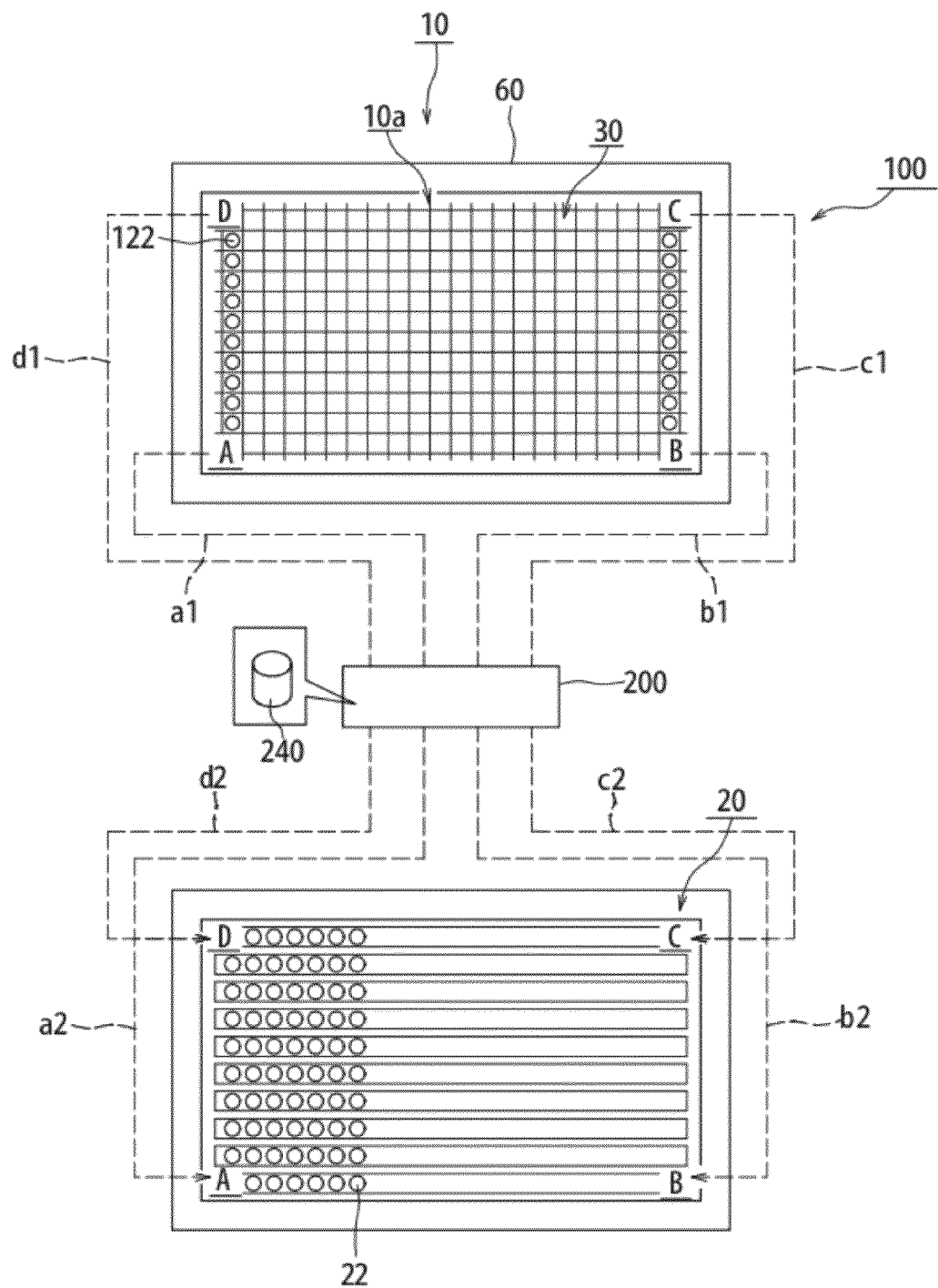
FIG. 11 is a block diagram schematically showing a liquid crystal display device according to an embodiment of the present invention.
Figure 12:
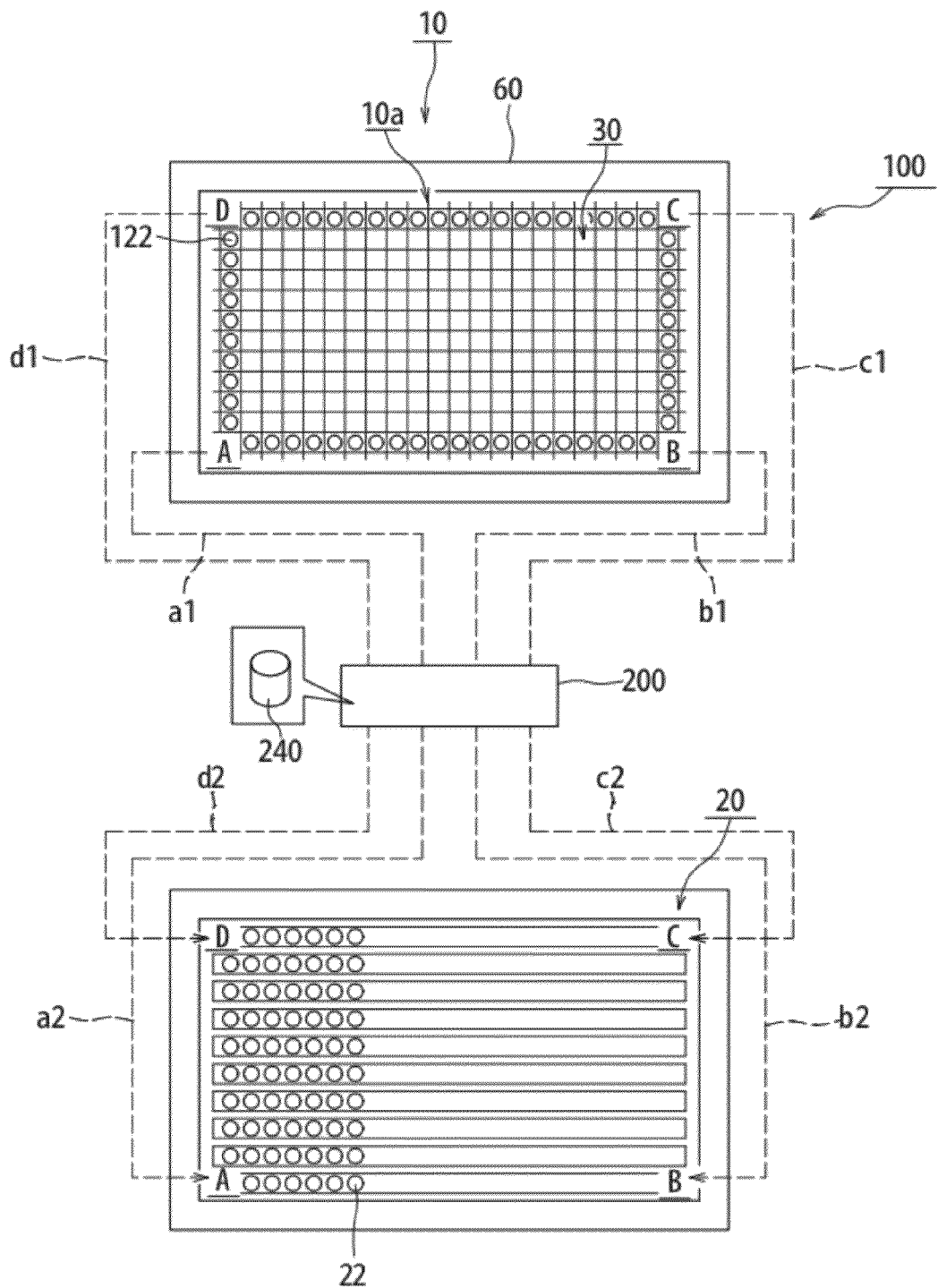
FIG. 12 is a block diagram schematically showing a liquid crystal display device according to an embodiment of the present invention.

In the case where the display region 10a is square, as shown in FIG. 11 and FIG. 12, the light receiving sensors 122 may be located in peripheral edge portions of the display region 10a, more specifically, along at least two opposing sides among the four sides thereof. In this case also, the number of the first light receiving sensors 122 is reduced, which contributes to the reduction of the production cost. In addition, luminance reduction of the displayed image caused by reduction of the aperture ratio of the pixels 30 can be suppressed.

As described above, when the first light receiving sensors 122 are located in the display region 10a, the aperture ratio of the pixels 30 is reduced, and thus the luminance of the displayed image is reduced. Especially when the first light receiving sensors 122 are located in a central portion of the display region 10a and thus the luminance of the displayed image is reduced in the central portion of the display region 10a, such reduction of the luminance of the displayed image is easily recognizable by the user. By contrast, according to this liquid crystal display device 100, the first light receiving sensors 122 are located in the peripheral edge portions of the display region 10a. Therefore, as compared with the case where the first light receiving sensors 122 are located in the central portion of the display region 10a, the reduction of the luminance of the displayed image is less likely to be recognized by the user.

Figure 13:
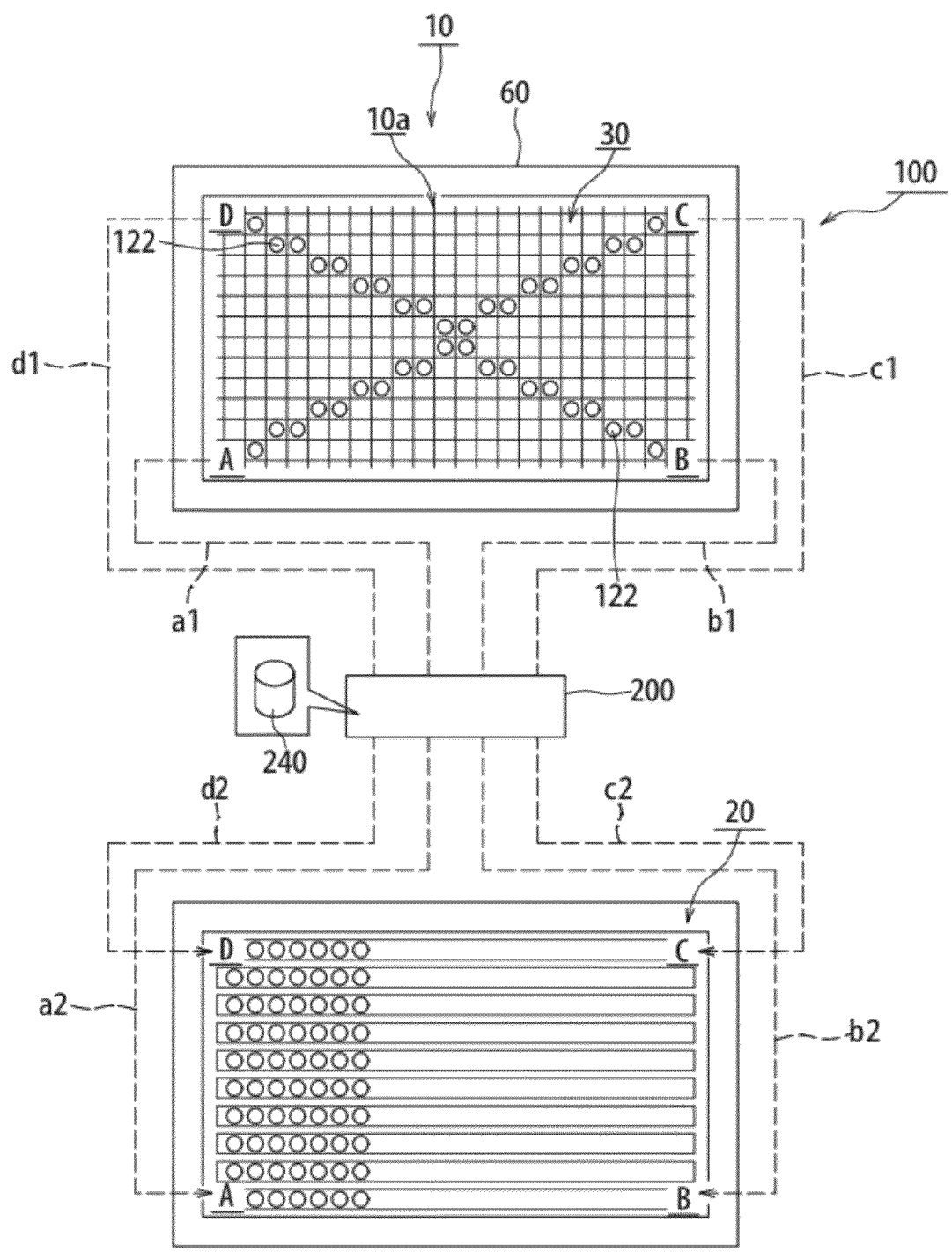
FIG. 13 is a block diagram schematically showing a liquid crystal display device according to an embodiment of the present invention.
Figure 14:
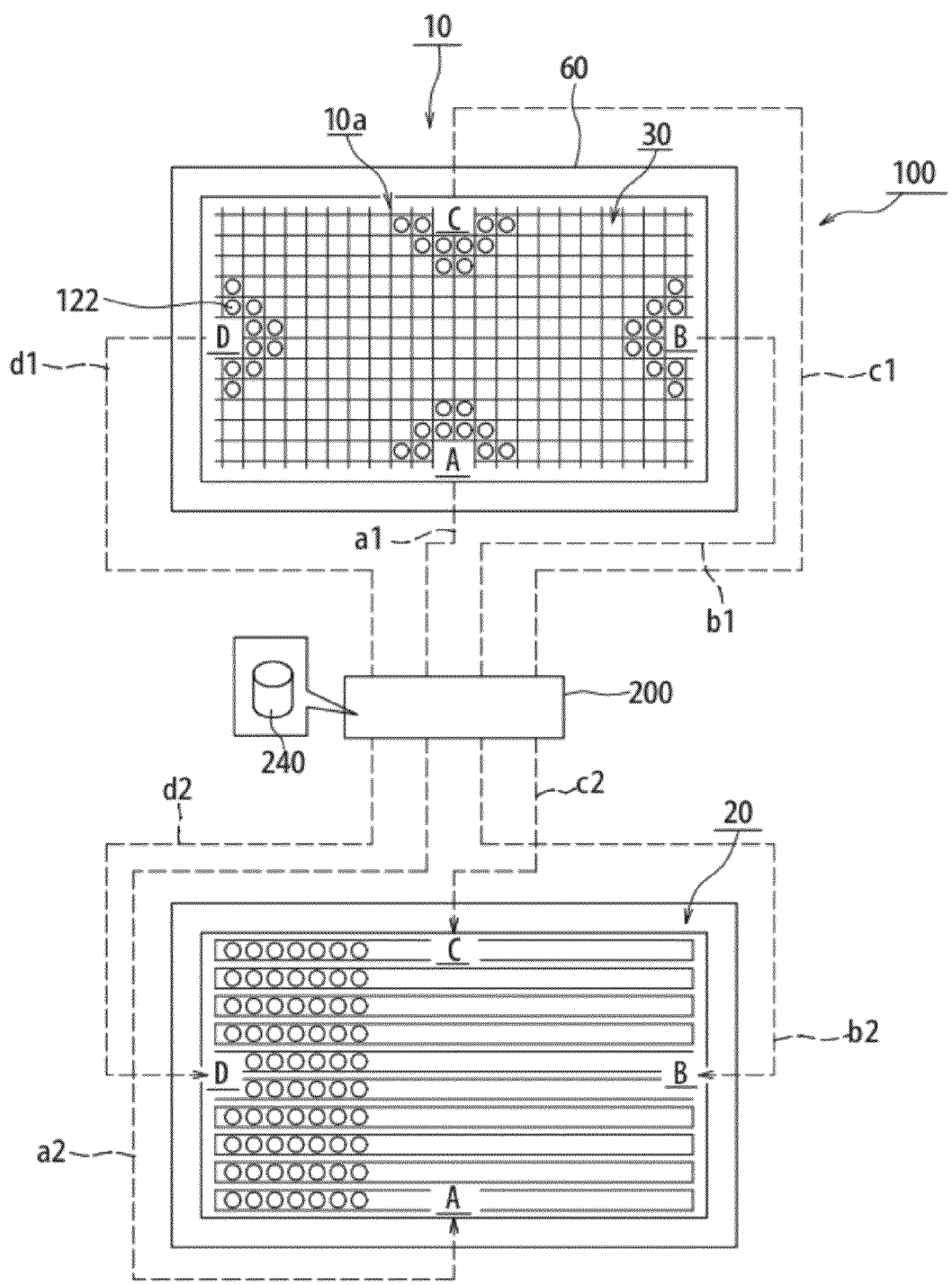
FIG. 14 is a block diagram schematically showing a liquid crystal display device according to an embodiment of the present invention.
Figure 15:
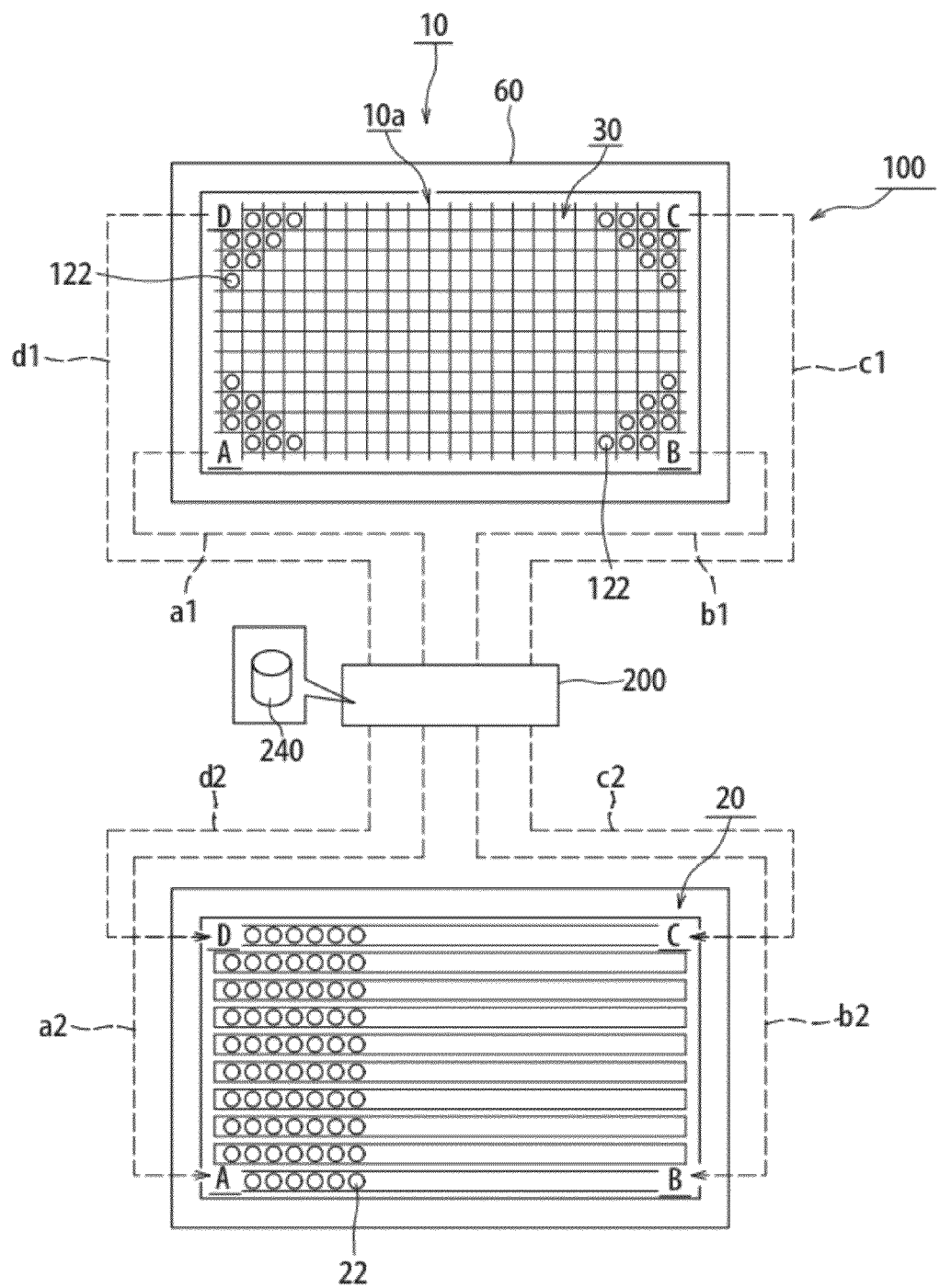
FIG. 15 is a block diagram schematically showing a liquid crystal display device according to an embodiment of the present invention.

The first light receiving sensors 122 may be located at other positions as seen in a plan view of the liquid crystal panel 10. In the case where, for example, the display region 10a is square, as shown in FIG. 13, the first light receiving sensors 122 may be located along at least one diagonal line of the display region 10a. Alternatively, as shown in FIG. 14, the first light receiving sensors 122 may be located in peripheral edge portions of the display region 10a, more specifically, in the vicinity of the central portion of each of the sides of the display region 10a. Still alternatively, as shown in FIG. 15, the first light receiving sensors 122 may be located in the peripheral edge portions of the display region 10a, more specifically, at the four corners of the display region 10a.

Figure 16:
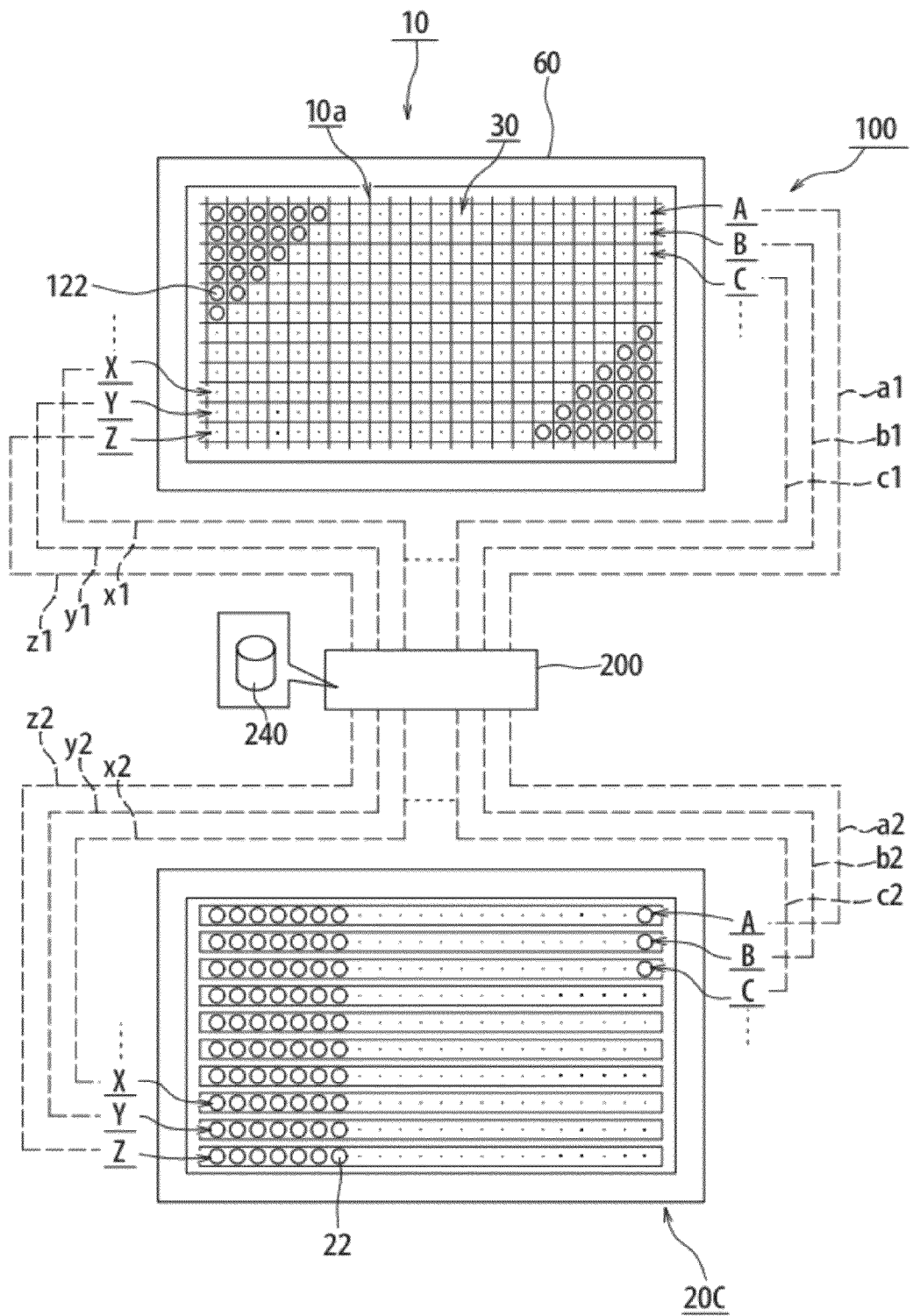
FIG. 16 is a block diagram schematically showing a liquid crystal display device according to an embodiment of the present invention.

In the above-described embodiment, the display region 10a is divided into the four areas A, B, C and D. The number by which the display region 10a is to be divided is not limited to four, and may be changed optionally in accordance with the application of the liquid crystal display device 100. As shown in FIG. 16, the display region 10a may be, for example, divided into a plurality of area A through Z in correspondence with the positions at which the first light receiving sensors 122 are located. In this case, it is preferable that the irradiation sections 22 are located respectively in correspondence with the positions of the areas A through Z (first light receiving sensors 122) and controlled. In this case, the backlight control section 240 can control the irradiation sections 22 independently for each of the areas A through Z, respectively set in correspondence with the irradiation sections 22, based on the light receiving information a1 through z1 obtained by the first light receiving sensors 122.

The pixels 30 each have an opening for allowing transmission of the illumination light directed to the rear surface of the liquid crystal panel 10 from the backlight unit 20 and of the external light directed to the display region 10a. In this case, the black matrix 52 is formed between the openings adjacent to each other as seen in a plan view of the liquid crystal panel 10, and thus blocks the illumination light and the external light. With such a structure, it is preferable that the first light receiving sensors 122 are located in the area where the black matrix 52 is formed as seen in a plan view of the liquid crystal panel 10, closer to the front surface of the liquid crystal panel 10 than the black matrix 52. In this case, the first light receiving sensors 122 may be located in the areas where the pixels 30 are formed without covering the openings of the pixels 30. Owing to this, the reduction of the aperture ratio of the pixels 30 can be suppressed.

Specific examples in which the first light receiving sensors 122 are located in the area where the black matrix 52 is formed as seen in a plan view of the liquid crystal panel 10 will be described below.

Figure 17:
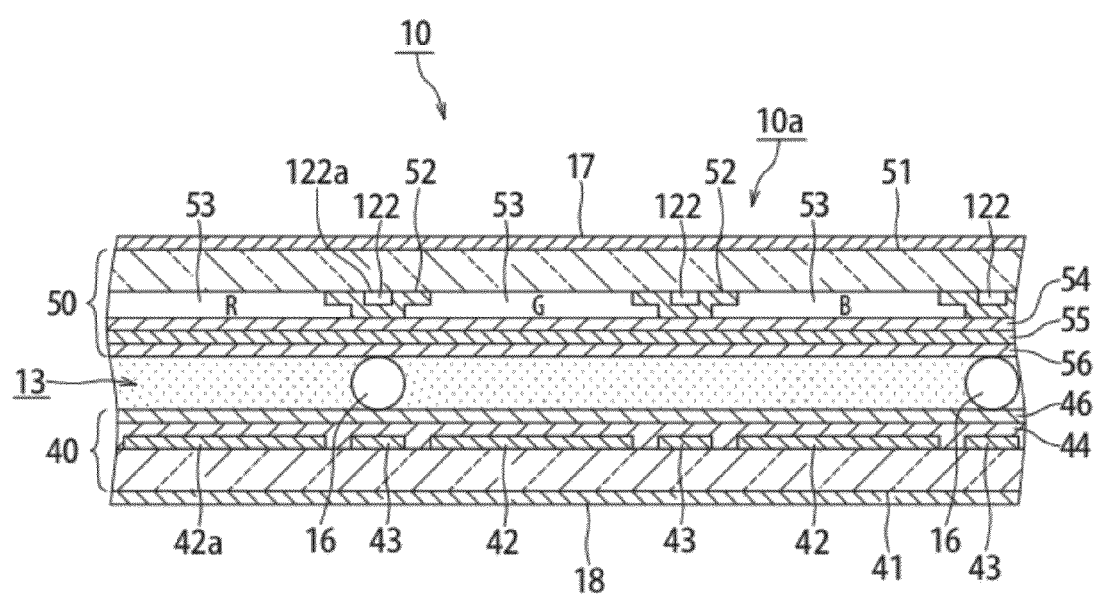
FIG. 17 is an enlarged cross-sectional view of a liquid crystal panel.

As shown in FIG. 17, it is preferable that, for example, each first light receiving sensor 122 is located such that a surface thereof on the backlight unit 20 side is covered with the black matrix 52. With such an arrangement, the illumination light emitted by the backlight unit 20 is blocked by the black matrix 52 before being received by the first light receiving sensors 122. Therefore, the light receiving information a1 through d1 from which the information on the illumination light has been excluded can be obtained by the first light receiving sensors 122.

Figure 18:
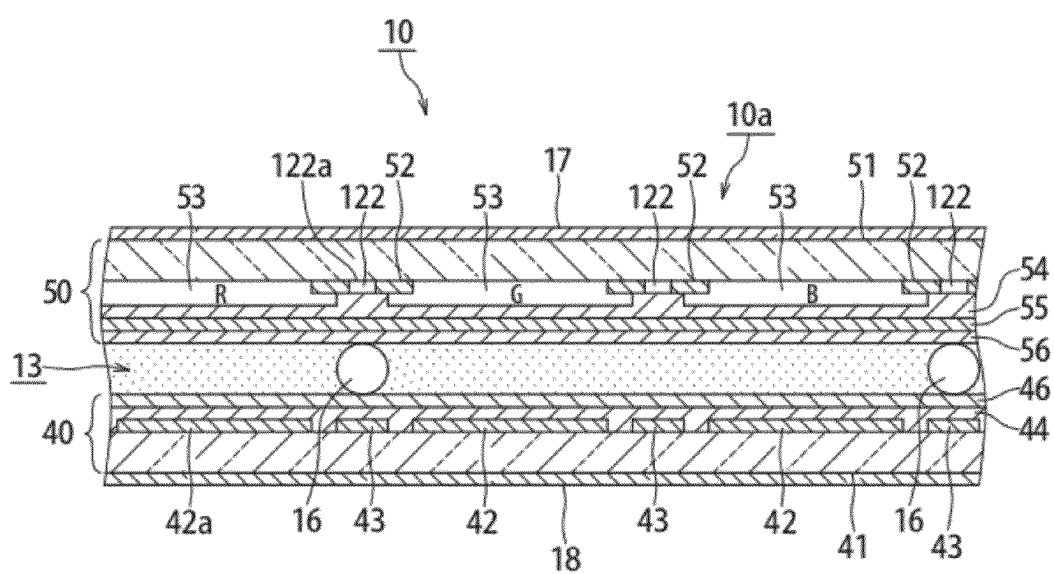
FIG. 18 is an enlarged cross-sectional view of a liquid crystal panel.

Alternatively, as shown in FIG. 18, the first light receiving sensors 122 may be located in the black matrix 52.

The first light receiving sensors 122 may be located in the areas where the thin film transistors 47 and/or the signal lines 43 are located as seen in a plan view of the liquid crystal panel 10. The thin film transistors 47 and the signal lines 43 are non-light-transmissive members, and therefore block the illumination light emitted by the backlight unit 20. The areas where the thin film transistors 47 and/or the signal lines 43 are located, in which the first light receiving sensors 122 are located, are blocked from the illumination light from the beginning. Therefore, the first light receiving sensors 122 located in such areas do not reduce the aperture ratio of the pixels 30. In this manner, the situation that the luminance of the displayed image is reduced by the provision of the first light receiving sensors 122 can be prevented.

Figure 19:
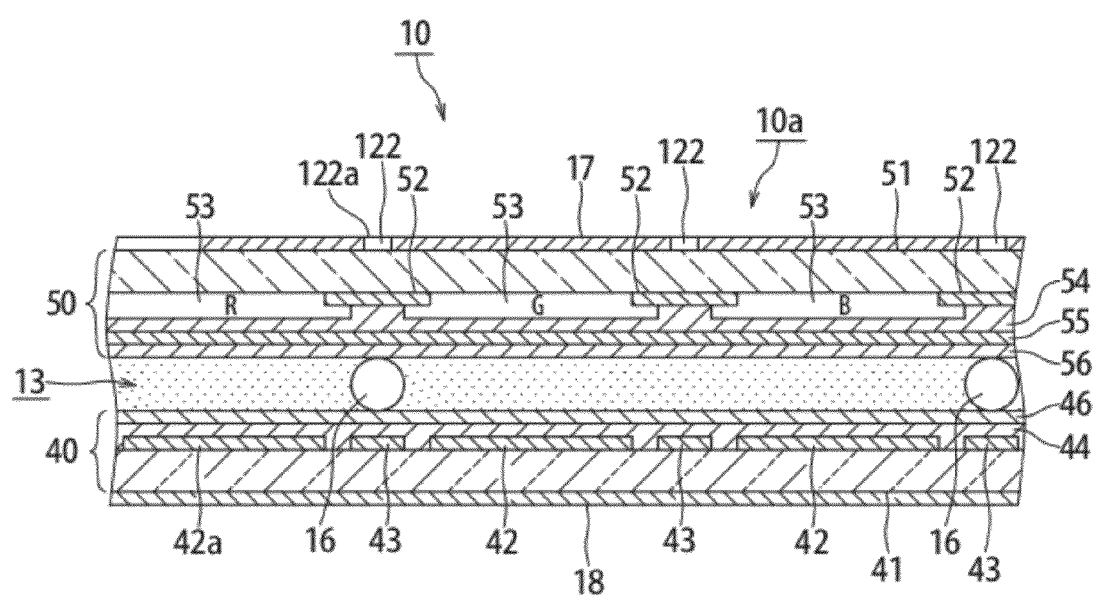
FIG. 19 is an enlarged cross-sectional view of a liquid crystal panel.
Figure 20:
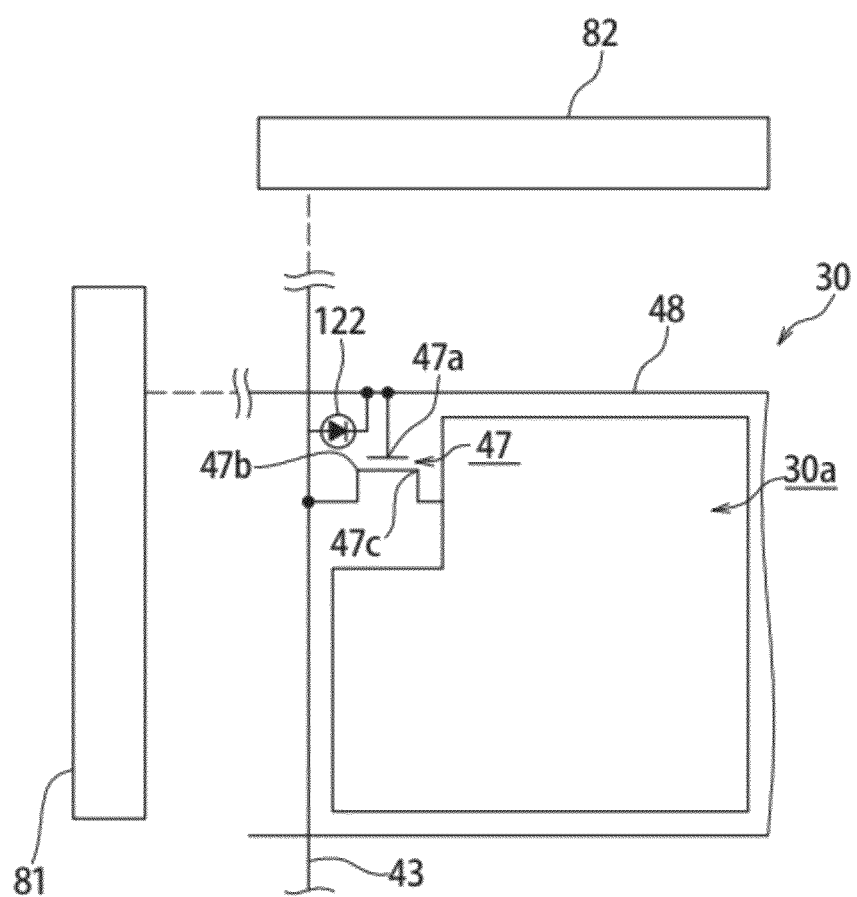
FIG. 20 is a circuit diagram schematically showing a pixel.

The first light receiving sensors 122 do not need to be located inside the liquid crystal panel 10. As shown in FIG. 19, the first light receiving sensors 122 may be located, for example, in the polarizing plate 17 attached to the front surface of the liquid crystal panel 10. In this case also, the first light receiving sensors 122 can receive the external light directed to the liquid crystal panel 10. In the case where the first light receiving sensors 122 are located in the polarizing plate 17, the first light receiving sensors 122 may be located in the area where the black matrix 52 is formed as seen in a plan view of the liquid crystal panel 10. The area where the black matrix 52 is formed is blocked from the light from the beginning. Therefore, even when the first light receiving sensors 122 are located in the area where the black matrix 52 is formed, the aperture ratio of the pixels 30 is not reduced.

The first light receiving sensors 122 may be located in a member other than the liquid crystal panel 10.

Figure 21:
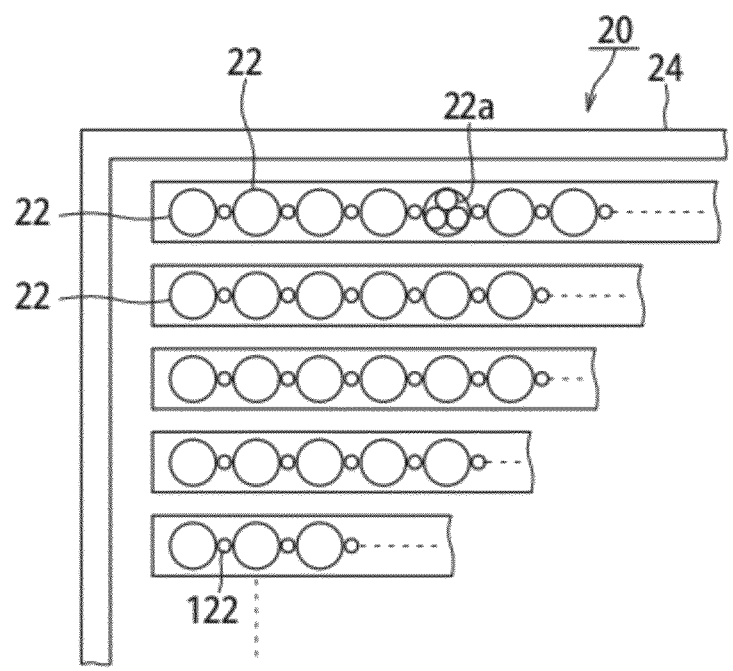
FIG. 21 is an enlarged plan view of a backlight unit.

As shown in FIG. 21, the first light receiving sensors 122 may be located, for example, in the backlight unit 20. In this case, the first light receiving sensors 122 can be located without covering the openings of the pixels 30 of the liquid crystal panel 10. Therefore, the reduction of the aperture ratio of the pixels 30 can be prevented.

Figure 22:
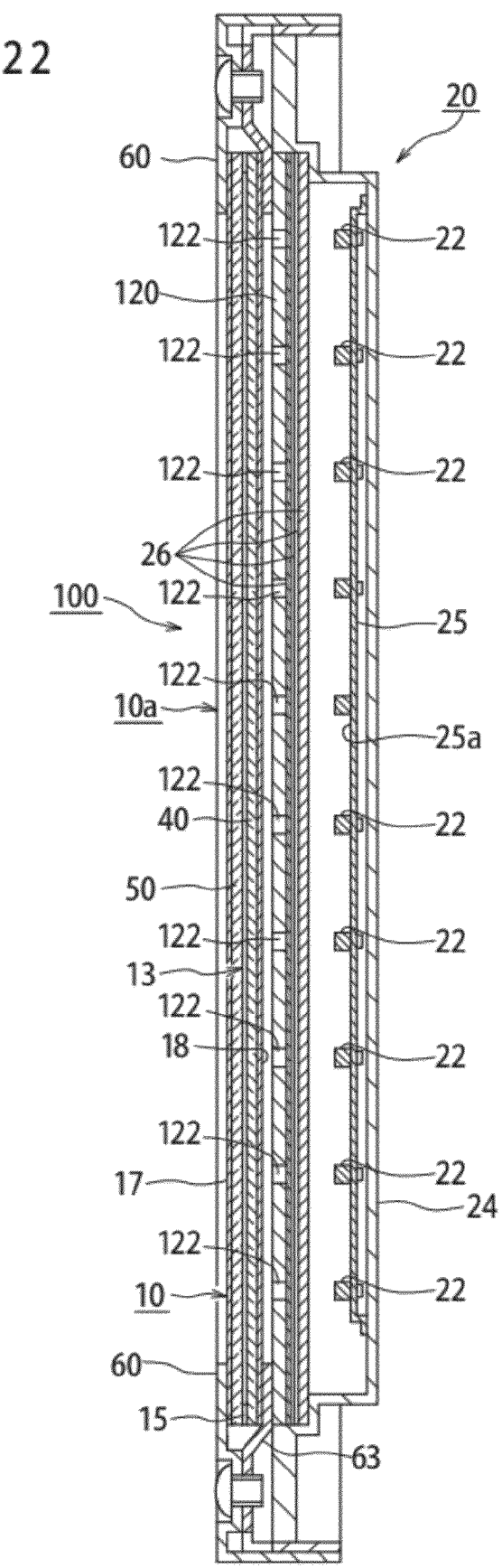
FIG. 22 is a cross-sectional view of a liquid crystal display device according to an embodiment of the present invention.

The first light receiving sensors 122 may be located between the liquid crystal panel 10 and the backlight unit 20. In this case, the first light receiving sensors 122 are not directly provided in the liquid crystal panel 10 or the backlight unit 20. Therefore, the first light receiving sensors 122 can be provided without changing the structure of the liquid crystal panel 10 or the backlight unit 20. In a specific example in which the first light receiving sensors 122 are located between the liquid crystal panel 10 and the backlight unit 20, as shown in FIG. 22, the first light receiving sensors 122 are preferably located in a light receiving sensor supporting member 120 held between the liquid crystal panel 10 and the backlight unit 20. Preferably, the light receiving sensor supporting member 120 is formed of a light-transmissive transparent plate, and an optical sheet 26 held between the liquid crystal panel 10 and the backlight unit 20 may be used as the light receiving sensor supporting member 120. When the light receiving sensor supporting member 120 is used, the first light receiving sensors 122 can be located at positions where the first light receiving sensors 122 cannot be located if being provided in the liquid crystal panel 10 or the backlight unit 20. Therefore, the freedom of layout of the first light receiving sensors 122 can be increased.

In the case where the first light receiving sensors 122 are located by use of the light receiving sensor supporting member 120, a plurality of light receiving sensor supporting members 120 having the first light receiving sensors 122 located in different patterns can be prepared. In the case where, for example, the first light receiving sensors 122 are located inside the liquid crystal panel 10, the structure of another element of the liquid crystal panel 10 may need to be changed in order to locate the first light receiving sensors 122. By contrast, in the case where the plurality of light receiving sensor supporting members 120 having the first light receiving sensors 122 located in different patterns are prepared, the positioning arrangement of the first light receiving sensors 122 can be changed merely by replacing the light receiving sensor supporting member 120. Therefore, the locations of the first light receiving sensors 122 can be easily changed in accordance with the application of the liquid crystal display device 100 (for a TV receiver, for an information display, etc.).

<Modification Example of the Backlight Unit 20>

The backlight unit 20 only needs to include the plurality of irradiation sections 22 for irradiating the rear surface of the liquid crystal panel 10 with illumination light, and there is no other limitation. Hereinafter, a modification example of the backlight unit 20 will be described.

Figure 23:
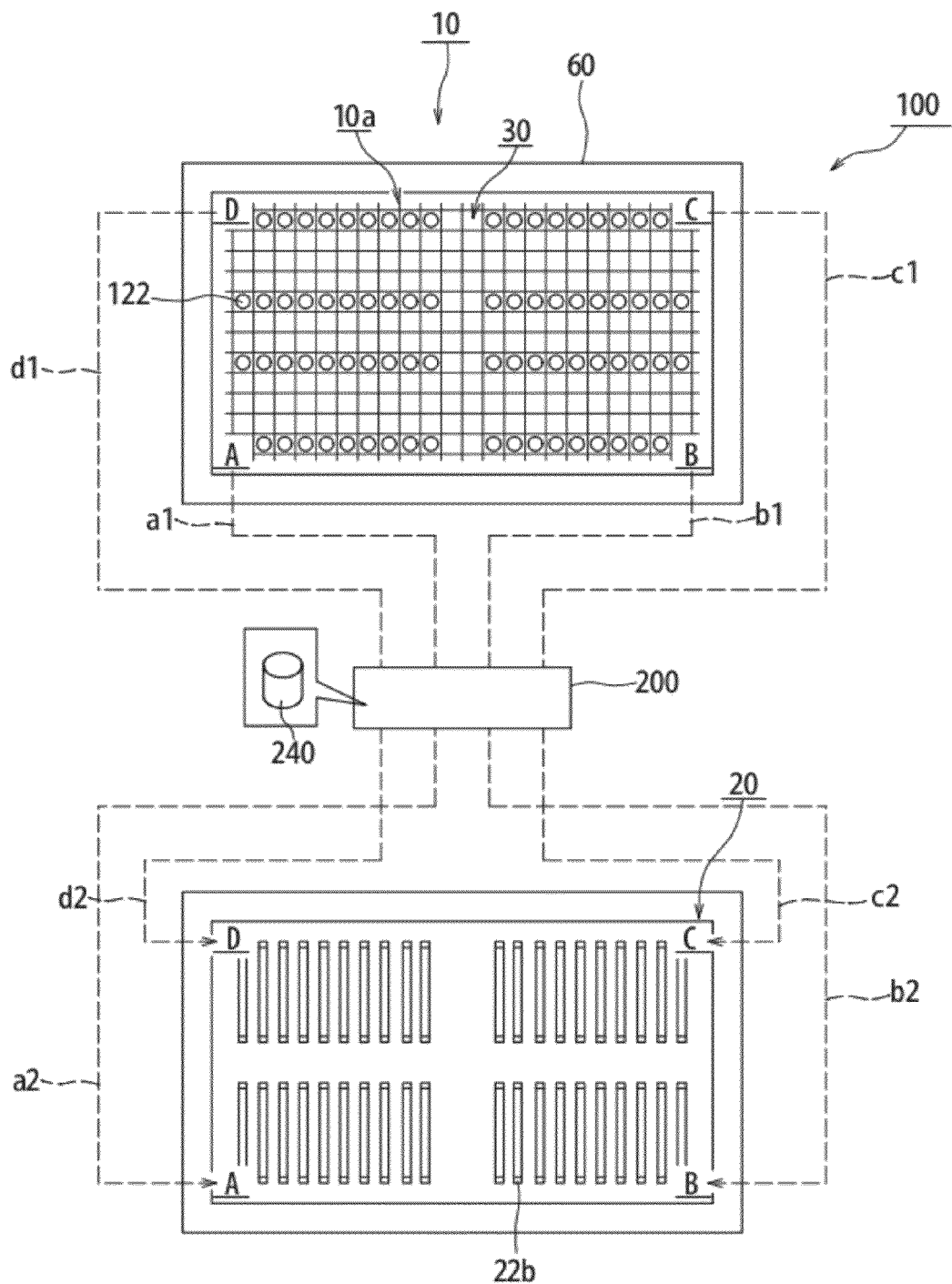
FIG. 23 is a block diagram schematically showing a liquid crystal display device according to an embodiment of the present invention.

As shown in FIG. 23, the irradiation sections 22 may be formed of, for example, a plurality of linear light sources 22b (e.g., cold cathode fluorescent lamps: CCFLs). In this embodiment, the cold cathode fluorescent lamps 22b are located in parallel in the backlight chassis 24. Preferably, the first light receiving sensors 122 are located along the linear light sources 22b as seen in a plan view of the liquid crystal panel 10. With such an arrangement, the light receiving information a1 through d1 on the external light directed to the display region 10a can be obtained in correspondence with the respective positions at which the linear light sources 22b are located. Therefore, the backlight control section 240 controls the irradiation sections 22 (linear light sources 22b) respectively based on the light receiving information a1 through d1 obtained in correspondence with the positions of the linear light sources 22b, and thus adjusts the brightness of the illumination light emitted by the backlight unit 20 independently for each area. As can be seen, even in the case where the irradiation sections 22 are formed of the plurality of linear light sources 22b, the brightness of the illumination light can be adjusted independently for each area, based on the light receiving information a1 through d1 on the external light directed to the display region 10a.

<Modification Examples of the Backlight Control Section 240>

The backlight control section 240 only needs to control the irradiation sections 22 respectively based on the light receiving information a1 through d1 obtained by the first light receiving sensors 122, and there is no other limitation. The specifics of control performed by the backlight control section 240 may be optionally modified. Hereinafter, modification examples of the control on the irradiation sections 22 performed by the backlight control section 240 will be described.

Figure 24:
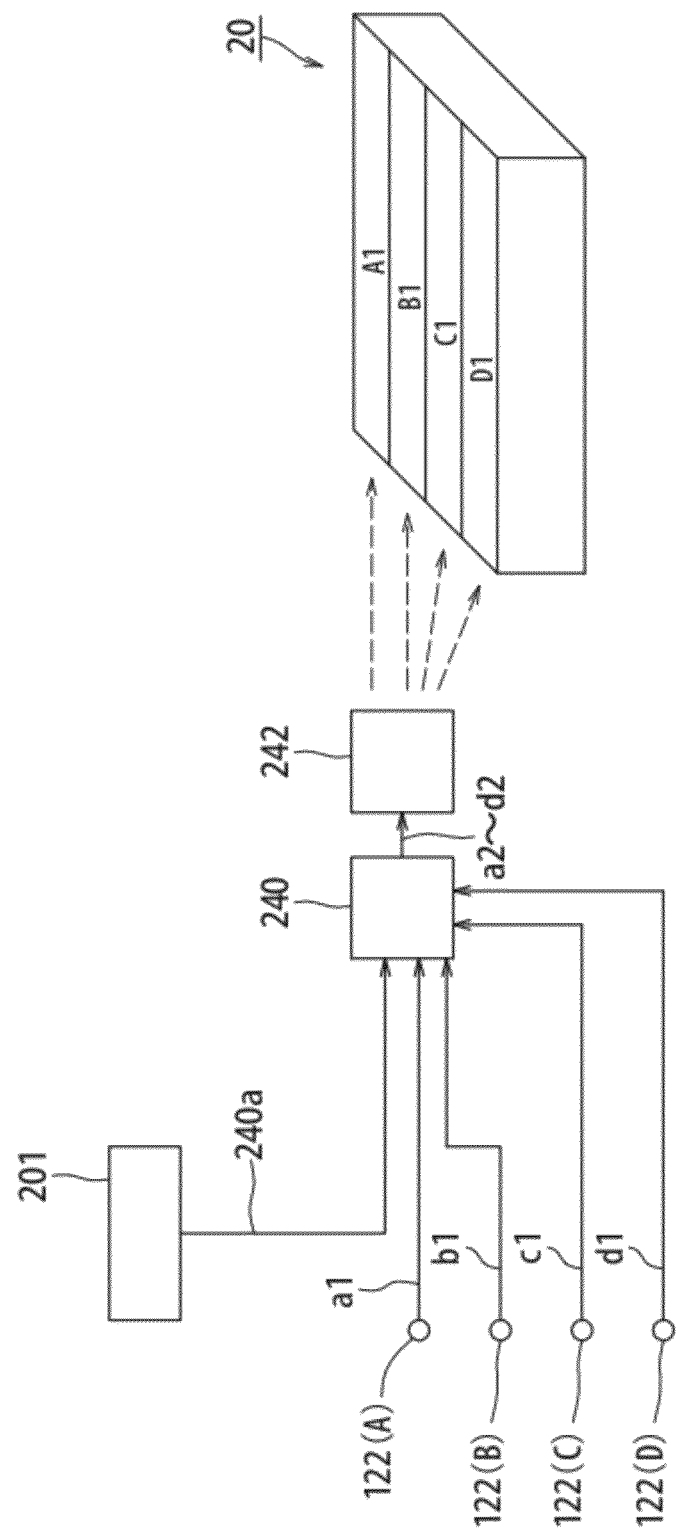
FIG. 24 is a block diagram schematically showing a liquid crystal display device according to an embodiment of the present invention.

The backlight control section 240 may control each of the plurality of irradiation sections 22 such that the brightness of the border between the plurality of areas A through D is changed step by step. In the case of, for example, the liquid crystal display device 100 having a structure as shown in FIG. 24, the backlight control section 240 creates the backlight control signals a2 through d2 based on the areas A through D where the irradiation sections 22 are located in addition to based on the light receiving information a1 through d1 obtained by the first light receiving sensors 122. Specifically, the backlight control section 240 corrects the backlight control signals a2 through d2 such that the brightness of the irradiation sections 22 in the vicinity of the border between the areas A through D is changed step by step. When the power to be put to the irradiation sections 22 (light emitting diodes 22a) is controlled based on the backlight control signals a2 through d2 created in this manner, the brightness of the border between the areas A through D is changed step by step. Owing to this, a phenomenon that the brightness of the irradiation sections 22 is conspicuously changed at the border between the areas A through D can be prevented.

It is preferable that the backlight control section 240 finds a difference between the light receiving information a1 through d1 obtained by first light receiving sensors 122 predefined as acting as a reference, among the first light receiving sensors 122, and the light receiving information a1 through d1 obtained by the other first light receiving sensors 122, and controls the irradiation sections 22 based on the difference in the light receiving information a1 through d1. In this case, it is preferable that the first light receiving sensors 122 acting as the reference are preset in the backlight control section 240. How to control the irradiation sections 22 based on the difference between the light receiving information a1 through d1 obtained by the first light receiving sensors 122 as the reference and the light receiving information a1 through d1 obtained by the other first light receiving sensors 122 may be preset in the backlight control sections 240. In this case, the backlight control section 240 can control the irradiation section 22 in the state where the luminance distribution of the external light directed to the areas A through D is accurately reflected.

The backlight control section 240 may find the difference in the light receiving information a1 through d1 obtained by certain first light receiving sensors 122 at a plurality of preset timings and control the corresponding irradiation sections 22 based on the difference in the light receiving information a1 through d1. In this case, it is preferable that a level of brightness of the irradiation sections 22 appropriate for the difference or the timing to adopt the light receiving information a1 through d1 obtained by the first light receiving sensors 122 is preset in the backlight control section 240. With such presettings, the backlight control section 240 can control the irradiation sections 22 in the state where the amount of over-time change of the light receiving information a1 through d1 obtained by the first light receiving sensors 122 is accurately reflected.

When the external light directed to the display region 10a is temporarily blocked by, for example, a person passing in front of the liquid crystal display device, the light receiving information a1 through d1 obtained by the first light receiving sensors 122 is temporarily changed significantly. If the irradiation sections 22 are controlled based on the light receiving information a1 through d1 obtained at this time, the brightness of the illumination light is unnecessarily adjusted. If such an unnecessary adjustment is made, the displayed image may be caused a defect of, for example, flickering.

In order to avoid such a defect, it is preferable that when constant light receiving information a1 through d1 is obtained by the first light receiving sensors 122 continuously for a predefined time duration, the backlight control section 240 controls the irradiation sections 22 respectively based on the constant light receiving information a1 through d1. With such a structure, even when the brightness of the external light is temporarily changed significantly, the brightness of the illumination light is prevented from being adjusted unnecessarily and thus the displayed image is suppressed from flickering.

Figure 25:
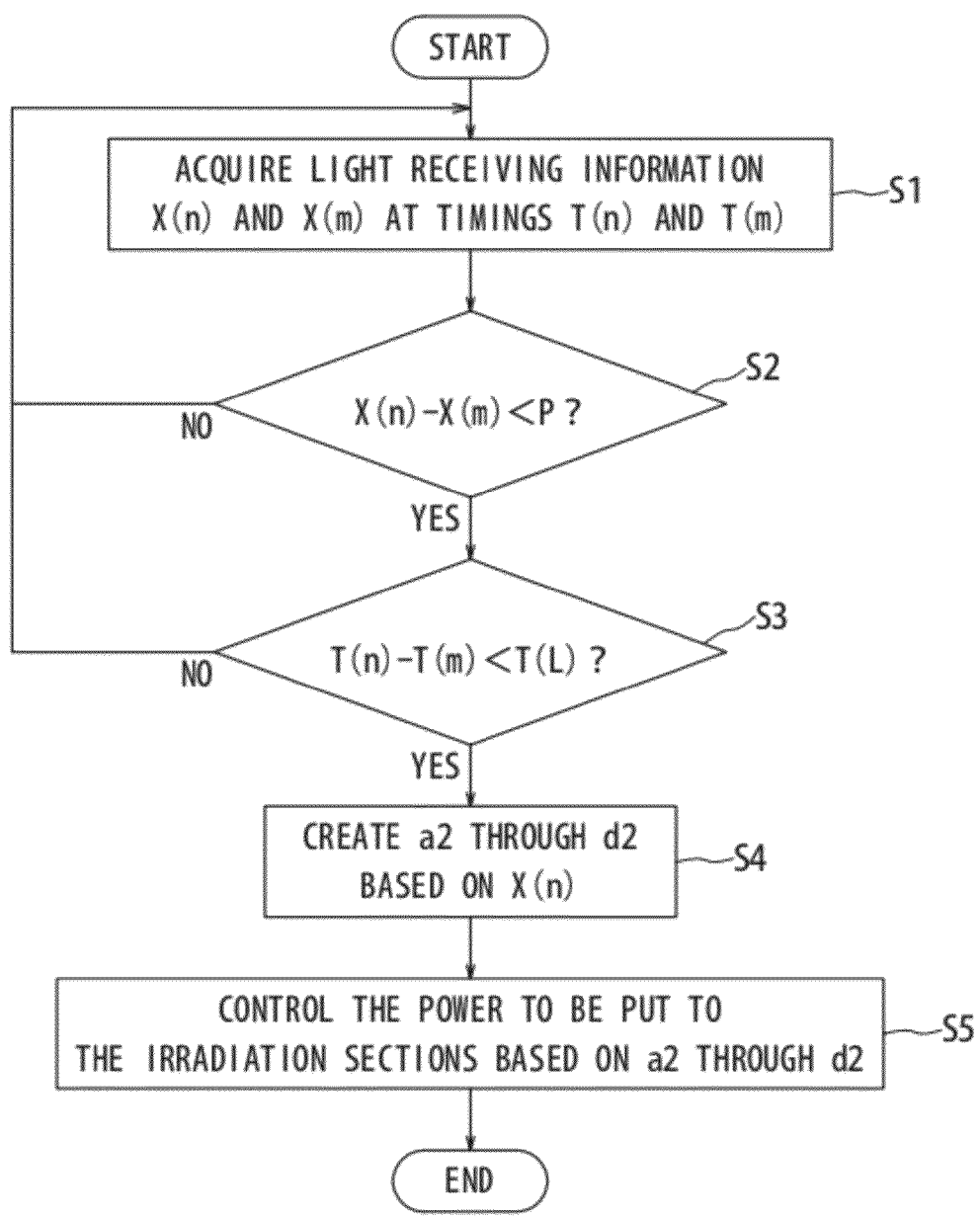
FIG. 25 is a flowchart schematically showing control performed by a backlight control section.

Hereinafter, control performed by the backlight control section 240 structured as described above will be described in detail. FIG. 25 is a flowchart schematically showing the control performed by the backlight control section 240.

As shown in FIG. 25, the backlight control section 240 acquires light receiving information $X(n)$ and $X(m)$ at predefined different timings $T(n)$ and $T(m)$ (S1). Herein, it is preferable that the timings $T(n)$ and $T(m)$ to acquire the light receiving information $X(n)$ and $X(m)$ such that a temporary change of the external light, for example, a change in the case where a person passes in front of the liquid crystal display device, is excluded. In order to check whether or not the light receiving information $X(n)$ and $X(m)$ obtained by the first light receiving sensors 122 is constant, the backlight control section 240 determines "whether or not the change amount $(X(n)-X(m))$ of the light receiving information obtained by the first light receiving sensors 122 is within a predefined value (P); i.e., whether or not $(X(n)-X(m)<P)$" (S2). This determination processing (S2) is performed to determine whether or not a drastic change has been caused to the light receiving information as in the case where the first light receiving sensors 122 are temporarily shadowed. Accordingly, it is preferable that the "predefined value (P)" in the determination processing (S2) is set to a value appropriate to determine whether or not a drastic change has been caused to the light receiving information $X(n)$ and $X(m)$. When, in the determination processing S2, the change amount $(X(n)-X(m))$ of the light receiving information is larger than the predefined value (P) (NO), the control section 200 repeats the processing of (S1). By contrast, when the change amount $(X(n)-X(m))$ of the light receiving information is within the predefined value (P) (YES), the backlight control section 240 performs the next determination processing (S3).

In the next determination processing (S3), it is determined "whether or not the light receiving information $X(n)$ acquired in S1 has been obtained continuously for a predefined time duration T(L), i.e., whether or not (T(n)−T(m)<T(L))". This determination processing (S3) is performed for the purpose of excluding a case where the drastic change caused to the light receiving information X(n) and X(m) is temporary. Accordingly, it is preferable that the "predefined time duration T(L)" in the determination processing (S3) is set to a value appropriate to this purpose. When the light receiving information X(n) obtained in S1 was not obtained continuously for the predefined time duration T(L) (NO), the control section 200 repeats the processing of S1. By contrast, when the light receiving information X(n) has been obtained continuously for the predefined time duration T(L) (YES), the backlight control section 240 performs the processing in step S4 and in step S5 sequentially. By the processing in step S4, the backlight control signals a2 through d2 are created based on the light receiving information X(n) obtained in S1. By the processing in step S5, the irradiation sections 22 are controlled independently for each of the areas A through D, based on the backlight control signals a2 through d2 created in step S4.

It is preferable that in the backlight control section 240, a threshold value is predefined for the light receiving information a1 through d1 obtained by the first light receiving sensors 122. The backlight control section 240 compares the light receiving information a1 through d1 obtained by the first light receiving sensors 122 against the threshold value. It is preferable that when, as a result of the comparison, any information among the light receiving information a1 through d1 exceeds the threshold value, the backlight control section 240 controls the plurality of irradiation sections 22 such that an area among the areas A through D corresponding to such information is irradiated with illumination light brighter than the illumination light directed to the other areas. According to the liquid crystal display device 100 having such a structure, an area irradiated with bright external light exceeding the threshold value can be irradiated with illumination light brighter than the illumination light directed to the other areas. In this manner, the apparent luminance of the displayed image can be corrected more appropriately.

Figure 26:
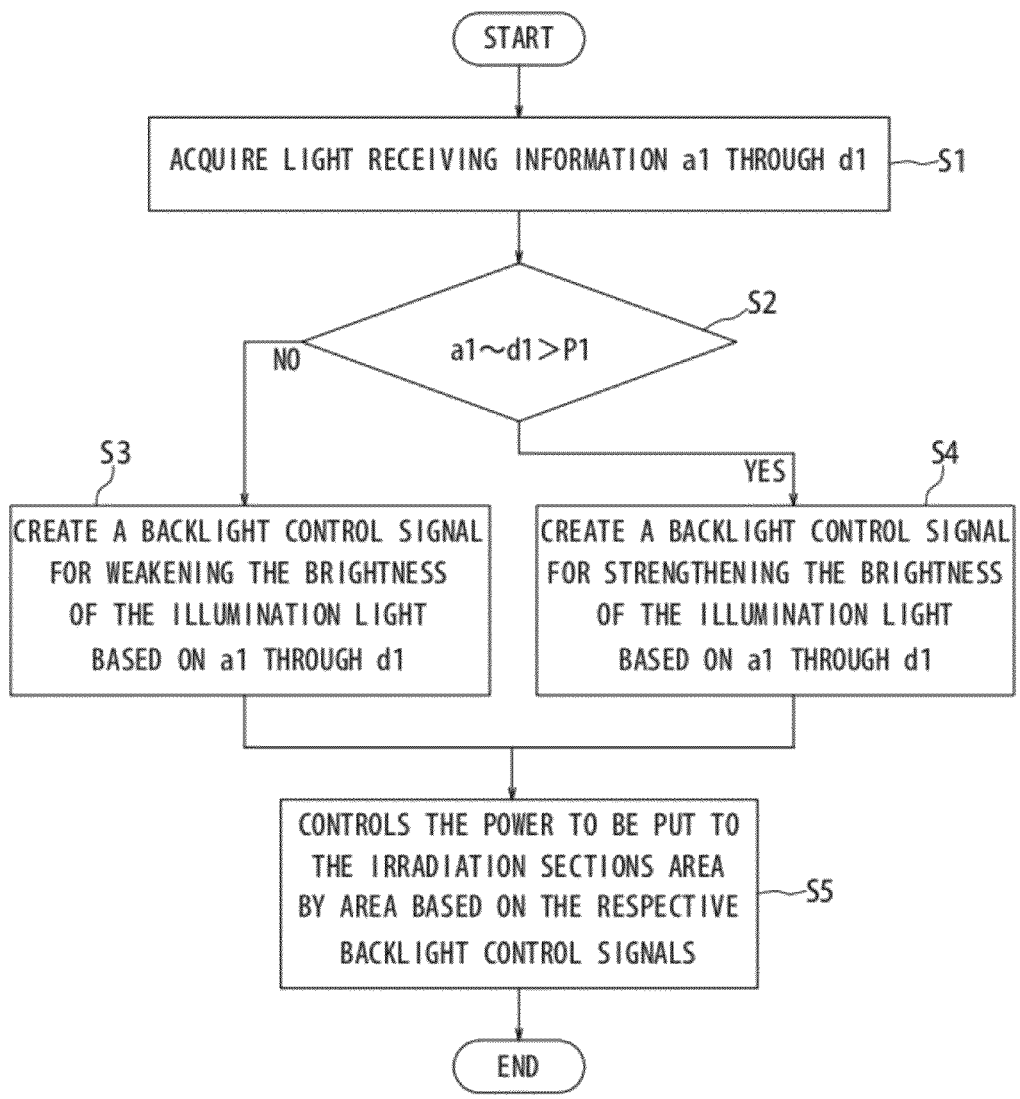
FIG. 26 is a flowchart schematically showing control performed by a backlight control section.

Hereinafter, control performed by the backlight control section 240 structured as described above will be described in detail. FIG. 26 is a flowchart schematically showing the control performed by the backlight control section 240.

As shown in FIG. 26, the backlight control section 240 acquires light receiving information a1 through d1 obtained by the first light receiving sensors 122 (S1). In the backlight control section 240, a constant threshold value P1 is predefined for the light receiving information a1 through d1. The backlight control section 240 determines "whether or not each piece of the light receiving information a1 through d1 is larger than the threshold value P1, i.e., whether or not (a1 through d1>P1) (S2). When any piece of information among the light receiving information a1 through d1 is smaller than the threshold value P1, the backlight control section 240 creates a backlight control signal which weakens the brightness of the illumination light directed to the area corresponding to such a piece of information (S3). When a piece of information among the light receiving information a1 through d1 is larger than the threshold value P1, the backlight control section 240 creates a backlight control signal which strengthens the brightness of the illumination light directed to the area corresponding to such a piece of information (S4). The power input section 206 controls the power to be put to the light emitting diodes 22a (irradiation sections 22) independently for each of the areas A through D, based on the backlight control signals a2 through d2 (S5).

Figure 27:
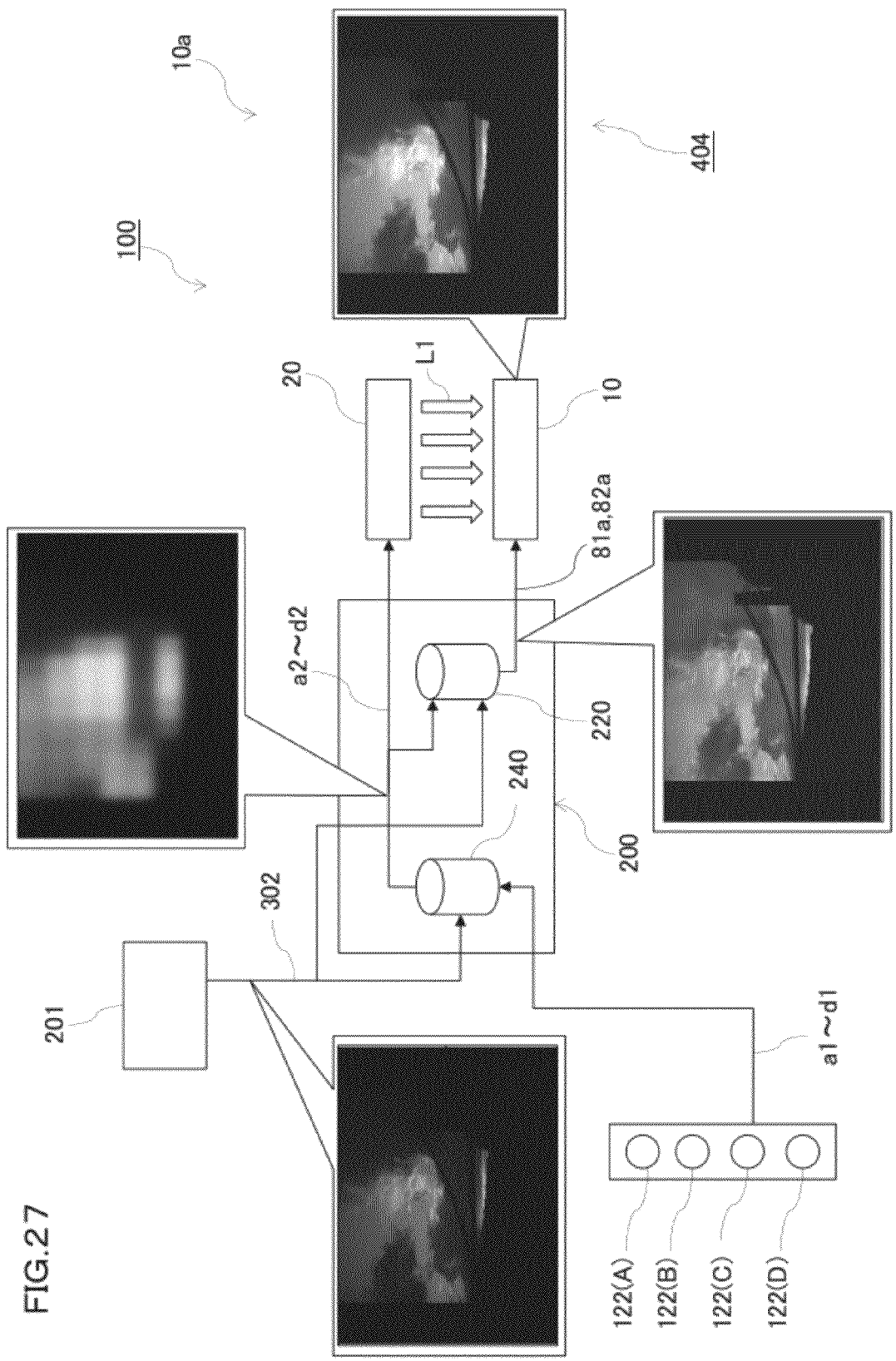
FIG. 27 is a block diagram of a liquid crystal display device using area-active processing.
Figure 28:
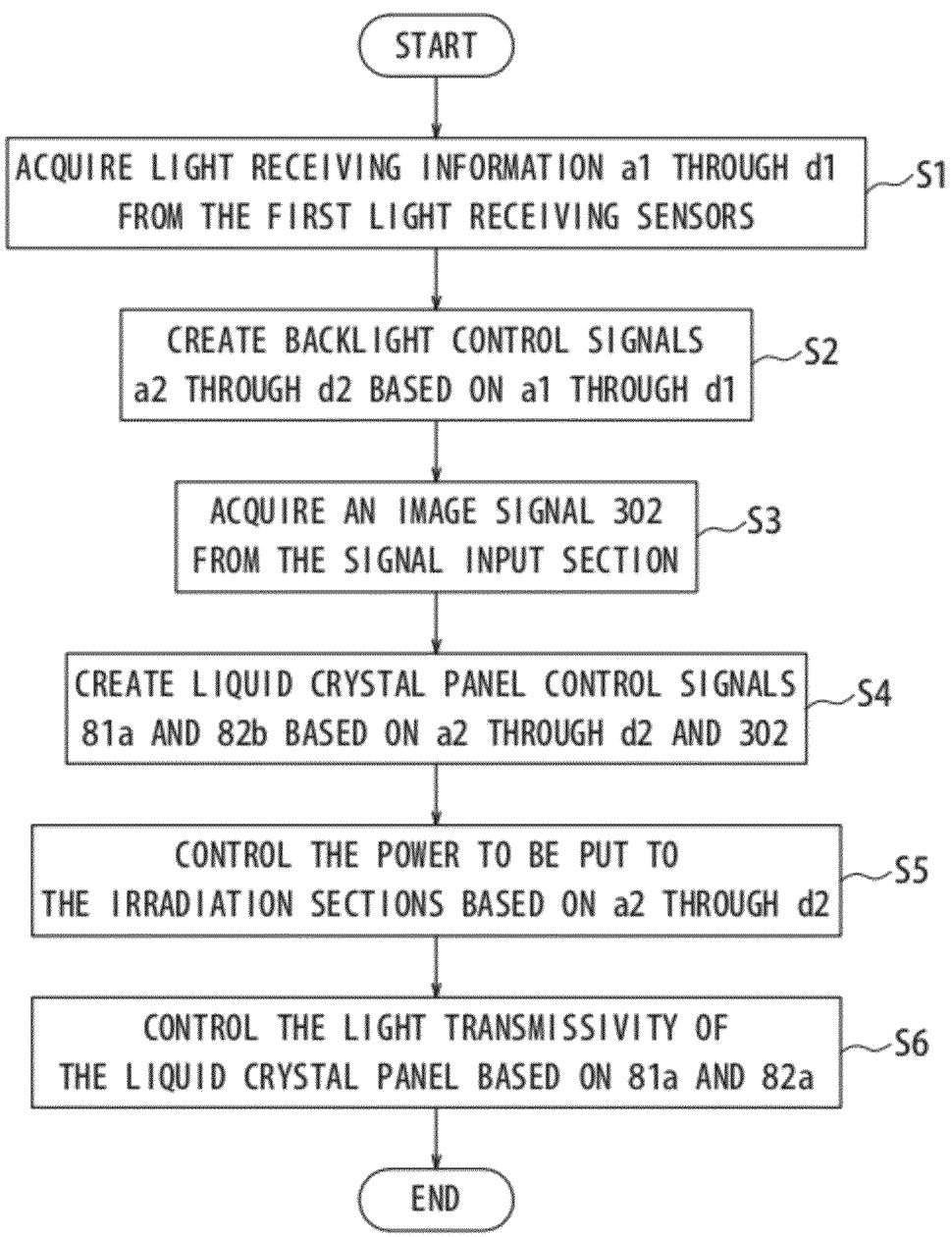
FIG. 28 schematically shows control performed by a liquid crystal display device using area-active processing.

The liquid crystal display device 100 may use area-active processing. Hereinafter, a method for controlling the liquid crystal display device 100 using the area-active processing will be described with reference to FIG. 27 and FIG. 28. FIG. 27 is a block diagram of the liquid crystal display device 100 using the area-active processing. FIG. 28 is a flowchart schematically showing control performed on the liquid crystal display device 100 using the area-active processing. In FIG. 27, the image signal 302, the backlight control signals 402, and the liquid crystal panel control signals 403 are visually shown.

The liquid crystal display device 100 includes the signal input section 201, to which the image signal 302 is to be input. Herein, as shown in FIG. 27, the image signal 302 represents an image to be displayed on the display region 10a. The image signal 302 is sent from the signal input section 201 to the liquid crystal panel control section 220. The liquid crystal panel control section 220 controls the liquid crystal panel 10 based on the image signal 302 to adjust the light transmissivity of the display region 10a.

The signal input section 201 sends the image signal 302 to the backlight control section 240 in addition to the liquid crystal panel control section 220. To the backlight control section 240, the image signal 302 is sent in addition to the light receiving information a1 through d1 obtained by the first light receiving sensors 122 (S1 and S2 in FIG. 28). The backlight control section 240 creates the backlight control signals a2 through d2 for respectively controlling the irradiation sections 22 based on the light receiving information a1 through d1 and the image signal 302 (S3). The created backlight control signals a2 through d2 are sent to the power input section 206 and also to the liquid crystal panel control section 220. The liquid crystal panel control section 220 adjusts the light transmissivity of the display region 10a independently for each of the areas A through D, based on the backlight control signals a2 through d2 in addition to based on the image signal 302. Specifically, the liquid crystal panel control section 220 creates the liquid crystal panel control signals 81a and 82a based on the backlight control signals a2 through d2 and the image signal 302 (S4). The backlight control section 240 controls the irradiation sections 22 based on the backlight control signals a2 through d2 (S5), to adjust the brightness of the illumination light directed to the rear surface of the liquid crystal panel 10 (L1 in FIG. 27) independently for each of the areas A through D. The backlight control section 240 also controls the liquid crystal panel 10 based on the liquid crystal panel control signals 81a and 82a reflecting the brightness of this illumination light (S6) to adjust the light transmissivity of the liquid crystal panel 10.

According to the liquid crystal display device 100 having such a structure, the light transmissivity of the display region 10a is adjusted independently for each of the areas A through D, based on the backlight control signals a2 through d2 in addition to based on the image signal 302. In this manner, the light transmissivity of the display region 10a can be adjusted in the state where the external light directed to the display region 10a is accurately reflected. Therefore, reduction of the contrast caused by the external light can be compensated for independently for each of the prescribed areas, and the dynamic range of the image to be displayed on the display region 10a can be enlarged to display an image having a high contrast, a wide viewing angle and color reproducibility of a wide range of colors.

Figure 29:
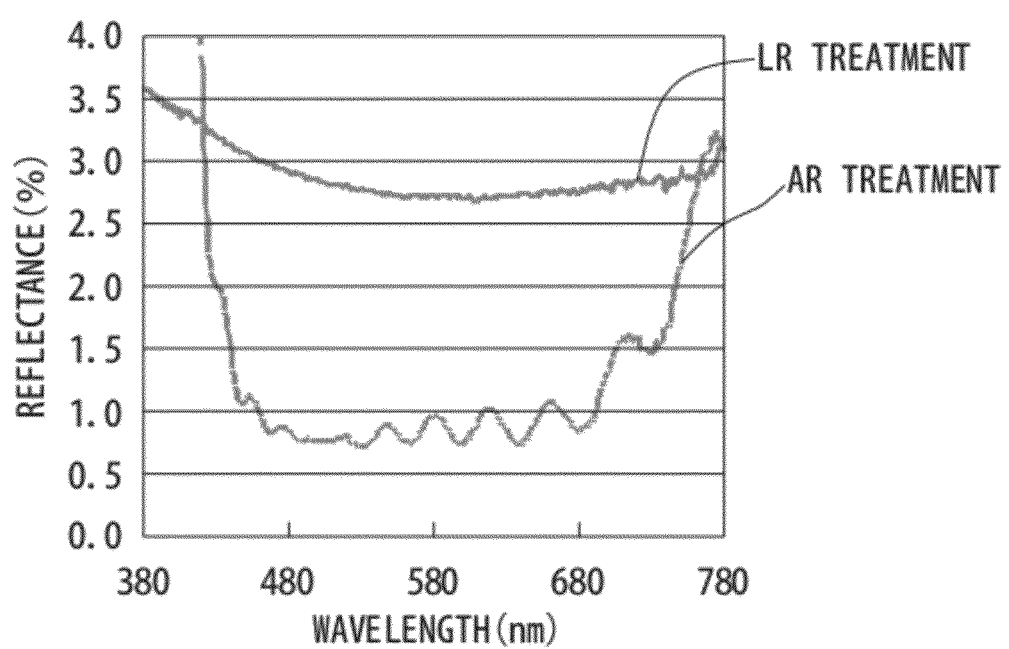
FIG. 29 is a graph schematically showing wavelength ranges of external light reflected by a surface of a liquid crystal panel.

A part of the external light directed to the display region 10a is reflected by the front surface of the liquid crystal panel 10. At this point, an image of an object existing around the liquid crystal panel 10 may be reflected in the display region 10a to make the displayed image difficult to see. In order to prevent such a phenomenon, the front surface of the liquid crystal panel 10 is occasionally subjected to reflection preventive treatment, such as AR (anti-reflection) treatment of stacking a thin film formed of a material having a different refractive index from that of the front surface of the liquid crystal panel 10, LR (low-reflection) treatment or the like. However, when such reflection preventive treatment is performed on the surface of the liquid crystal panel 10, light of only a specific wavelength tends to be reflected due to the nature of the thin film stacked on the surface of the liquid crystal panel 10. When this occurs, the light of such a specific wavelength may be mixed to the displayed image, and as a result, the displayed image may be colored. Specifically, with the liquid crystal panel 10 subjected to the AR treatment or the LR treatment as shown in FIG. 29, the reflectance of a blue component (wavelength: 480 nm or shorter) or a red component (wavelength: 610 nm or longer) is higher than the reflectance of a green component (wavelength: 480 to 610 nm). Therefore, the image displayed on the liquid crystal panel 10 subjected to the AR treatment or the LR treatment may possibly be colored blue or red.

In order to avoid this, it is preferable that the color tone of the external light to be reflected by the front surface of the display region 10a is preset in the backlight control section 240. It is preferable that the backlight control section 240 is structured to control the point light sources 22a of each of a plurality of colors, such that the color tone of the illumination light emitted by the irradiation sections 22 is adjusted in accordance with the color tone of the external light to be reflected by the surface of the display region 10a. According to the liquid crystal display device 100 having such a structure, the point light sources 22a of each of the plurality of colors are controlled in accordance with the color tone of the external light to be reflected by the surface of the display region 10a, and thus an image can be displayed on the display region 10a with light having the plurality of colors mixed at an appropriate ratio.

Hereinafter, the liquid crystal display device 100 having such a structure will be described more specifically. The liquid crystal panel 10 of the liquid crystal display device 100 has an AR-treated front surface. In the backlight control section 240, the color tone of the external light to be reflected by the front surface of the display region 10a is preset based on the color tone of the light to be reflected by the AR-treated liquid crystal panel 10. With the AR-treated liquid crystal panel 10, for example, as shown in FIG. 29, the reflectance of the blue light and the red light is higher. It is preferable that in backlight control section 240, information that the external light to be reflected by the front surface of the display region 10a contains a large amount of blue components and a large amount of red components is set. The backlight control section 240 controls the power to be put to each of the point light sources 22a based on the color tone of the reflected light, of which blue light and red light are predefined to be reflected at a high reflectance, in addition to based on the light receiving information obtained by the first light receiving sensors 122. In this case, the backlight control section 240 controls the power to be put to each of the light emitting diodes 22a, such that the luminance of the green light emitting diodes 22a is higher than the luminance of the red and blue light emitting diodes 22a.

So far, the liquid crystal display device 100 according to one embodiment of the present invention has been described. The present invention is not limited to the above-described embodiment. Now, a liquid crystal display device according to another embodiment of the present invention will be described. Regarding the overall structure of the liquid crystal display device 100, refer to FIG. 22 when necessary.

EXAMPLE 2

Figure 30:
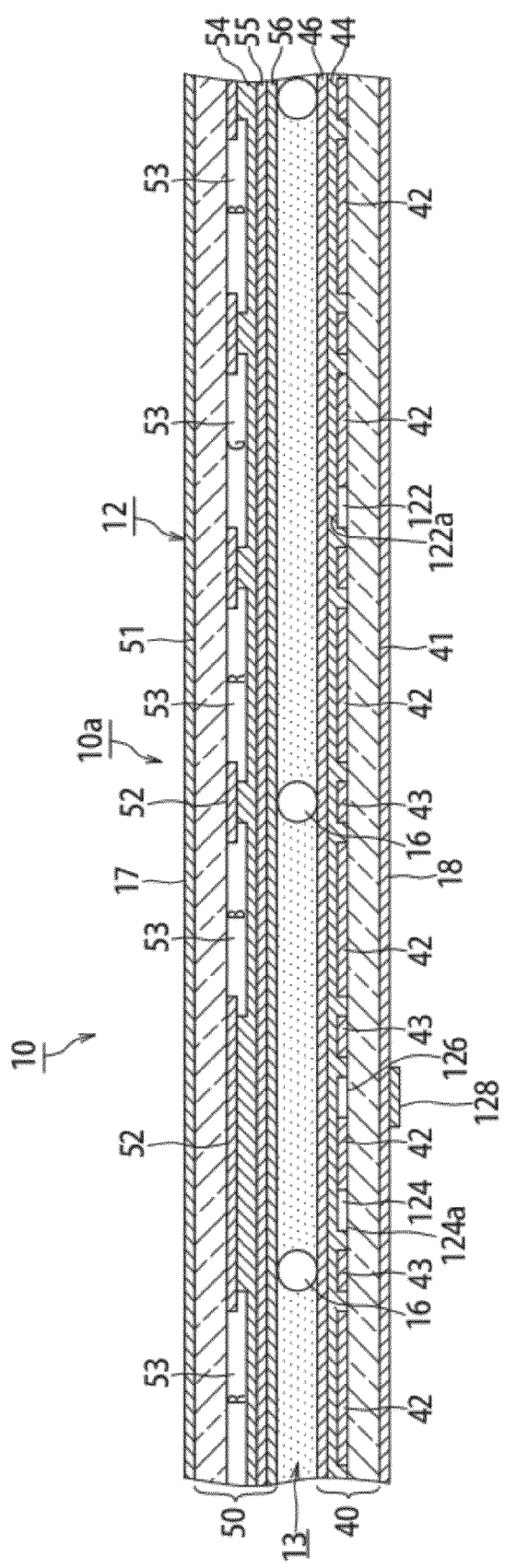
FIG. 30 is an enlarged cross-sectional view of a liquid crystal panel.

As shown in FIG. 30, the liquid crystal display device 100 (see FIG. 22) may include second light receiving sensors 124 in addition to the first light receiving sensors 122. The second light receiving sensors 124 are located so as to receive the illumination light directed to the rear surface of the liquid crystal panel 10 from the backlight unit 20 (see FIG. 22), at a plurality of positions in the display region 10a. Hereinafter, an example of the liquid crystal display device 100 including the second light receiving sensors 124 will be described.

As shown in FIG. 30, the second light receiving sensors 124 may be provided in, for example, the pixel electrodes 42 of the array substrate 40, like the first light receiving sensors 122. In this case, it is preferable that the second light receiving sensors 124 are located such that light receiving sections 124a thereof are directed toward the backlight unit 20 (see FIG. 22) side. With such an arrangement, the illumination light from the irradiation sections 22 (see FIG. 22) is directed to the receiving sections 124a of the second light receiving sensors 124, and thus light receiving information a3 through d3 on the illumination light is obtained by the second light receiving sensors 124.

It is preferable that as shown in FIG. 30, the second light receiving sensors 124 are located in the area where the black matrix 52 is formed as seen in a plan view of the liquid crystal panel 10, closer to the backlight unit 20 than the black matrix 52. With such an arrangement, the second light receiving sensors 124 can receive the illumination light from the backlight unit 20 (see FIG. 22) without receiving the external light directed to the display region 10a.

An example of positioning arrangement of the second light receiving sensors 124 will be described.

In the case where, for example, the coloring layers 53 of the RGB three colors are formed repeatedly in the front-side substrate (color filter substrate 50) of the liquid crystal panel 10, the green coloring layers 53(G), among the coloring layers 53 of the RGB three colors, may be replaced with the black matrix 52 at a prescribed frequency. In the areas where the green coloring layers 53(G) are formed as seen in a plan view of the liquid crystal panel 10, the first light receiving sensors 122 may be located, and in the areas where the green coloring layers 53(G) are replaced with the black matrix 52 as seen in a plan view of the liquid crystal panel 10, the second light receiving sensors 124 may be located.

In this example, the coloring layers 53 of the RGB three colors are formed repeatedly in the front-side substrate 50 (color filter substrate 50) of the liquid crystal panel 10. The first light receiving sensors 122 are located so as to receive the external light, directed to the display region 10a, through the coloring layers 53(G). Among the coloring layers 53 of the RGB three colors formed repeatedly, the green coloring layers 53(G) are replaced with the black matrix 52 at a prescribed frequency; namely, a part of the green coloring layers 53(G) is replaced with the black matrix 52. The second light receiving sensors 124 are located in the areas where the green coloring layers 53(G) are replaced with the black matrix 52 as seen in a plan view of the liquid crystal panel 10. In this case, the first light receiving sensors 122 receive the external light transmitted through the green coloring layers 53(G). By contrast, the second light receiving sensors 124 are located in the areas where the green coloring layers 53(G) are replaced with the black matrix 52, and therefore are blocked from the external light. Namely, the light receiving sections 124a of the second light receiving sensors 124 do not receive the external light. Therefore, the light receiving information a3 through d3 obtained by the second light receiving sensors 124 does not contain the light receiving information on the external light. In the meantime, the second light receiving sensors 124 receive the illumination light from the backlight unit 20, and therefore can output the light receiving information a3 through d3 obtained from the illumination light emitted by the backlight unit 20 (see FIG. 22). The positions of the second light receiving sensors 124 are not limited to the above-mentioned positions and can be appropriately selected.

Figure 31:
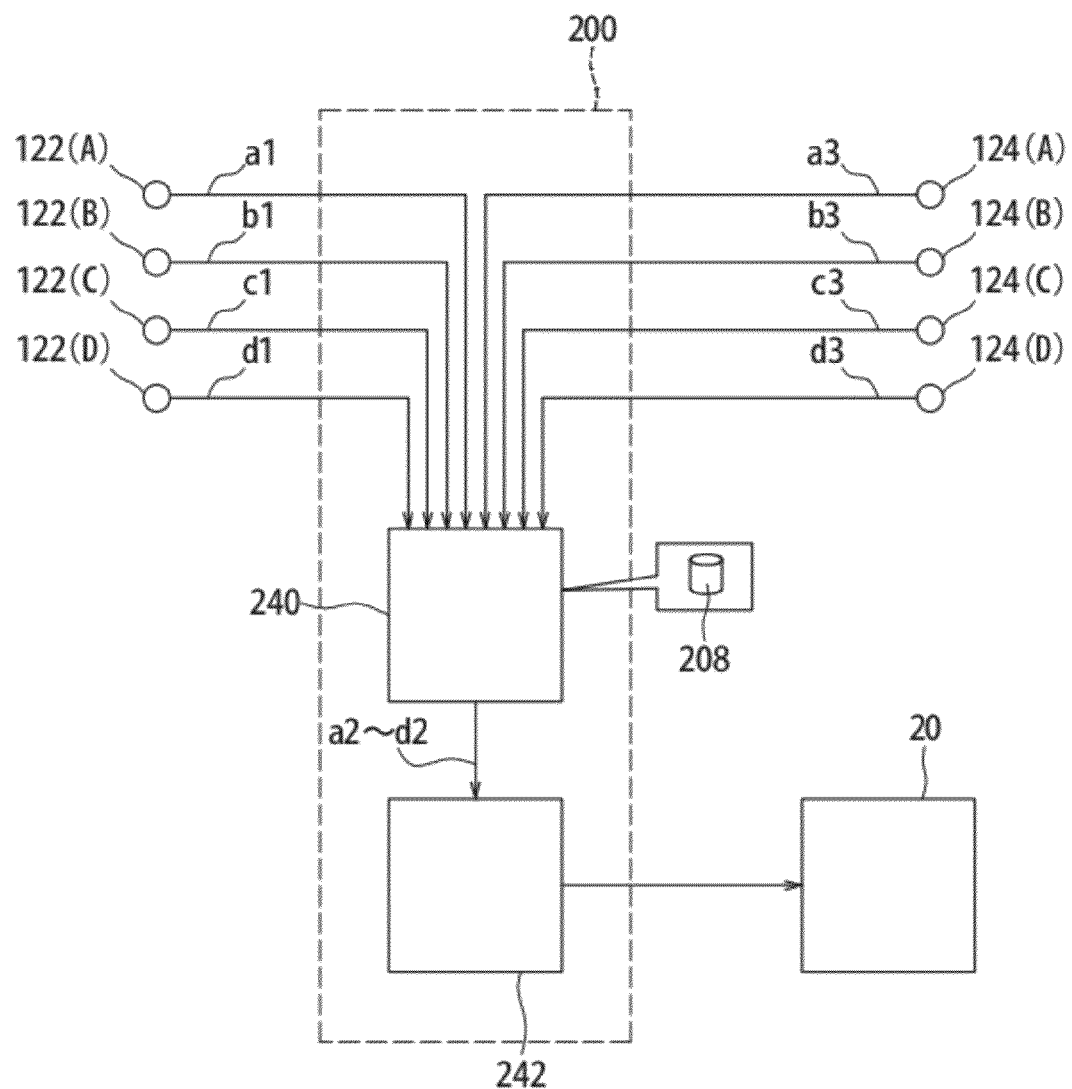
FIG. 31 is a block diagram schematically showing a liquid crystal display device according to an embodiment of the present invention.

For example, FIG. 31 is a block diagram of such control. As shown in FIG. 31, the light receiving information a3 through d3 on the illumination light emitted by the backlight unit 20, obtained by the second light receiving sensors 124, is sent to the backlight control section 240. It is preferable that the backlight control section 240 controls the irradiation sections 22 (see FIG. 22) respectively based on the light receiving information a3 through d3 obtained by the second light receiving sensors 124 in addition to based on the light receiving information a1 through d1 obtained by the first light receiving sensors 122. For example, the backlight control section 240 can make a correction of removing the influence, caused by the illumination light emitted by the backlight unit 20 (see FIG. 22), from the light receiving information a1 through d1 obtained by the first light receiving sensors 122 based on the light receiving information a3 through d3 on the illumination light of the backlight unit 20 obtained by the second light receiving sensors 124. It is preferable that the backlight control section 240 creates the backlight control signals a2 through d2 as a result of such a correction. The backlight control signals a2 through d2 created in this manner are sent to the power input section 242 to control the power to be put to each of the irradiation sections 22 of the backlight unit 20 (see FIG. 22). In this manner, the influence caused by the illumination light emitted by the backlight unit 20 can be removed from the light receiving information a1 through d1 obtained by the first light receiving sensors 122.

According to the liquid crystal display device 100 having such a structure, as shown in FIG. 22 and FIG. 30, the control on the irradiation sections 22 can be corrected based on the light receiving information a3 through d3 obtained by the second light receiving sensors 124. The irradiation sections 22 of the backlight unit 20, even when being controlled based on the same backlight control signals a2 through d2, may generate illumination light having different levels of brightness as a result of being influenced by the change of the ambient temperature, the over-time change or the like. According to this liquid crystal display device 100, even when the irradiation sections 22 are influenced by the change of the ambient temperature, the over-time change or the like, the irradiation sections 22 can be appropriately controlled respectively based on the light receiving information a1 through d1 obtained by the first light receiving sensors 122 while the brightness of each of the irradiation sections 22 is corrected based on the corresponding information among the light receiving information a3 through d3 on the illumination light.

It is preferable that the backlight control section 240 controls the irradiation sections respectively based on, for example, a difference between the light receiving information a1 through d1 obtained by the first light receiving sensors 122 and the light receiving information a3 through d3 obtained by the second light receiving sensors 124. In this case, the difference represents a result of excluding the light receiving information a3 through d3 on the illumination light from the light receiving information a1 through d1 obtained by the first light receiving sensors 122, and represents accurate light receiving information on the external light directed to the display region 10a. According to this liquid crystal display device 100, the irradiation sections 22 can be each controlled based on the accurate light receiving information. Therefore, the illumination light can be adjusted in the state where the brightness of the external light directed to the display region 10a is accurately reflected.

It is preferable that the liquid crystal display device 100 including the second light receiving sensors 124 includes an error current calculation section 208. The error current calculation section 208 compares the light receiving information a3 through d3 obtained by the second light receiving sensors 124 at a plurality of predefined timings, and thus calculates currents generated in the light receiving sensors by an external factor other than the light. It is preferable that the "plurality of timings" are set a plurality of times within a time duration until the irradiation sections 22 are controlled (within a time duration in which the brightness of the illumination light is kept constant). With the liquid crystal display device 100, first, the light receiving information a3 through d3 on the illumination light is acquired by the second light receiving sensors 124. The error current calculation section 208 compares the light receiving information a3 through d3 obtained by the second light receiving sensors 124 at the plurality of predefined timings. At the timing when the light receiving information a3 through d3 is acquired, the brightness of the illumination light is maintained. Therefore, if the light receiving information a3 through d3 obtained by the second light receiving sensors 124 is changed, the value representing the amount of such a change corresponds to the current generated in each of the light receiving sensors by an external factor other than the light.

The backlight control section 240 controls the irradiation sections 22 respectively based on the currents, which are generated in the second light receiving sensors 124 by an external factor other than the light and are calculated by the error current calculation section 208, in addition to based on the light receiving information a1 through d1 obtained by the first light receiving sensors 122. In this manner, the irradiation sections 22 can be accurately controlled in the state where the error caused by the external factor other than the light is excluded.

EXAMPLE 3

As shown in FIG. 22 and FIG. 30, the liquid crystal display device 100 may include third light receiving sensors 126. The third light receiving sensors 126 are blocked from the external light directed to the display region 10a and the illumination light emitted by the backlight unit 20. Hereinafter, an example of the liquid crystal display device 100 including the third light receiving sensors 126 will be described.

In this example, as shown in FIG. 30, the third light receiving sensors 126 are located in the area where the black matrix 52 is formed as seen in a plan view of the liquid crystal panel 10, closer to the backlight unit than the black matrix 52. In addition, in this embodiment, light blocking members 128 are located so as to cover the third light receiving sensors 126 as seen in a plan view of the liquid crystal panel 10. The light blocking members 128 are located closer to the backlight unit 20 than the third light receiving sensors 126, and are formed of a light-blocking material. The positions of the third light receiving sensors 126 can be appropriately selected, like those of the first light receiving sensors 122 and the second light receiving sensors 124.

As described above, the liquid crystal display device 100 in this example includes the third light receiving sensors 126 blocked from the external light directed to the display region 10a and from the external light emitted by the backlight unit 20. In light receiving sensors having a photoelectromotive force, a minute inrush current is generated by an external factor other than light, for example, the ambient temperature. Therefore, in the third light receiving sensors 126 blocked from the external light and the illumination light, only error currents generated by such an external factor are obtained.

Figure 32:
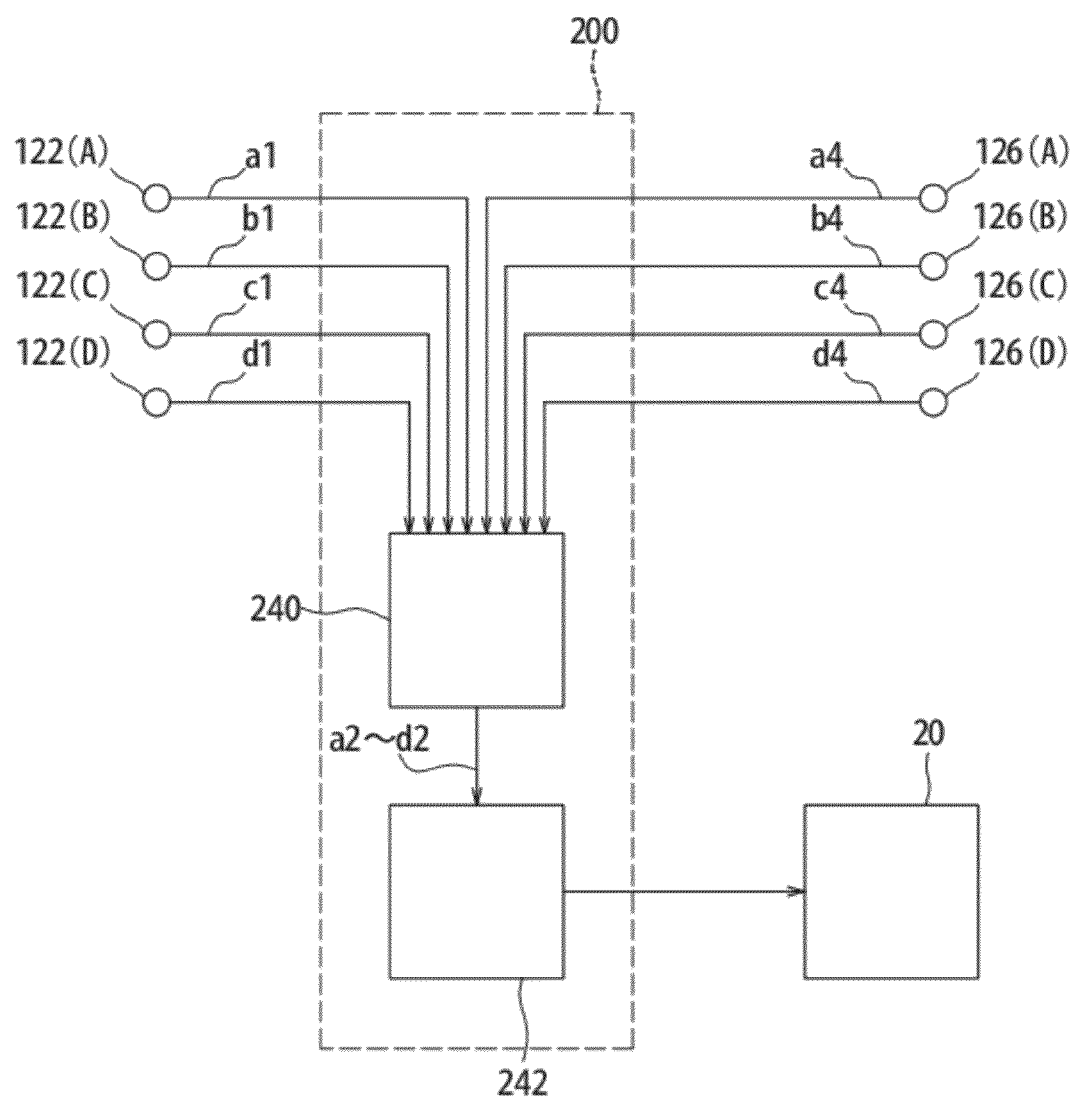
FIG. 32 is a block diagram schematically showing a liquid crystal display device according to an embodiment of the present invention.

In this case, the backlight control section 240 controls the irradiation sections 22 respectively based on the currents generated in the third light receiving sensors 126 (error currents) in addition to based on the light receiving information a1 through d1 obtained by the first light receiving sensors 122. FIG. 32 is a block diagram of such control.

As shown in FIG. 32, error currents a4 through d4 generated in the third light receiving sensors 126 are sent to the backlight control section 240. The backlight control section 240 creates the backlight control signals a2 through d2 based on the error currents a4 through d4 generated in the third light receiving sensors 126 in addition to based on the light receiving information a1 through d1 obtained by the first light receiving sensors 122. More specifically, the backlight control section 240 creates the backlight control signals a2 through d2 to respectively control the irradiation sections 22, in the state where the error currents a4 through d4 caused by an external factor other than the light based on the inrush current generated in the third light receiving sensors 126 are excluded from the light receiving information a1 through d1 obtained by the first light receiving sensors 122.

As can be seen, according to the liquid crystal display device 100 in this embodiment, the irradiation sections 22 are controlled respectively based on the currents a4 through d4 generated in the third light receiving sensors 126 (error currents a4 through d4) in addition to based on the light receiving information a1 through d1 obtained by the first light receiving sensors 122. In this manner, the irradiation sections 22 can be accurately controlled in the state where the error currents generated by an external factor other than light are excluded. It is preferable that, for example, the light receiving information a1 through d1 obtained by the first light receiving sensors 122 is corrected based on the currents a4 through d4 generated in the third light receiving sensors 126 (error currents a4 through d4). With such an arrangement, the influence on the light receiving sensors by an external factor such as the ambient temperature or the like can be removed, and thus the irradiation sections 22 can be controlled more accurately.

EXAMPLE 4

Figure 33:
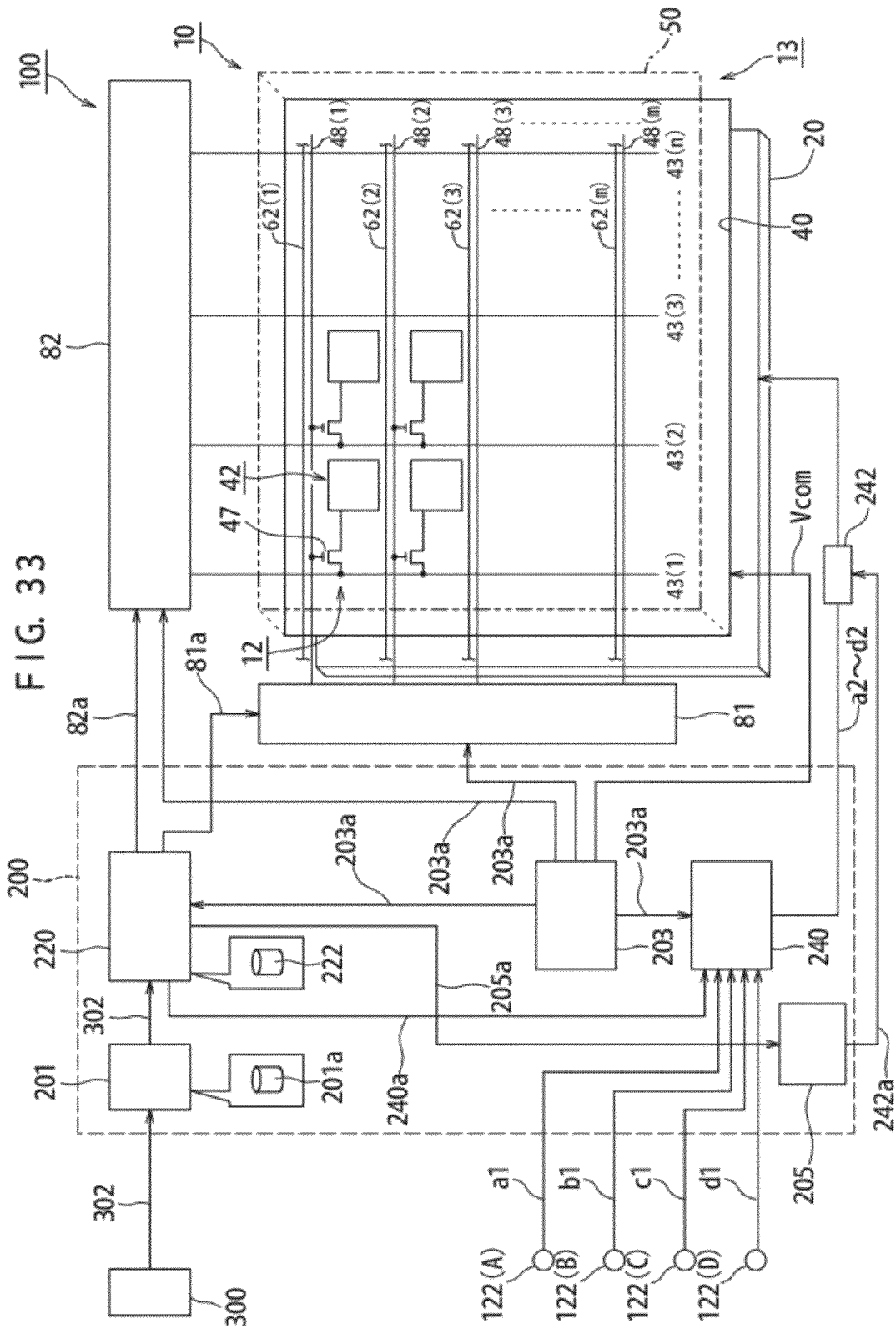
FIG. 33 is a block diagram schematically showing a liquid crystal display device according to an embodiment of the present invention.

The liquid crystal display device 100 may include a backlight unit 20 which is controlled so as to be intermittently driven. Hereinafter, an example of the liquid crystal display device 100 including such a backlight unit 20 will be described. FIG. 33 is a block diagram schematically showing the liquid crystal display device 100 including the backlight unit 20 which is controlled so as to be intermittently driven.

Figure 34:
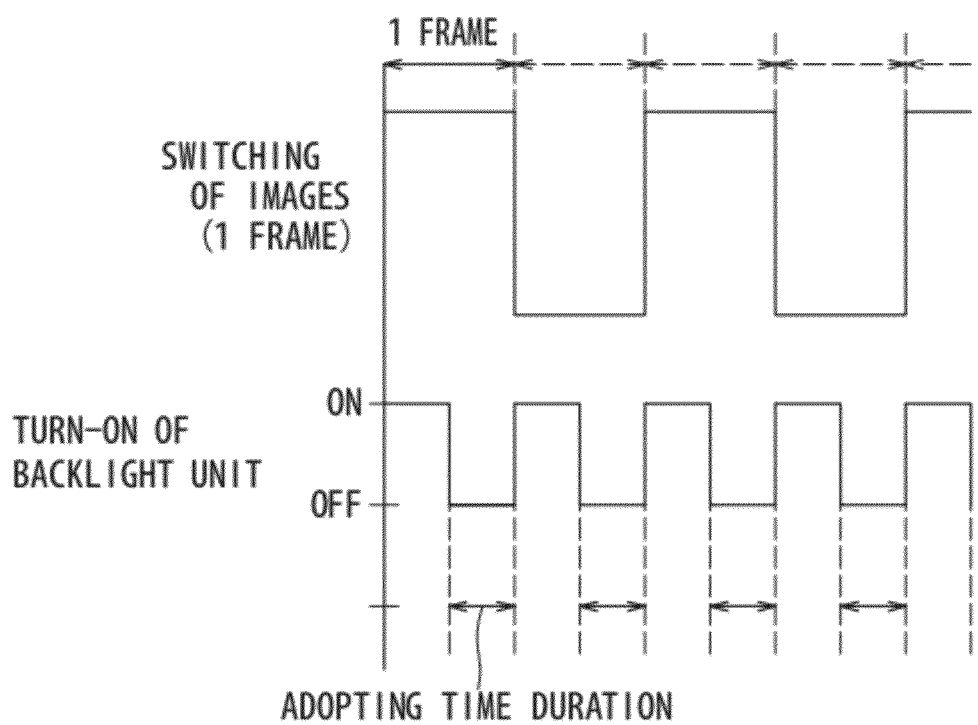
FIG. 34 shows timings of intermittent driving on the backlight unit.

The liquid crystal display device 100 includes an intermittent driving control section 205 for switching a light-out period, in which the backlight unit 20 is off, to a light-up period, in which the backlight unit 20 is on, or vice versa alternately, such that there is the light-out period in a time duration in which an image is displayed on the display region 10a until being switched to another image. As shown in FIG. 33, the intermittent driving control section 205 may be provided as, for example, a part of the control section 200. To the intermittent driving control section 205, a liquid crystal panel control signal 205a is input. The intermittent driving control section 205 detects a time duration in which an image is displayed until being switched to another image, based on the liquid crystal panel control signal 205a, creates a light-out signal 242a based on the time duration in which the image is displayed until being switched to another image, and sends the light-out signal 242a to the power input section 242. Based on the light-out signal 242a, the power input section 242 stops the power from being put to the irradiation sections 22 during a prescribed time period in the time duration in which the image is displayed until being switched to another image (1 frame). Owing to this, as shown in FIG. 34, the irradiation sections 22 of the backlight unit 20 are controlled such that a light-out period is present within one frame.

In the liquid crystal display device 100 in which the backlight unit 20 is intermittently driven in this manner, it is preferable that the backlight control section 240 controls the irradiation sections 22 respectively based on the light receiving information a1 through d1 obtained by the first light receiving sensors 122 during the light-out period of the backlight unit 20. In this case, as shown in FIG. 34, an adopting time duration, in which the light receiving information a1 through d1 obtained by the first light receiving sensors 122 is to be adopted, is predefined in the backlight control section 240. The adopting time duration is defined to match the light-out period of the backlight unit 20. In this manner, the backlight control section 240 acquires the light receiving information a1 through d1 during the light-out period of the backlight unit 20. The light receiving information a1 through d1 obtained in this manner does not contain the illumination light emitted by the backlight unit 20.

By control on the irradiation sections 22 performed respectively based on the light receiving information not containing the illumination light, the backlight control section 240 can adjust the brightness of the illumination light so as to accurately reflect the external light directed to the display region 10a. With this liquid crystal display device 100, the second light receiving sensors 124 described above are not needed. Therefore, as compared with the case where the second light receiving sensors 124 are provided, the increase of the component costs can be prevented. Unlike in the case where the second light receiving sensors 124 are provided, there is no need of newly providing components in the display region 10a. Therefore, the reduction of the aperture ratio of the pixels can be prevented.

Another method will be described. In the following description of this method, the light receiving information a1 through d1 obtained by the first light receiving sensors 122 during the light-up period will be referred to as "a1 through d1 (ON)", and the light receiving information a1 through d1 obtained during the light-out period will be referred to as "a1 through d1 (OFF)". Differences between the light receiving information a1 through d1 (ON) obtained by the first light receiving sensors 122 during the light-up period and the light receiving information a1 through d1 (OFF) obtained during the light-out period will be referred to as the "a1 through d1 (ON-OFF)".

The backlight control section 240 may further control the irradiation sections 22 respectively based on the difference between the light receiving information a1 through d1 (ON) obtained by the first light receiving sensors 122 during the light-up period and the light receiving information a1 through d1 (OFF) obtained by the first light receiving sensors 122 during the light-out period. In this case, the backlight control section 240 finds differences a1 through d1 (ON-OFF) between the light receiving information a1 through d1 (ON)

obtained during the light-up period and the light receiving information a1 through d1 (OFF) obtained during the light-out period. The differences a1 through d1 (ON-OFF) are each light receiving information substantially corresponding to the brightness of the illumination light.

Owing to this, the substantial light receiving information obtained from the illumination light can be calculated. In this manner, the brightness of the illumination light can be corrected with the brightness of the current illumination light being reflected. According to this liquid crystal display device 100, even when the brightness of the illumination light emitted by the irradiation sections 22 changes due to the change of the ambient temperature, the over-time deterioration or the like, the brightness of the illumination light can be corrected.

The liquid crystal display device 100 including the backlight unit 20 intermittently driven may include the second light receiving sensors 124 for receiving the illumination light directed to the rear surface of the liquid crystal panel 10, at a plurality of positions in the display region 10a. In this case, during the light-out period of the backlight unit 20, the illumination light is not directed to the second light receiving sensors 124 located so as to receive the illumination light. Therefore, if currents are generated in the second light receiving sensors during the light-out period of the backlight unit 20, such currents are generated in the light receiving sensors by an external factor other than the light. In this case, it is preferable that the backlight control section 240 controls the irradiation sections 22 respectively based on the currents generated in the second light receiving sensors 124 during the light-out period of the backlight unit 20 in addition to based on the light receiving information a1 through d1 obtained by the first light receiving sensors 122. With such an arrangement, the irradiation sections 22 can be controlled in the state where the errors caused by the currents generated in the light receiving sensors by an external factor other than the light are excluded.

EXAMPLE 5

Figure 35:
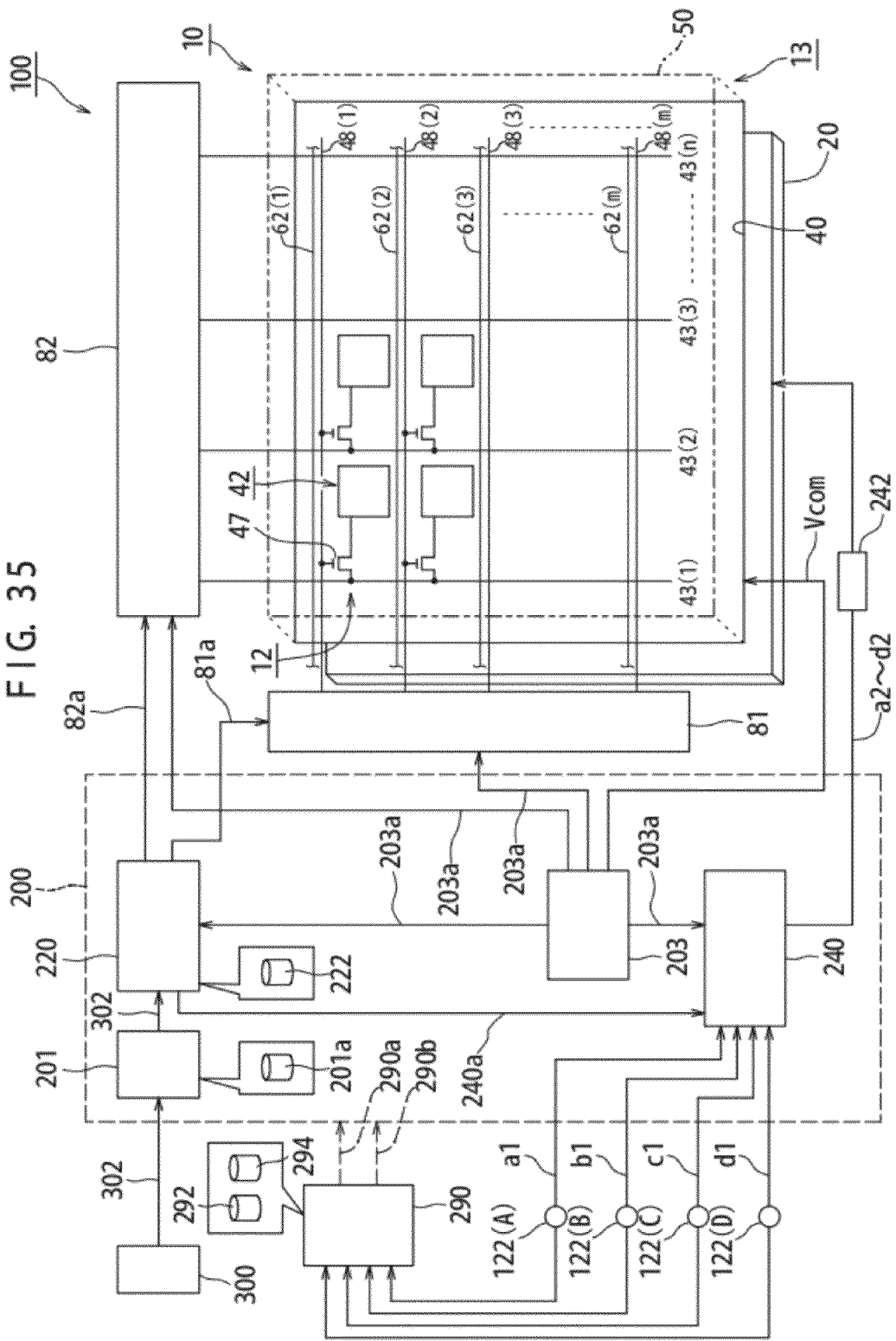
FIG. 35 is a block diagram schematically showing a liquid crystal display device according to an embodiment of the present invention.

The liquid crystal display device 100 may include a switching section 290. The switching section 290 switches the control mode to the non-control mode or vice versa. The backlight control section 240 controls the irradiation sections 22 as described above when being set to the control mode (see S1 in FIG. 7). Hereinafter, an example of the liquid crystal display device 100 including the switching section 290 will be described. FIG. 35 is a block diagram schematically showing the liquid crystal display device 100 including the switching section 290.

It is preferable that as shown in FIG. 35, the switching section 290 is, for example, connected to the control section 200 via signal lines. In this example, the switching section 290 creates a control stop signal 290a for causing the control section 200 to stop the control or a control start signal 290b for causing the control section 200 to start the control, in accordance with the switching of the control mode to the non-control mode and vice versa, and sends the created signal to the control section 200. When the control stop signal 290a is sent from the switching section 290 to the control section 200, the control section 200 is switched from the control mode to the non-control mode. By contrast, when the control start signal 290b is sent, the control section 200 is switched from the non-control mode to the control mode.

It is preferable that as shown in FIG. 35, the liquid crystal display device 100 including the switching section 290 includes a timer 292. The timer 292 is connected to the switching section 290. In the timer 292, a time zone, in which the control in the control mode is to be performed, is preset. The switching section 290 switches the control mode to the non-control mode or vice versa based on the time zone preset in the timer 292. With the liquid crystal display device 100, only in a time zone in which the intensity of the external light directed to the display region 10a is high or in a time zone in which the intensity of the external light is liable to be changed, the control mode can be selected and thus the control of adjusting the brightness of the light from the backlight unit 20 can be performed. Owing to this, the power constantly consumed during the control mode can be saved.

It is preferable that, for example, the time zone preset in the timer 292 is the daytime, when the intensity of the external light is liable to be changed. The switching section 290 creates the control stop signal 290a or the control start signal 290b based on the time zone preset in the timer 292, and sends the created signal to the control section 200. In this manner, the backlight control section 200 is switched between the control mode and the non-control mode.

As shown in FIG. 35, the switching section 290 may switch the control mode to the non-control mode or vice versa based on light receiving information a1 through d1 obtained by light receiving sensors for switching. The light receiving sensors for switching receive the external light directed to the liquid crystal panel 10, at a plurality of positions in the display region 10a. In this example, the first light receiving sensors 122 described above are used as the light receiving sensors for switching. The first light receiving sensors 122 receive the external light directed to the liquid crystal panel 10, at the plurality of positions in the display region 10a, and therefore can be used as the light receiving sensors for switching. Alternatively, light receiving sensors different from the first light receiving sensors 122 may be located in the liquid crystal display device 100 as the light receiving sensors for switching.

With the liquid crystal display device 100 shown in FIG. 35, the light receiving information a1 through d1 obtained by the light receiving sensors for switching (first light receiving sensors) 122 is sent to a switching control section 294. The switching control section 294 creates switching control signals 292a based on the light receiving information a1 through d1 obtained by the first light receiving sensors 122 and sends the switching control signals 292a to the switching section 290. The switching section 290 creates the control stop signal 290a or the control start signal 290b based on the switching control signal 292a, sends the created signal to the backlight control section 240, and thus switches the control mode to the non-control mode or vice versa. Therefore, the liquid crystal display device 100 can select the control mode when the intensity of the external light directed to the display region 10a is changing, and select the non-control mode when the intensity of the external light is not changing. In the control mode, in which the backlight unit 20 is controlled based on the light receiving information a1 through d1 obtained by the first light receiving sensors (light receiving sensors for switching) 122, the liquid crystal display device 100 constantly consumes power for performing such control. By contrast, in the non-control mode, the control of adjusting the brightness of the light from the backlight unit 20 based on the light receiving information a1 through d1 obtained by the first light receiving sensors (light receiving sensors for switching) 122 can be performed only when necessary. Therefore, the power consumption can be suppressed low. With the liquid crystal display device 100, the first light receiving sensors 122 are used as the light receiving sensors for switching. Therefore, as compared with the case where the light receiving sensors for switching are separately provided, the number of the light receiving sensors can be smaller. This can prevent the reduction of the luminance of the displayed image, which is caused by the openings of the pixels 30 being covered with the light receiving sensors for switching, and also prevent the increase of the component costs caused by the provision of new components.

The switching section 290 may have a structure by which the control mode and the non-control mode can be switched to each other manually. In this case, the control of adjusting the brightness of the light from the backlight unit 20 can be performed when being desired by the viewer.

EXAMPLE 6

Figure 36:
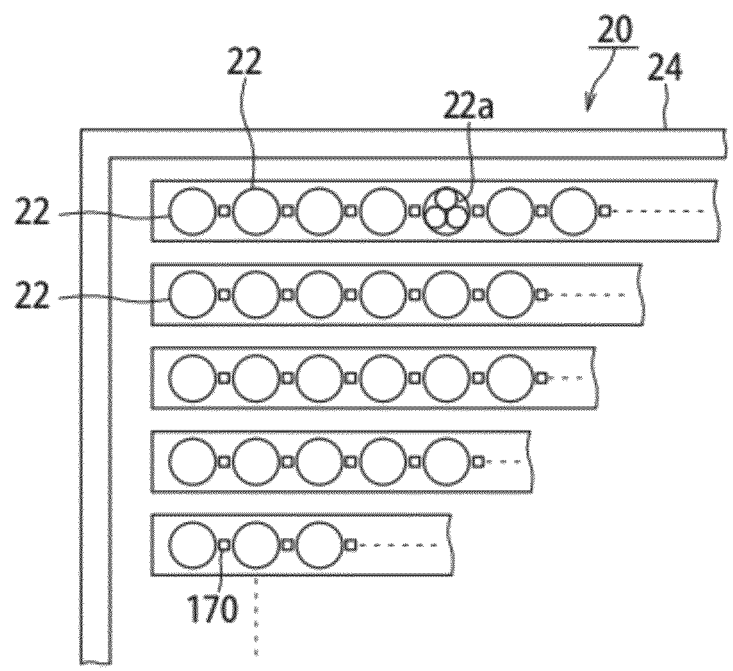
FIG. 36 is an enlarged plan view of a backlight unit.

The liquid crystal display device 100 may include temperature sensors 170 in addition to the light receiving sensors such as the first light receiving sensors 122. The temperature sensors 170 are located, for example, at a plurality of positions in the backlight unit 20, and are each preferably formed of an element having a thermoelectromotive force. Hereinafter, an example of the liquid crystal display device 100 including the temperature sensors 170 will be described. FIG. 36 is a schematic view of a backlight unit 20 including the temperature sensors 170.

The temperature sensors 170 sense the temperature of the backlight unit 20 independently for each of areas. The temperature sensors 170 are connected to the backlight control section 240 via signal lines, and the temperature of each area of the backlight unit 20 is sent to the backlight control section 240. The backlight control section 240 controls each of the irradiation sections 22 based on the temperature of the corresponding area of the backlight unit 20 in addition to based on the corresponding information among the light receiving information a1 through d1 obtained by the first light receiving sensors 122. As described above, the irradiation sections 22 are influenced by the change of ambient temperature. With this liquid crystal display device 100, the irradiation sections 22 can be appropriately controlled respectively based on the light receiving information a1 through d1 obtained by the first light receiving sensors 122 while the brightness thereof is corrected based on the temperature of the backlight unit 20 obtained by the corresponding temperature sensor 170.

EXAMPLE 7

In the case where the first light receiving sensors 122 are each formed of an element having a photoelectromotive force, the electromotive force generated in the first light receiving sensors 122 can be used as the power for driving the liquid crystal display device 100. In order to use this electromotive force as the power for driving the liquid crystal display device 100, it is preferable that the liquid crystal display device 100 includes an electricity storage section 130 for storing the electromotive force generated in the first light receiving sensors 122. Hereinafter, an example of the liquid crystal display device 100 using the electromotive force generated in the first light receiving sensors 122 as the driving power will be described.

Figure 37:
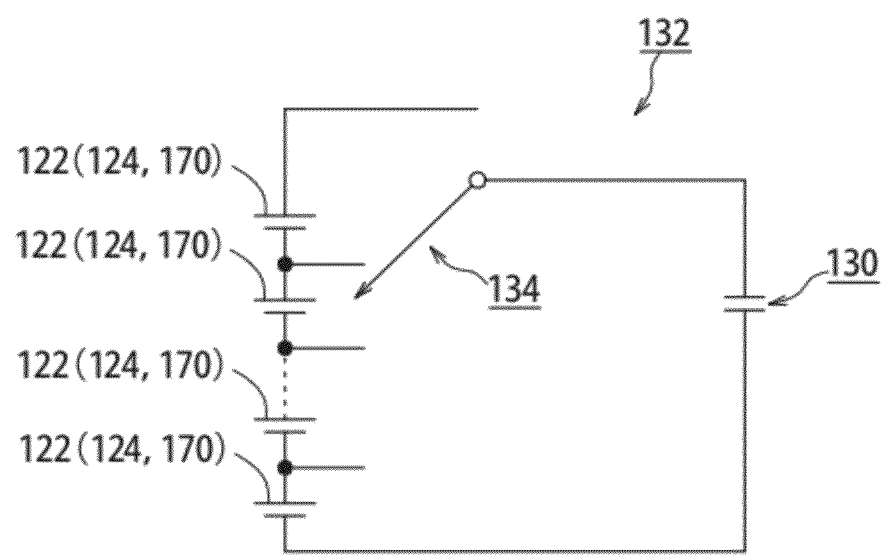
FIG. 37 shows an example of circuit for using an electromotive force generated in light receiving sensors.

As the element capable of generating a photoelectromotive force as described above, for example, a photodiode, a phototransistor or the like is usable. When light is directed to the light receiving sections 122a of the first light receiving sensors 122 formed of such an element, electromotive forces are generated. It is preferable that the first light receiving sensors 122 are each connected to the electricity storage section 130 by an electric circuit 132 as shown in FIG. 37. The electric circuit 132 includes a multiplexer 134. The electromotive forces generated in the first light receiving sensors 122 are integrated into one circuit by the multiplexer 134. The integrated electromotive force is stored in the electricity storage section 130. The electricity storage section 130 is connected to, for example, the power source 203 or the like, and the stored electromotive force is used as a voltage to be applied to the liquid crystal panel 10, other type of power or the like. Owing to this, the driving power of the liquid crystal display device 100 can be saved.

Even while the liquid crystal display device 100 is stopped being driven, the external light is directed to the first light receiving sensors 122, and thus the electromotive forces are generated. Therefore, with this liquid crystal display device 100, the electromotive forces generated while the driving of the liquid crystal display device 100 is stopped are stored in the electricity storage section 130 and thus the driving power can be further saved. This liquid crystal display device 100 is especially preferably usable for, for example, an information display or the like which is often located outdoors and is irradiated with a large amount of external light during the daytime.

With the liquid crystal display device 100 including the electricity storage section 130, it is preferable that the first light receiving sensors 122 are located at positions where both of the external light directed to the display region 10a and the illumination light emitted by the backlight unit 20 can be received. In this case, the external light directed to the display region 10a and also the illumination light emitted by the backlight unit 20 can be stored in the electricity storage section 130 as electric power.

It is preferable that the liquid crystal display device 100 including the electricity storage section 130 includes the second light receiving sensors 124 each formed of an element having a photoelectromotive force (e.g., photodiode, etc.). In this case, by an electric circuit having substantially the same configuration of that for the first light receiving sensors 122, the electromotive forces generated in the second light receiving sensors 124 can be stored in the electricity storage section 130 and used for driving the liquid crystal display device 100. In this case, as compared with the liquid crystal display device 100 including only the first light receiving sensors 122, a larger amount of power can be used.

Also in the case where the temperature sensors 170 are each formed of an element capable of generating a thermoelectromotive force, the power generated in the temperature sensors 170 can be stored in the electricity storage section 130 and used for driving the liquid crystal display device 100. In this case, a still larger amount of power can be stored and used for driving the liquid crystal display device 100.

So far, the liquid crystal display device 100 including backlight control section 240 for controlling the irradiation sections 22 respectively based on the light receiving information a1 through d1 obtained by the first light receiving sensors 122 has been described.

In the following, the liquid crystal display device 100 including an image changing section 250 for changing an image to be displayed on the display region 10a based on the light receiving information a1 through d1 obtained by the first light receiving sensors 122 will be described.

EXAMPLE 8

In the image changing section 250, a reference value is predefined for the light receiving information a1 through d1 obtained by the light receiving sensors (first light receiving sensors 122). When light receiving information a1 through d1 exceeding the reference value is obtained by the first light receiving sensors 122, the image changing section 250 changes the image to be displayed on the display region 10a based on the light receiving information a1 through d1. When the display region 10a is irradiated with the external light having an intensity exceeding the predefined reference value, the liquid crystal display device 100 can optionally change the image to be displayed to an image easier to see. Therefore, according to this liquid crystal display device 100, the stress felt by the viewer when he/she tries to recognize the image can be alleviated. The post-change image provided by the image changing section 250 is an image easy to see to the viewer, and therefore erroneous recognition of the content of the displayed image by the viewer can be prevented. This type of liquid crystal display device 100 is preferably usable for, for example, an information display located outdoors, the display region 10a of which is liable to be irradiated with external light having a high intensity and is viewed only for a short time duration.

Figure 38:
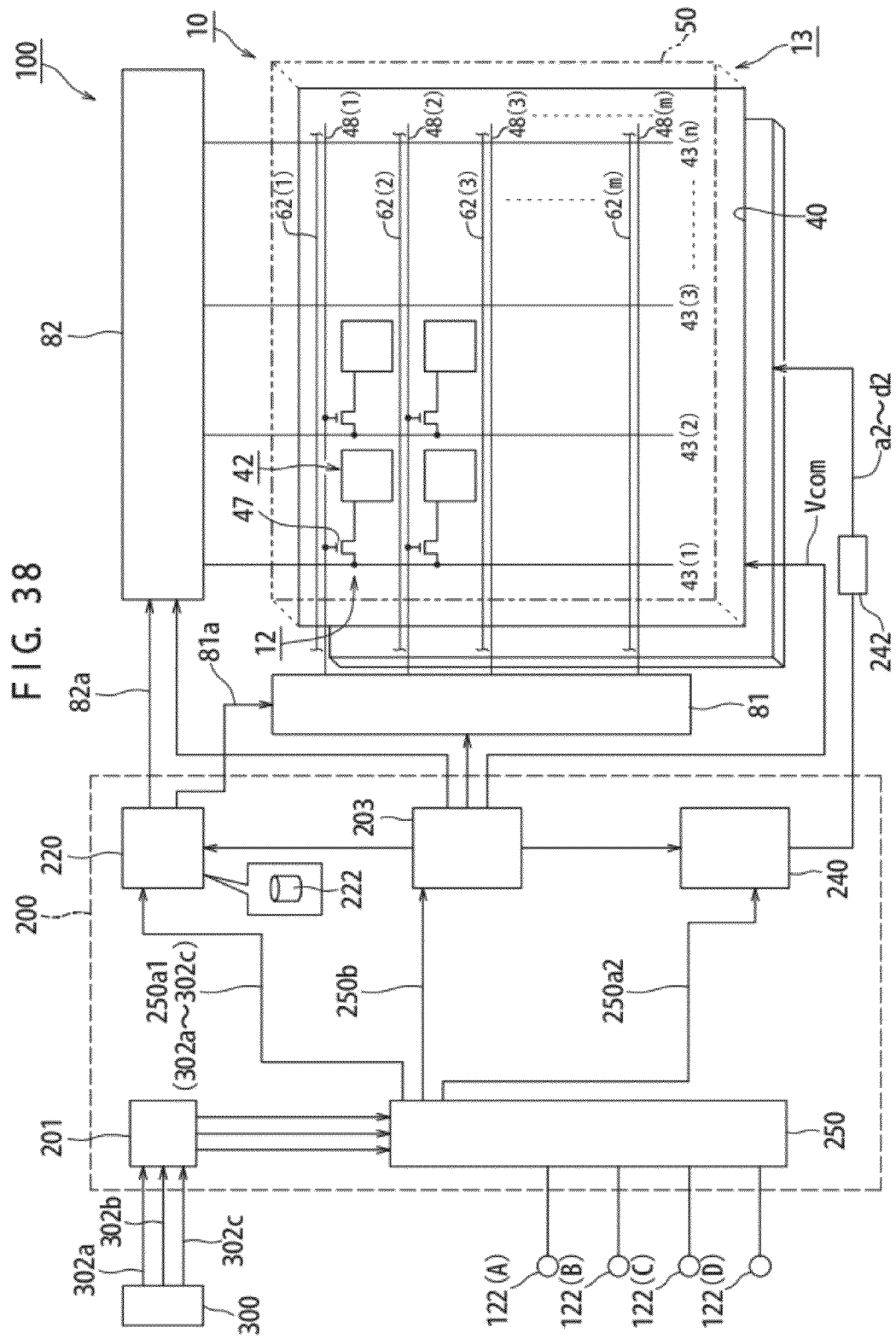
FIG. 38 is a block diagram schematically showing a liquid crystal display device according to an embodiment of the present invention.
Figure 39:
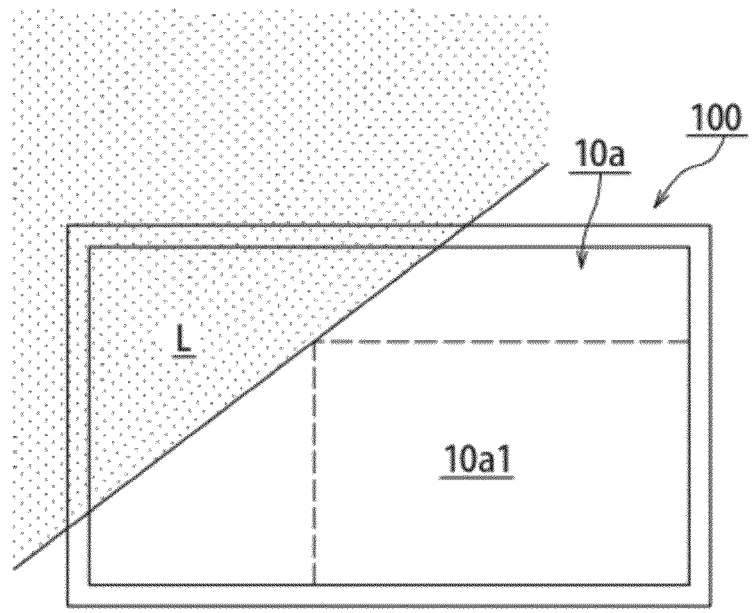
FIG. 39 is a front view of a liquid crystal panel.

Hereinafter, an example of the liquid crystal display device 100 including the image changing section 250 will be described. FIG. 38 is a block diagram schematically showing the liquid crystal display device 100 including the image changing section 250.

Like in the above-described example, with this liquid crystal display device 100, the first light receiving sensors 122 receive the external light directed to the liquid crystal panel 10, at a plurality of positions in the display region 10a. It is preferable that the first light receiving sensors 122 are located, for example, in a dispersed manner in the display region 10a of the liquid crystal panel 10. With such an arrangement, the first light receiving sensors 122 can obtain light receiving information on the external light directed to the display region 10a, at various sites of the display region 10a. In this case, one first light receiving sensor 122 may be provided for, for example, each pixel group including a plurality of pixels (pixel group of 8 pixels×8 pixels, pixel group of 10 pixels×10 pixels). In this case, the light receiving information a1 through d1 on the external light directed to the display region 10a can be obtained independently for each of the pixel groups.

In this embodiment, as shown in FIG. 38, the image changing section 250 is provided in the control section 200. The image changing section 250 is connected to the first light receiving sensors 122, and the light receiving information a1 through d1 obtained by the first light receiving sensors 122 is sent to the image changing section 250. The image changing section 250 is also connected to the signal input section 201. Image signals 302a through 302c input from the external system 300 are sent to the image changing section 250 via the signal input section 201.

In the image changing section 250, a reference value is predefined for the light receiving information a1 through d1 obtained by the first light receiving sensors 122. It is preferable that the reference value corresponds to, for example, light receiving information obtained in the case where external light of such a level of brightness that makes the image displayed on the display region 10a difficult to see is received. FIG. 39 through FIG. 44 each show a liquid crystal panel which has a difficult-to-see part L therein. The difficult-to-see part L of the liquid crystal panel may be caused by, for example, the part of the liquid crystal panel being irradiated with highly intense external light.

When light receiving information a1 through d1 exceeding the predefined reference value is obtained by the first light receiving sensors 122, the image changing section 250 changes the image to be displayed on the display region 10a based on the light receiving information a1 through d1. As described above, when the display region 10a is irradiated with highly intense external light exceeding the predefined reference value, this liquid crystal display device 100 can optionally changes the displayed image to an image easy to see. The specifics of the "change into an image easy to see" will be described, hereinafter.

It is preferable that, for example, based on the light receiving information a1 through d1 obtained by the first light receiving sensors 122, the image changing section 250 sets an image display area 10a1 in which an image is to be displayed, in a part of the display region 10a other than a part for which the light receiving information a1 through d1 exceeding the reference value has been obtained. The image display area 10a1 is a part of the display region 10a in which an image is to be displayed. The image changing section 250 reduces the size of the image display area 10a1, and locates the image display area 10a1 in the display region 10a, while avoiding the part made difficult to see as a result of being irradiated with the highly intense external light. The liquid crystal display device 100 displays the image in a part which is not irradiated with the highly intense external light and therefore is easy to visually recognize. As a result, an image easy to see can be provided to the viewer. In the part of the display region 10a irradiated with the highly intense external light, no image is displayed. Therefore, the power which would otherwise be used for displaying the difficult-to-see image can be saved, and thus the driving power can be saved.

Figure 54:
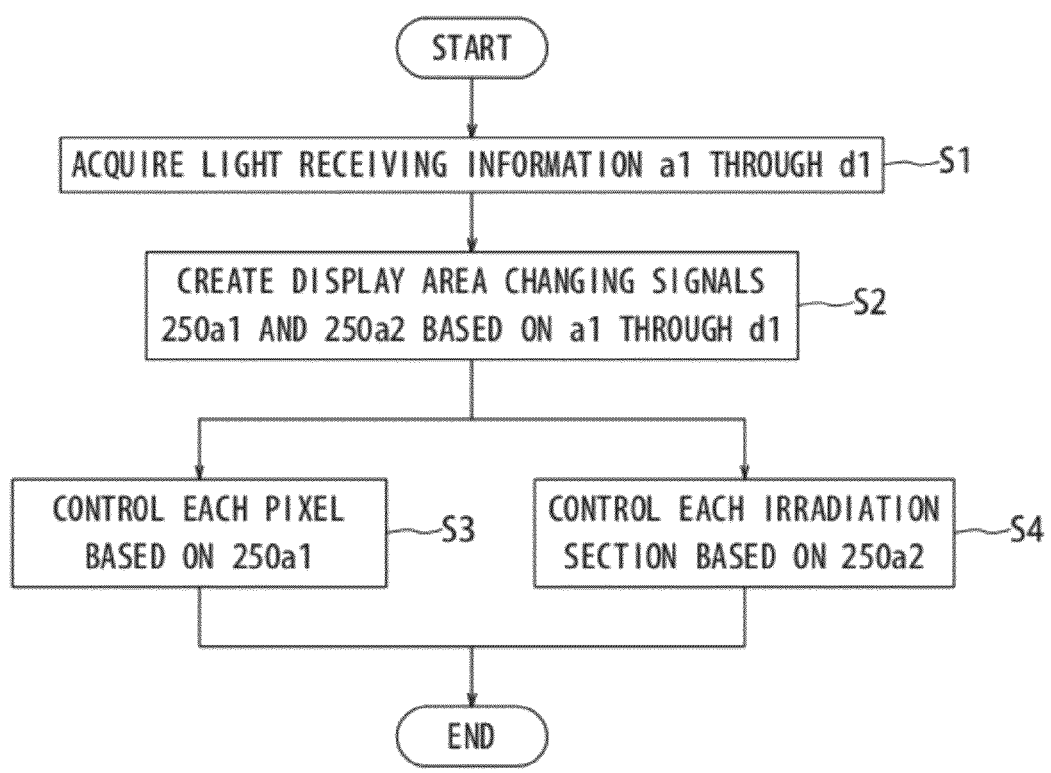
FIG. 54 schematically shows control performed by an image changing section.

As shown in FIG. 54, the image changing section 250, for example, acquires light receiving information a1 through d1 obtained by the first light receiving sensors 122 (S1). The image changing section 250 then creates display area changing signals 250a1 and 250a2 based on the light receiving information a1 through d1 (S2). The display area changing signals 250a1 and 250a2 contain information for setting the image display area 10a1. As shown in FIG. 38, the image changing section 250 sends the display area changing signals 250a1 and 250a2 to the liquid crystal panel control section 220 and the backlight control section 240. The liquid crystal panel control section 220 controls each of the pixels 30 based on the display area changing signal 250a1 (S3) to change the size of the image display area 10a1 in the display region 10a, and also sets the position for the image display area 10a1 while avoiding the part irradiated with the highly intense external light exceeding the reference value. Meanwhile, the backlight control section 240 controls the irradiation sections 22 based on the display area changing signal 250a2 to turn off the irradiation sections 22 located in the part in which the image is not displayed (part other than the image display area 10a1) as seen in a plan view of the display region 10a (S4).

It is preferable that the image changing section 250 changes the size of the image to be displayed in accordance with the image display area 10a1 which is set in the part of the display region 10a other than the part for which the light receiving information a1 through d1 exceeding the reference value has been obtained. In the case where, for example, the size of the image display area 10a1 is reduced, it is preferable that the size of the image to be displayed on the display region 10a1 is reduced in accordance with the size of the image display area 10a1. With such an arrangement, even when the size of the image display area 10a1 is changed, the liquid crystal display device 100 can display the same image as the pre-change image on the display region 10a.

Figure 55:
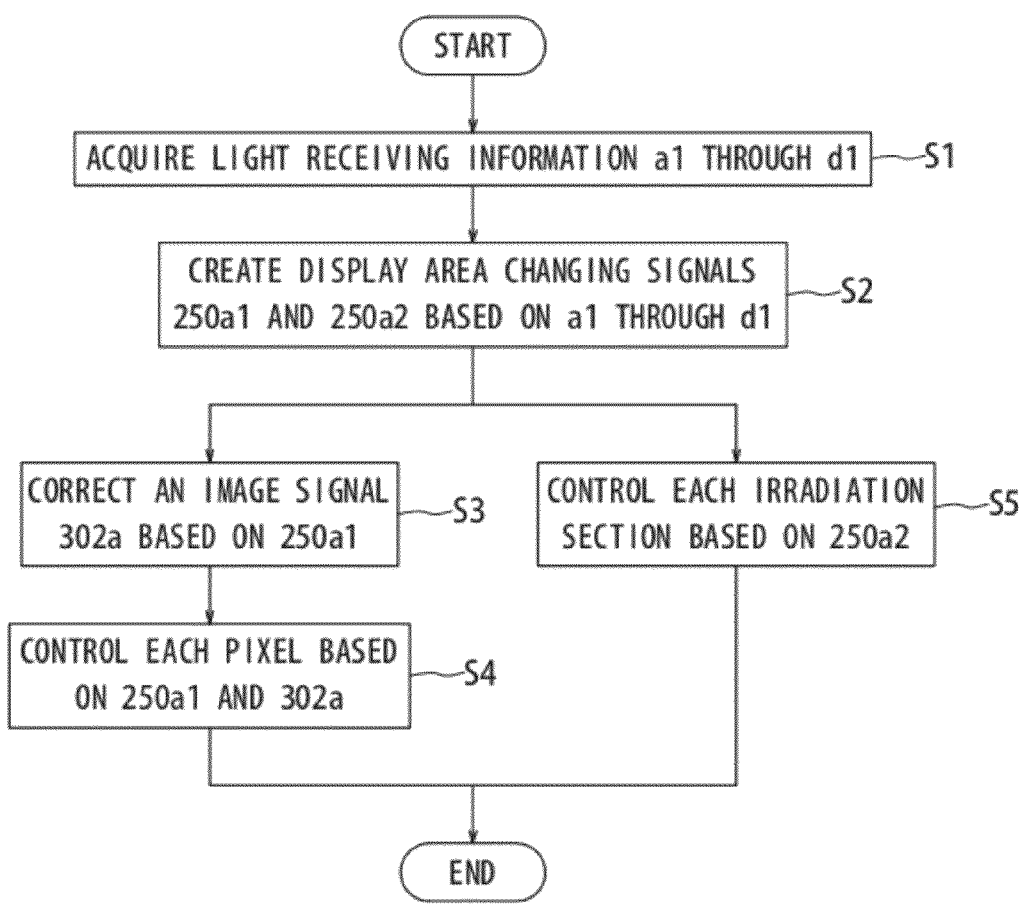
FIG. 55 schematically shows control performed by an image changing section.

Hereinafter, control on the image changing section 250 having such a structure will be described. As shown in FIG. 38, the image changing section 250 acquires the light receiving information a1 through d1 from the first light receiving sensors 122 (see S1 in FIG. 55). The image changing section 250 then creates the display area changing signals 250a1 and 250a2 based on the light receiving information a1 through d1 (S2). The image changing section 250 corrects the image signal 302a based on the created display area changing signal 250a1 (S3). To the liquid crystal panel control section 220, the display area changing signal 250a1 and the post-correction image signal 302a are sent. To the backlight control section 240, the display area changing signal 250a2 is sent. The liquid crystal panel control section 220 controls each of the pixels 30 based on the display area changing signal 250a1 and the post-correction image signal 302a (S4). Meanwhile, the backlight control section 240 controls each of the irradiation sections 22 based on the display area changing signal 250a2 (S5).

In another embodiment, a plurality of image signals 302a through 302c including a partial image signal 302b representing a partial display image, which is to be displayed on the part 10a1 of the display region, may be input to the image changing section 250. In this case, the image changing section 250 may be structured to adopt the partial image signal 302b as a signal for causing an image to be displayed on the image display area 10a1 based on the size of the image display area 10a1 and thus to display the partial display image on the display region 10a.

Figure 40:
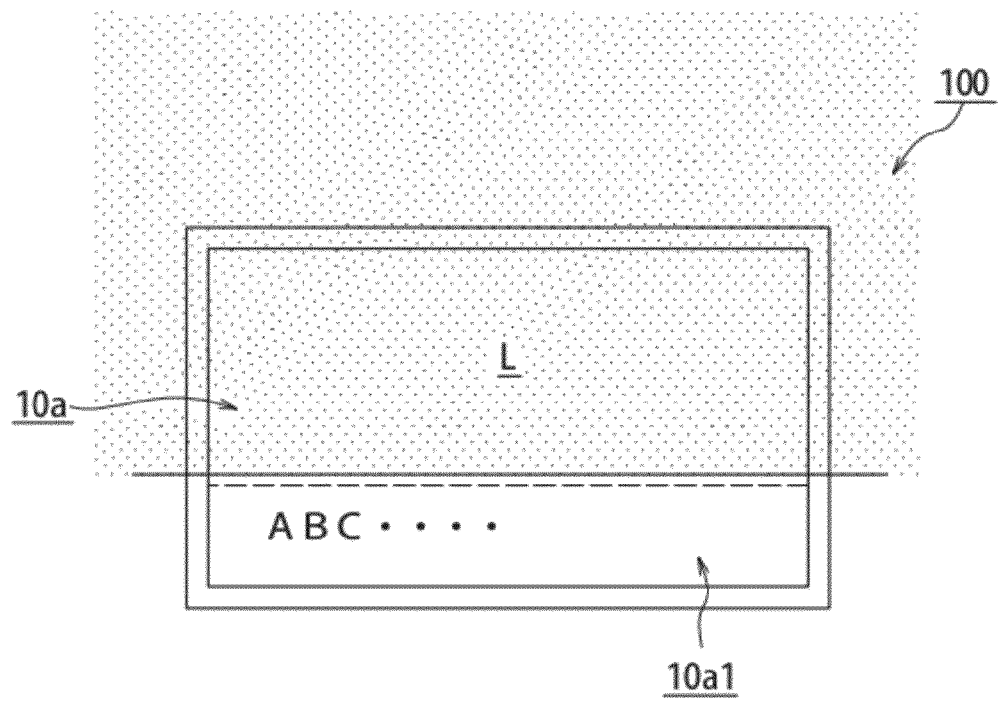
FIG. 40 is a front view of a liquid crystal panel.

In the case where, for example, the image display area 10a1 is longer in the horizontal direction than in the vertical direction or longer in the vertical direction than in the horizontal direction, it is preferable that the image changing section 250 forms the partial display image such that the partial display image is displayable on the image display area 10a1 longer in the horizontal direction or in the vertical direction, like the subtitles shown in FIG. 40. In this case, the partial image signal 302b represents such subtitles. It is preferable that a plurality of image signals including the partial image signal 302b are input to the image changing section 250. It is preferable that based on the image display area 10a1, the image changing section 250 optionally adopts the partial image signal 302b as a signal for causing an image to be displayed on the image display area 10a1. In the case where the image display area 10a1 is longer in the horizontal direction or in the vertical direction, the liquid crystal display device 100 can display a partial display image such as subtitles or the like in the post-change image display area 10a. In this manner, when the size or shape of the image display area 10a1 is changed, the liquid crystal display device 100 can optionally display an image adapted to the image display area 10a1.

Figure 56:
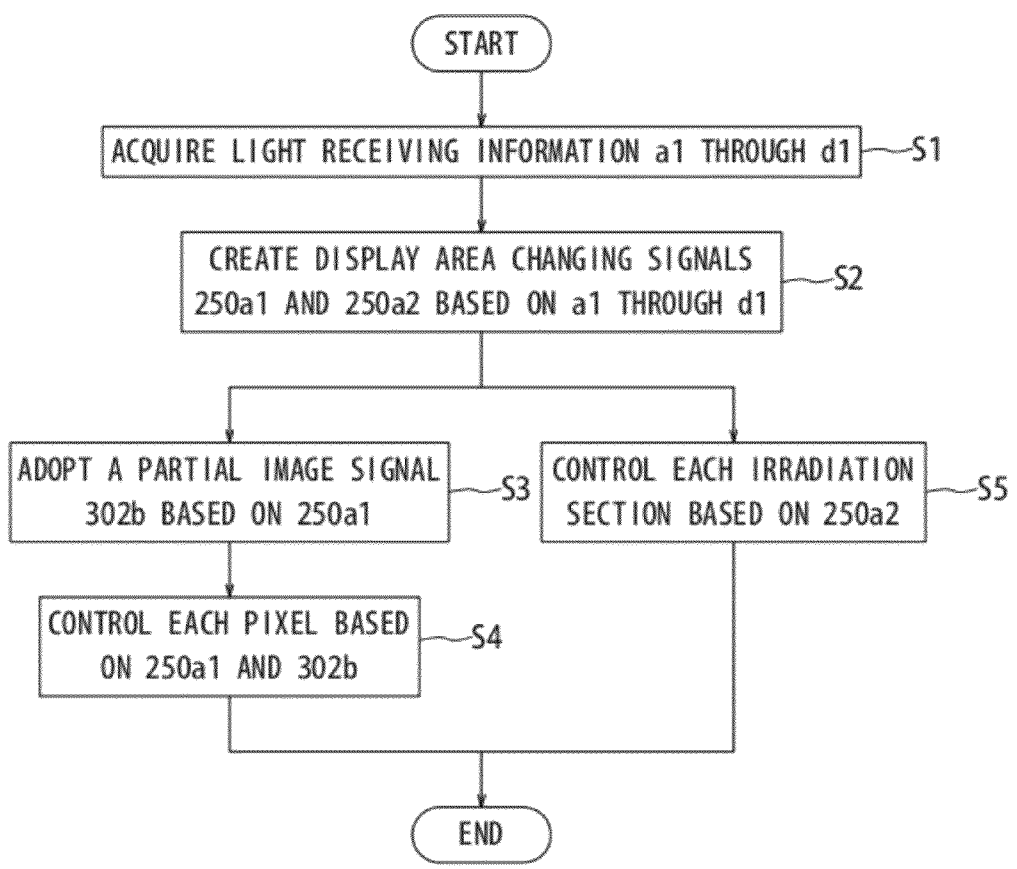
FIG. 56 schematically shows control performed by an image changing section.

Hereinafter, control performed by the image changing section 250 having such a structure will be described. As shown in FIG. 38 and FIG. 56, the image changing section 250 acquires the light receiving information a1 through d1 from the first light receiving sensors 122 (see S1 in FIG. 56). The image changing section 250 creates the display area changing signals 250a1 and 250a2 based on the light receiving information a1 through d1 obtained by the first light receiving sensors 122 (S2). To the image changing section 250, the plurality of image signals 302a through 302c are input. The image changing section 250 adopts the partial image signal 302b from the plurality of image signals 302a through 302c based on the display area changing signal 250a1 (S3). As shown in FIG. 38, the partial image signal 302b and the display area changing signal 250a1 are sent to the liquid crystal panel control section 220. The liquid crystal panel control section 220 controls each pixel 30 based on the display area changing signal 250a1 and the partial image signal 302b (S4) to change the image to be displayed on the display region 10a to the partial display image.

Figure 44:
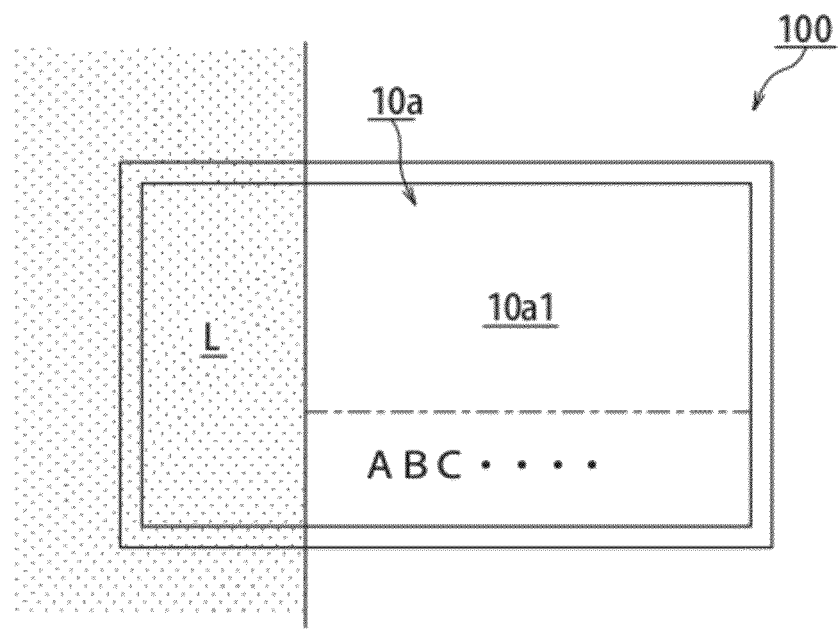
FIG. 44 is a front view of a liquid crystal panel.

The reduction of the size of the displayed image and the display of the partial display image described above do not need to be performed independently. As shown in FIG. 44, both of the image of the reduced size and the partial display image may be displayed on the image display area 10a1.

In the above description, the image changing section 250 sets the image display area 10a1 in a part of the display region other than the part for which the light receiving information a1 through d1 exceeding the reference value has been obtained, and thus displays an image on the image display area 10a1. The image changing section 250 can change the displayed image to an "image easy to see" by another method.

For example, it is preferable that when the light receiving information a1 through d1 exceeding the reference value is obtained by the first light receiving sensors 122, the image changing section 250 changes the image to be displayed on the display region 10a to a prepared image. According to this liquid crystal display device 100, the image to be displayed on the display region 10a is changed to a prepared image. With such a structure, even when the display region 10a is irradiated with intense external light, an image easily recognizable by the viewer can be displayed on the display region 10a. Therefore, the liquid crystal display device 100 can alleviate the stress of the viewer and also prevent the content from being erroneously recognized by the viewer.

Figure 41:
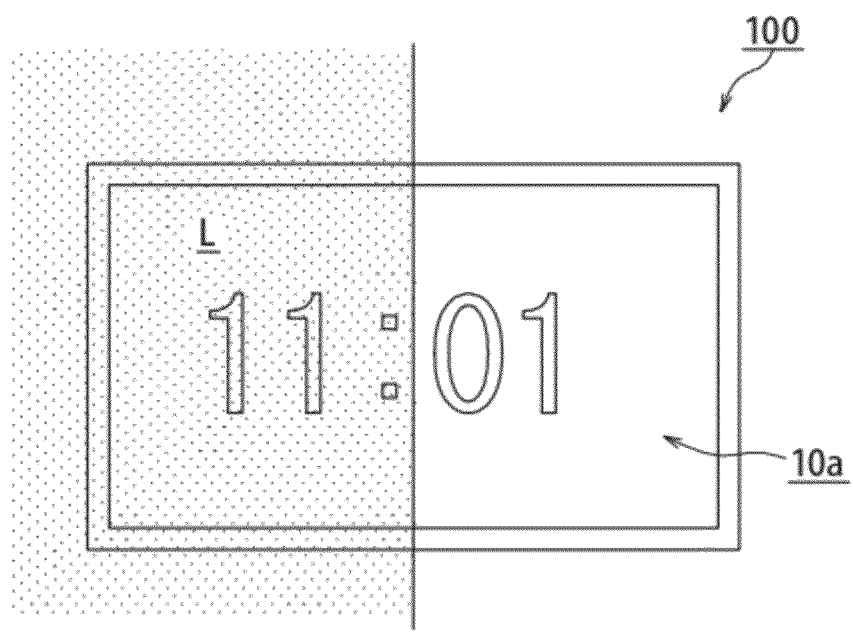
FIG. 41 is a front view of a liquid crystal panel.

In this case, a low contrast image, for example, is usable as the prepared image. Herein, the "low contrast image" is an image which is easily recognizable to the viewer even when the contrast ratio of the display region 10a is low. An example of the low contrast image is, as shown in FIG. 41, an image of a digital clock capable of being represented in a monotone. Such an image of a digital clock capable of being represented in a monotone is easily recognizable even when the contrast ratio of the display region 10a is low. A low contrast image may be a logo, a simple graphical figure (e.g., geometrical figure such as triangle, square, circle, ellipse or the like), a letter represented in a monotone or the like as well as such an image of a clock. The low contrast image may be any image which is easily recognizable to the viewer even when the contrast ratio of the display region 10a is low, and is not limited to the above-mentioned examples.

Figure 57:
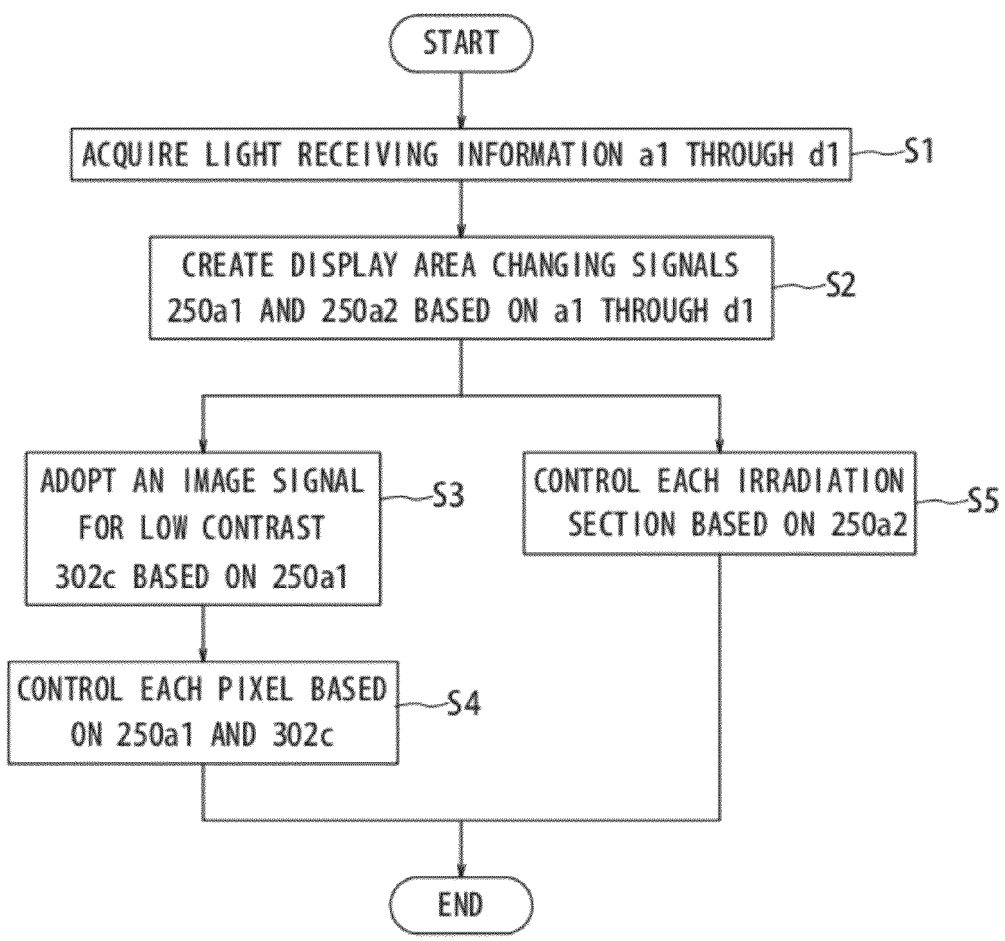
FIG. 57 schematically shows control performed by an image changing section.

In this case, it is preferable that, for example, as shown in FIG. 38, an image signal for low contrast 302c for causing a low contrast image to be displayed on the display region 10a is input to the image changing section 250 in addition to the image signal 302a. As shown in FIG. 38 and FIG. 57, the image changing section 250 acquires the light receiving information a1 through d1 from the first light receiving sensors 122 (see S1 in FIG. 57). The image changing section 250 creates the display area changing signals 250a1 and 250a2 based on the light receiving information a1 through d1 obtained by the first light receiving sensors 122 (S2). The image changing section 250 adopts the image signal for low contrast 302c as the signal for causing an image to be displayed on the display region 10a, based on the light receiving information a1 through d1 obtained by the first light receiving sensors 122 (see S3). The image signal for low contrast 302c is sent to the liquid crystal panel control section 220. The liquid crystal panel control section 220 controls each pixel 30 based on the display area changing signal 250a1 and the image signal for low contrast 302c (S4). The image to be displayed on the display region 10a is changed to a low contrast image. In this manner, the image to be displayed on the display region 10a is optionally changed to the low contrast image.

So far, control performed by the image changing section 250 for changing the image to be displayed to an "image easy to see" has been described. The image changing section 250 only needs to, when light receiving information a1 through d1 exceeding the reference value is obtained by the first light receiving sensors 122, change the image to be displayed on the display region 10*a* based on the light receiving information a1 through d1, and the content of the post-change image is not limited to any of the above-described images. Hereinafter, other embodiments will be described.

Figure 42:
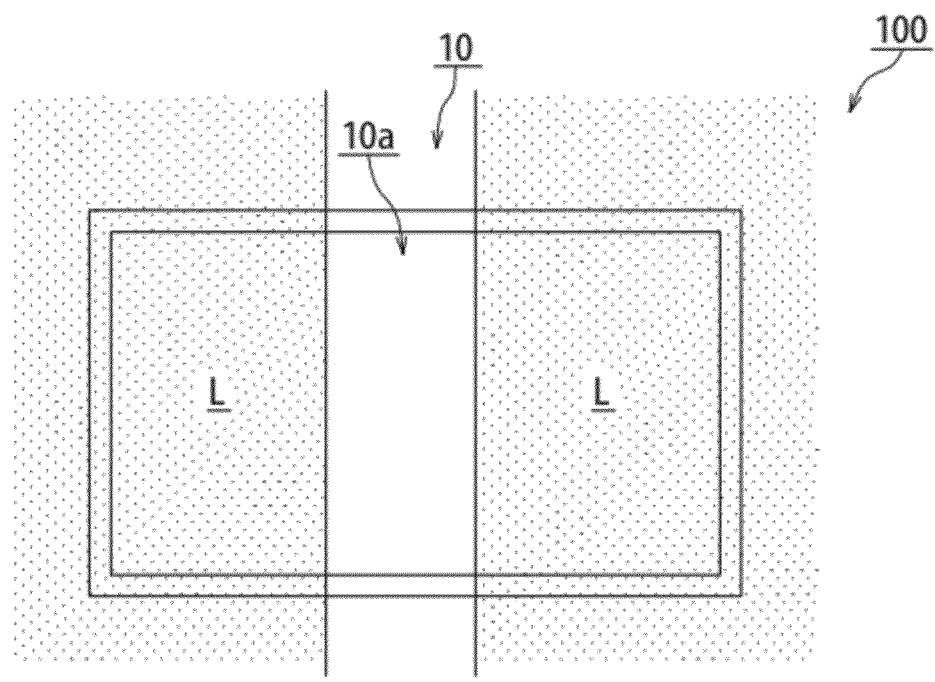
FIG. 42 is a front view of a liquid crystal panel.

For example, as shown in FIG. 42, when the ratio of an area size of a part for which light receiving information a1 through d1 exceeding the reference value has been obtained exceeds a certain level with respect to the area size of the display region 10*a*, the image changing section 250 may stop displaying the image on the display region. When, for example, a large part of the display region 10*a* is irradiated with highly intense external light, the image on the display region 10*a* becomes difficult to see entirely. When the image on the display region 10*a* becomes difficult to see entirely, the image changing section 250 stops displaying the image on the display region 10*a*, and therefore the viewer does not feel stressed. In addition, the power which would otherwise be consumed for the display device can be saved.

In this case, it is preferable that the image changing section 250 is connected to, for example, the power source 203. When the ratio of an area size of a part for which light receiving information a1 through d1 exceeding the reference value has been obtained exceeds a certain level with respect to the area size of the display region 10*a*, the image changing section 250 creates an operation stop signal 250*b*. The image changing section 250 may be structured to control the power source 203 by means of the operation stop signal 250*b* to stop the supply of the power to the liquid crystal panel control section 220, the backlight control section 240 and the like. With such an arrangement, when the ratio of an area size of a part for which light receiving information a1 through d1 exceeding the reference value has been obtained exceeds a certain level with respect to the area size of the display region 10*a*, the display of an image on the display region 10*a* can be stopped.

Figure 43:
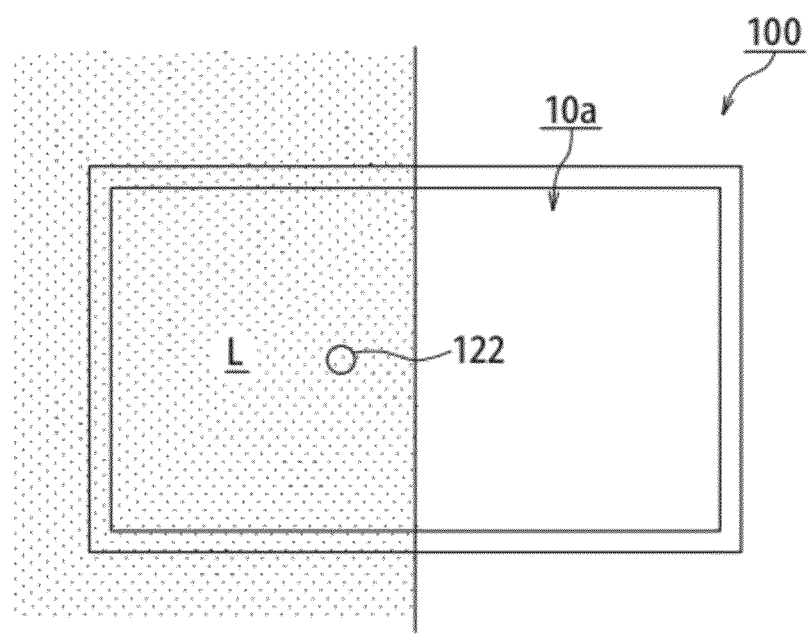
FIG. 43 is a front view of a liquid crystal panel.

In another embodiment, the image changing section 250 may stop displaying the image on the display region 10*a* when light receiving information a1 through d1 which represents external light of an intensity exceeding the predefined reference value is obtained for a central portion of the display region 10*a*. The central portion of the display region 10*a* easily comes into the sight of the viewer. Therefore, when the central portion of the display region 10*a* becomes difficult to see, it is likely to become difficult to grasp the content of the entirety of the displayed image. When the central portion of the display region 10*a* becomes difficult to see, the image changing section 250 can stop displaying the image on the display region 10*a*. Owing to this, the viewer does not feel stressed unlike in the case where an image difficult to see is displayed, and also the power source for driving the display device can be saved. In order to perform the above-described control, light receiving information on the central portion of the display region needs to be acquired. For this reason, it is preferable that as shown in FIG. 43, a first light receiving sensor 122 is located in the vicinity of the central portion of the display region 10*a*.

Hereinafter, still another embodiment of the control method carried out by the image changing section 250 will be described.

The image changing section 250 may, for example, find a difference between the light receiving information obtained by the first light receiving sensor 122 predefined as acting as a reference, among the first light receiving sensors 122, and the light receiving information obtained by the other first light receiving sensors 122. In this case, the image changing section 250 may change the image to be displayed on the display region 10*a* (image to be displayed) based on the difference in the light receiving information. With such an arrangement, the image changing section 250 can change the display image in the state where the luminance distribution of the external light directed to the areas A through D is accurately reflected. With such a structure, it is preferable that an appropriate level of brightness of the irradiation sections 22 for the difference is preset in the image changing section 250.

In another embodiment, a reference value for the difference in the light receiving information obtained by the first light receiving sensors 122 at predefined different timings may be set in the image changing section 250. In this case, the image changing section 250 finds the difference in the light receiving information obtained by the first light receiving sensors 122 at the predefined different timings. It is also preferable that when the difference exceeds the reference value, the image changing section 250 changes the image to be displayed. With such an arrangement, the image changing section 250 can change the image to be displayed in the state where the amount of over-time change of the light receiving information a1 through d1 obtained by the first light receiving sensors 122 is accurately reflected.

When, for example, a person passes in front of the liquid crystal display device, the external light directed to the display region 10*a* is temporarily blocked. In such a case, the light receiving information a1 through d1 obtained by the first light receiving sensors 122 may be temporarily changed significantly. A phenomenon may occur that the image changing section 250 changes the image to be displayed as described above based on the light receiving information a1 through d1 which has been temporarily changed significantly. If the image to be displayed is changed based on the light receiving information a1 through d1 which has been temporarily changed significantly, the image to be displayed keeps on changing rapidly. This may possibly cause a defect that the image flickers and also stress the viewer. In order to avoid such a phenomenon, the image changing section 250 may be structured to, for example, in the case where light receiving information a1 through d1 exceeding the reference value is obtained by the first light receiving sensors 122 continuously for a predefined time duration, change the image to be displayed based on the light receiving information a1 through d1. With such an arrangement, the image to be displayed is prevented from being changed when the light receiving information a1 through d1 obtained by the first light receiving sensors 122 is temporarily changed significantly, like when a person passes in front of the liquid crystal display device. With such a structure, it is preferable that the timing to adopt the light receiving information a1 through d1 obtained by the first light receiving sensors 122 is preset in the image changing section 250. According to the image changing section 250 having such a structure, even when the brightness of the external light is temporarily changed significantly, the image to be displayed is prevented from being changed unnecessarily.

In still another embodiment, the liquid crystal display device 100 may include a switching section for switching an image change mode, in which the image to be displayed on the display region 10*a* is changed by the image changing section 250, to an image non-change mode, in which the image change mode is not carried out, and vice versa.

In this case, the liquid crystal display device 100 may include a timer in which a time zone when the image change mode is to be carried out is set. In this case, the switching section may switch the image change mode to the image non-change mode or vice versa based on the time zone set in the timer.

In this case, it is preferable that, for example, the liquid crystal display device 100 includes the timer 292 in which the time zone when the image change mode is to be carried out is preset, and the switching section 290 switches the image change mode to the image non-change mode or vice versa based on the time zone set in the timer 292. With such an arrangement, the image change mode can be selected only in the time zone when the external light directed to the display region 10a is high or in a time zone when the intensity of the external light is liable to be changed. As a result, the control of changing the image to be displayed on the display region 10a can be performed. In the case where, for example, the liquid crystal display device 100 is located outdoors, a time zone when the liquid crystal display device 100 is irradiated with the sunlight strongly and thus the displayed image is difficult to see may be preset in the timer 292. In this case, the image is changed in the time zone when the liquid crystal display device 100 is irradiated with the sunlight strongly and thus the displayed image is difficult to see.

The switching section 290 may switch the image change mode to the image non-change mode or vice versa based on the light receiving information a1 through d1 obtained by the light receiving sensors for switching. In this case, the switching section 290 can select the image change mode when the intensity of the external light directed to the display region 10a is changing, and can select the image non-change mode when the intensity of the external light is not changing. As described above, as the light receiving sensors for switching, the first light receiving sensors 122 can be used.

In the case where the display area 10a1, in which the display region 10a is to be displayed, is set in a part of the display region 10a other than the part for which the light receiving information a1 through d1 exceeding the reference value has been obtained, it is preferable that the image changing section 250 turns on the irradiation sections 22 for irradiating the image display area 10a1 with illumination light and turns off the other irradiation sections 22. In this case, the irradiation sections 22 which do not irradiate the image display area 10a1 with illumination light are turned off, and therefore the driving power of the backlight unit 20 can be saved.

Figure 45:
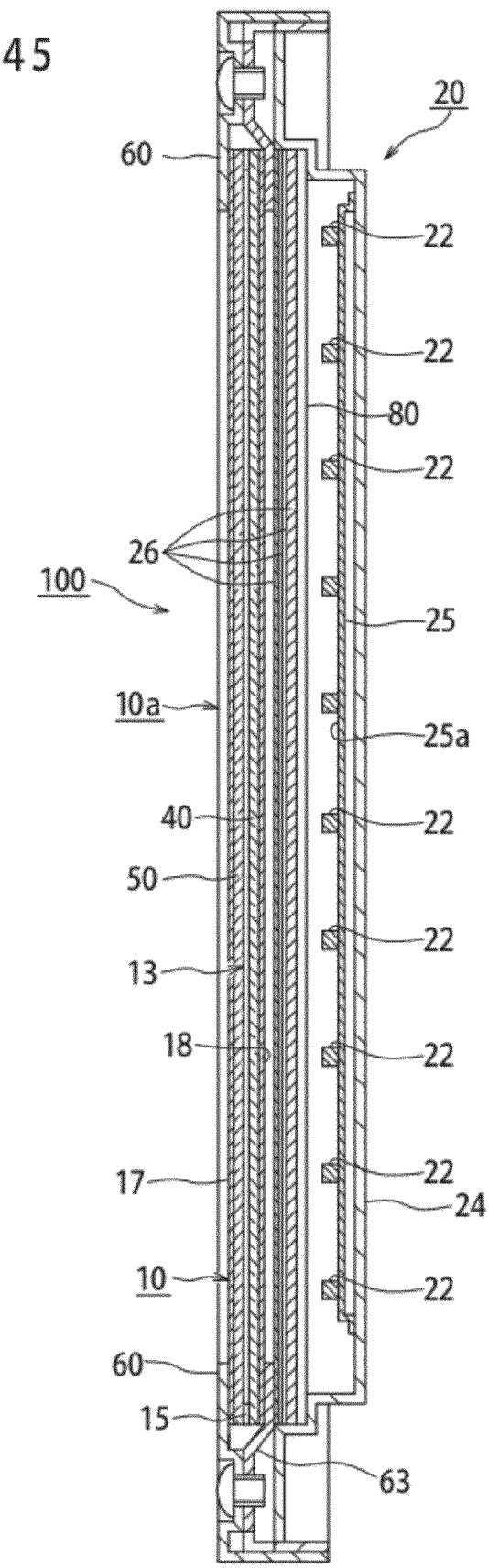
FIG. 45 is a cross-sectional view of a liquid crystal display device according to an embodiment of the present invention.

It is preferable that as shown in FIG. 45, this liquid crystal display device 100 includes an inner reflector plate 80 for reflecting the external light directed to the display region 10a, toward the rear surface of the liquid crystal panel 10. In this case, the external light reflected by the inner reflector plate 80 toward the rear surface of the liquid crystal panel 10 is used as light for displaying an image. Therefore, with the liquid crystal display device 100 including the inner reflector plate 80, even when a part of the irradiation sections 22 is turned off, a significant reduction of the luminance of the entire display region 10a can be prevented. When the image changing section 250 turns on the irradiation sections 22 for irradiating the image display area 10a1 with illumination light and turns off the other irradiation sections 22, the luminance of the border along the image display area 10a1 may be slightly reduced. In order to avoid this, the liquid crystal display device 100 including the inner reflector plate 80 can reflect the external light toward the rear surface of the liquid crystal panel 10 by means of the inner reflector plate 80. Therefore, a part of the external light reflected by the inner reflector plate 80 toward the rear surface of the liquid crystal panel 10 in the border along the image display area 10a1 is used as the light for displaying an image. For this reason, even in the case where the luminance of the border along the image display area 10a1 is reduced when the other irradiation sections 22 mentioned above are turned off, the influence of this reduction can be suppressed low.

It is preferable that the inner reflector plate 80 causes the illumination light emitted by the backlight unit 20 to be transmitted toward the liquid crystal panel 10, in addition to reflecting the external light directed to the display region 10a toward the rear surface of the liquid crystal panel 10. With such an arrangement, the illumination light emitted by the irradiation sections 22 can be directed to the rear surface of the liquid crystal panel 10, and also the external light directed to the display region 10a can be directed to the rear surface of the liquid crystal panel 10.

In the above-described examples, the liquid crystal display device 100 including the image changing section 250 has been described. The change of the image to be displayed by the image changing section 250 can be used for other display devices (e.g., organic EL display devices, plasma display panels, etc.) in addition to the liquid crystal display device 100.

The first light receiving sensors 122 for sending the light receiving information a1 through d1 to the image changing section 250 may be modified in various manners, like the first light receiving sensors 122 for sending the light receiving information a1 through d1 to the backlight control section 240.

EXAMPLE 9

Figure 46:
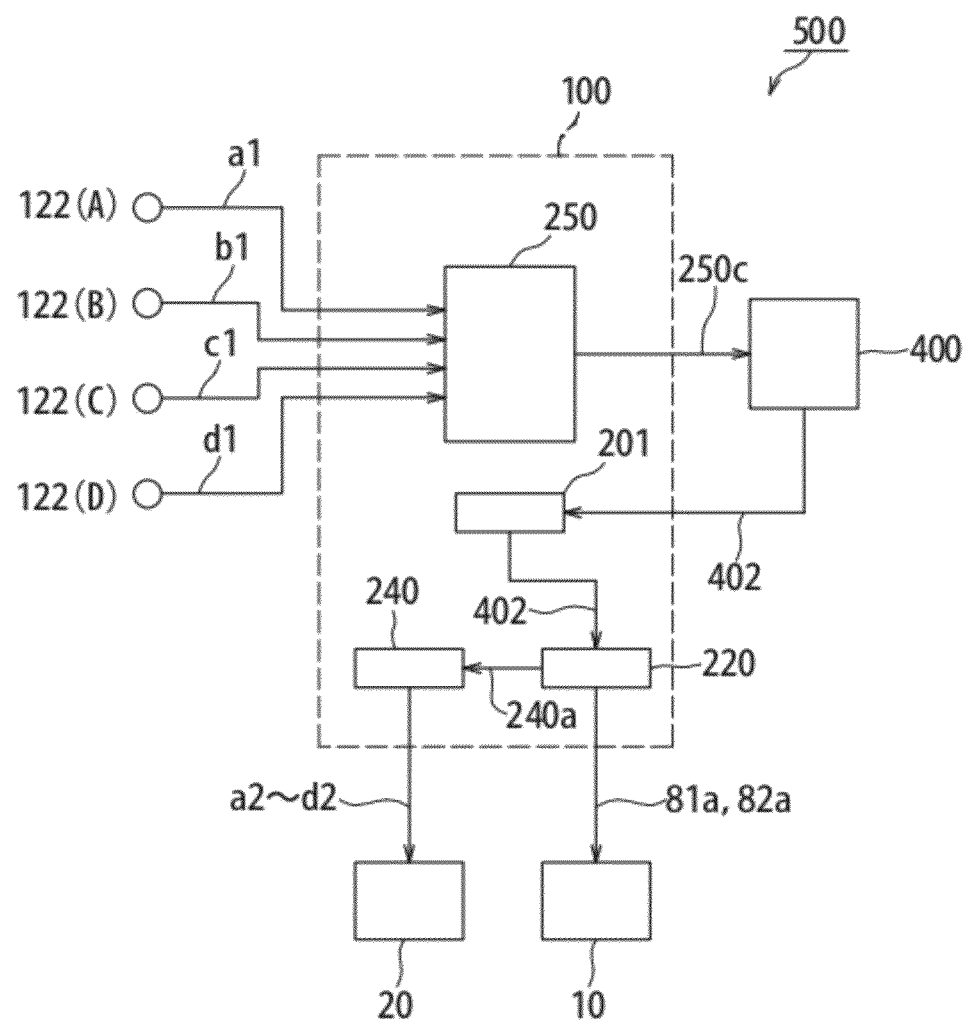
FIG. 46 is a block diagram schematically showing a liquid crystal display device according to an embodiment of the present invention.

In Example 8 described above, the liquid crystal display device 100 having the image changing section 250 built therein has been described. Now, in Example 9, an image display system 500 including a display device (e.g., liquid crystal display device 100), the image changing section 250 and an external processing device 400 will be described. FIG. 46 is a block diagram schematically showing the image display system 500.

The liquid crystal display device 100 included in the image display system 500 includes a display panel (liquid crystal panel) 10 having a plurality of pixels in a display region 10a. External light directed to the liquid crystal panel 10 is received at a plurality of positions in the display region 10a by light receiving sensors (first light receiving sensors 122). The external processing device 400 creates an image signal 402 for causing an image to be displayed on the display region 10a and sends the image signal 402 to the liquid crystal display device 100. As the external processing device 400, a PC including a computation unit such as a CPU or the like is usable, for example.

In the image changing section 250 of the image display system 500, a reference value is predefined for light receiving information a1 through d1 obtained by the first light receiving sensors 122. When light receiving information a1 through d1 exceeding the reference value is obtained by the first light receiving sensors 122, the image changing section 250 changes the image signal 402 to be created by the external processing device 400, based on the light receiving information a1 through d1.

According to the image display system, the image signal 402 to be created by the external processing device 400 is changed based on the light receiving information a1 through d1, and thus an image which is easy to see in consideration of the state of the external light can be displayed on the display region 10a. The image display system 500 is preferably usable for, for example, a digital signage system for displaying a video advertisement outdoors and the like.

Hereinafter, an example of the image display system 500 will be described. With the image display system 500, as shown in FIG. 46, the image changing section 250 is built in the liquid crystal display device 100. To the image changing section 250, the light receiving information a1 through d1 obtained by the first light receiving sensors 122 is input. When the light receiving information a1 through d1 exceeds the reference value defined in the image changing section 250, the image changing section 250 creates an image changing signal 250c based on the light receiving information a1 through d1. The image changing signal 250c is sent to the external processing device 400. Based on the image changing signal 250c, the external processing device 400 newly creates an image signal 402 in order to cause an image, easy to see in consideration of the state of the external light directed to the display region 10a, to be displayed on the display region 10a. The image signal 402 created by the external processing device 400 in this manner is sent to the liquid crystal display device 100 and is input to the liquid crystal panel control section 220 via the signal input section 201 of 100. The liquid crystal panel control section 220 controls the liquid crystal panel 10 based on the image signal 402. In this case, the image signal 402 is changed based on the light receiving information a1 through d1.

With the image display system 500, the image changing section 250 does not need to be built in the liquid crystal display device 100. The image changing section 250 may be built in, for example, the external processing device 400. In the case where the image display system 500 includes a device other than the liquid crystal display device 100 and the external processing device 400, the image changing section 250 may be built in such other device.

So far, the liquid crystal display device 100 including the image changing section 250 for changing an image to be displayed on the display region 10a in accordance with the light receiving information a1 through d1 obtained by the first light receiving sensors 122 has been described.

Figure 47:
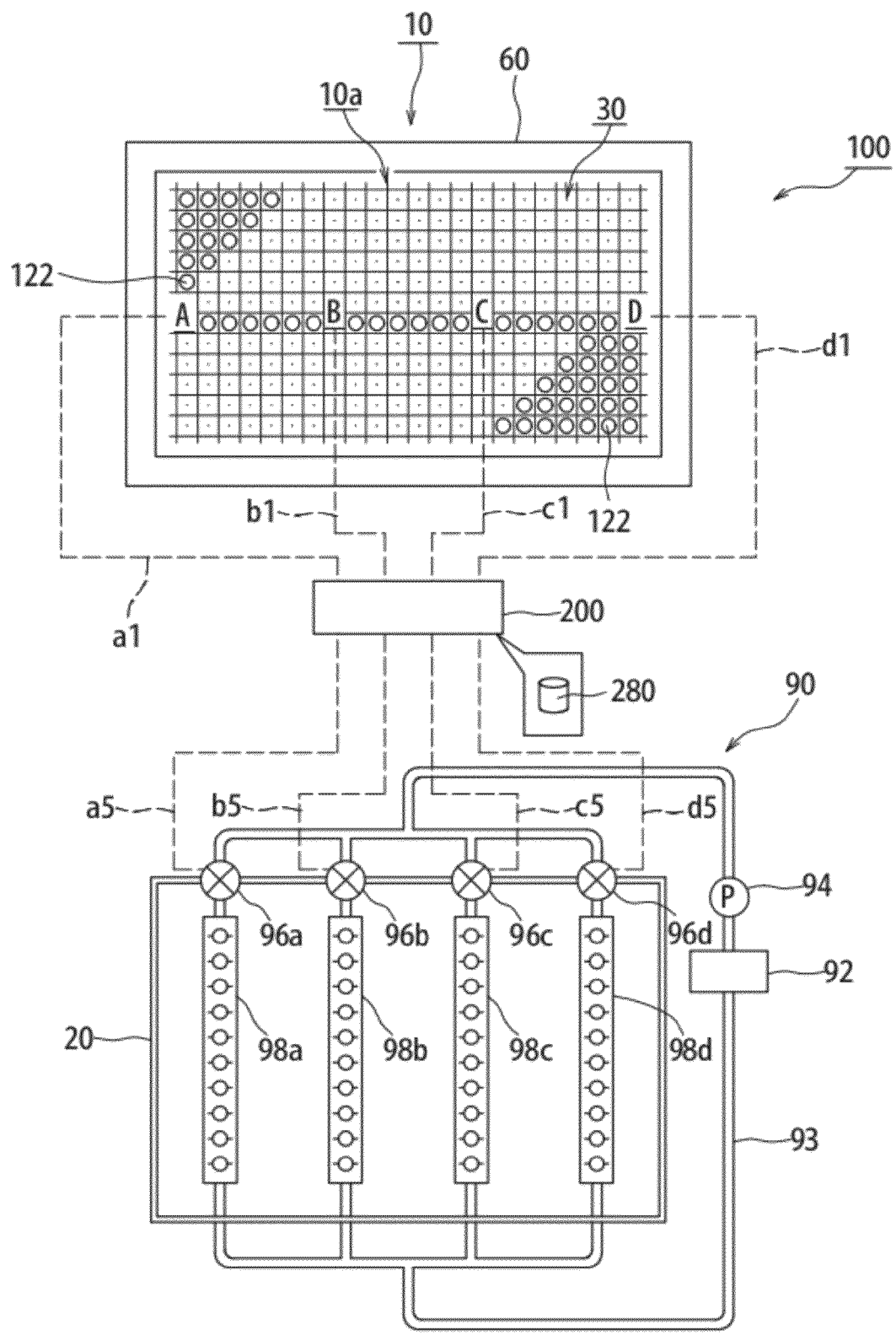
FIG. 47 is a block diagram schematically showing a liquid crystal display device according to an embodiment of the present invention.
Figure 48:
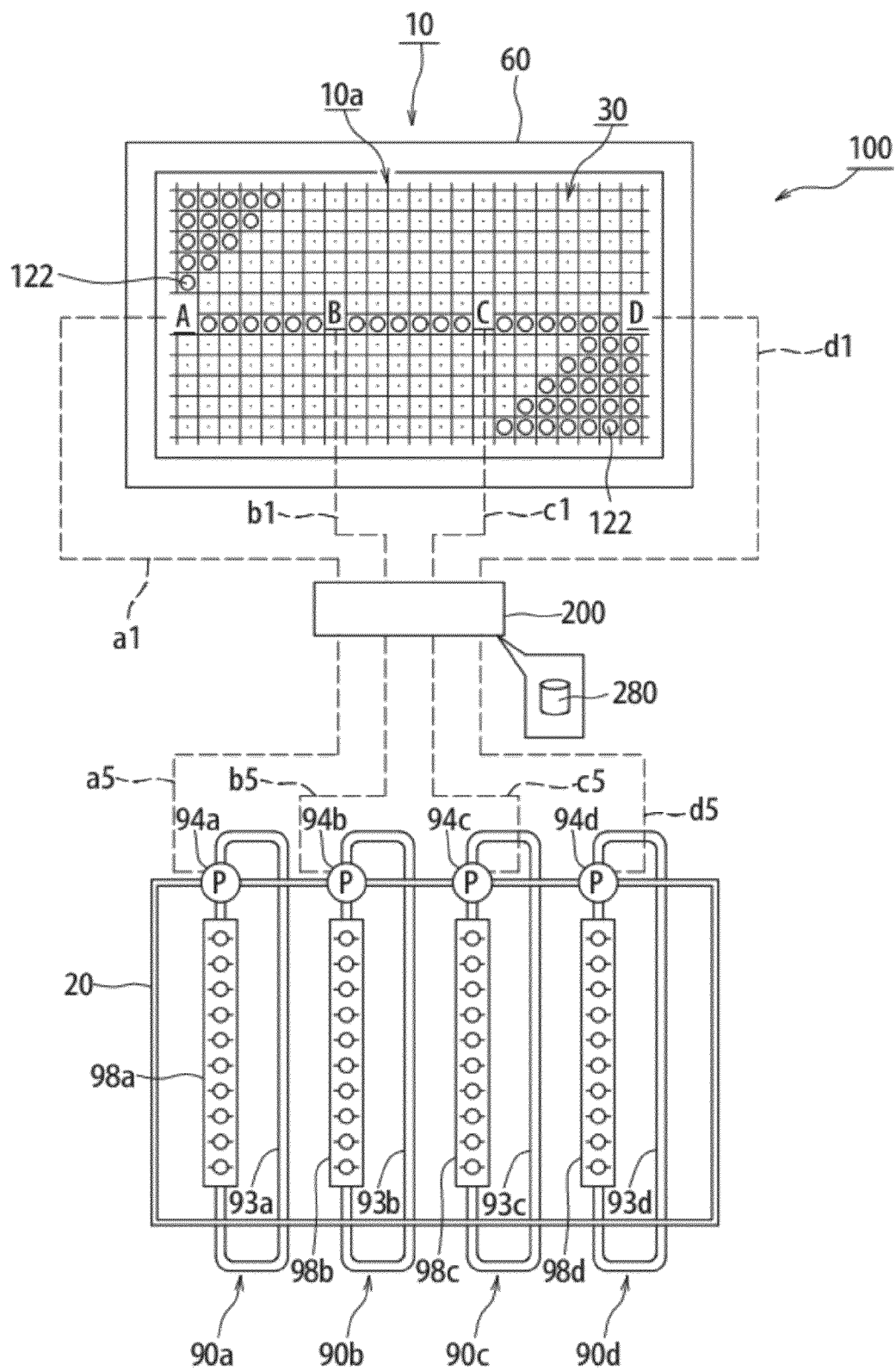
FIG. 48 is a block diagram schematically showing a liquid crystal display device according to an embodiment of the present invention.

Now, FIG. 47 and FIG. 48 each schematically show a liquid crystal display device 100 in other examples. The liquid crystal display device 100 shown in each of FIG. 47 and FIG. 48 includes a cooling control section 280 for controlling a cooling unit 90 (90a through 90d), based on the light receiving information a1 through d1 obtained by the first light receiving sensors 122, such that cooling is performed independently for each of the plurality of areas. FIG. 47 and FIG. 48 each show the positional relationship between the backlight unit 20 and the cooling unit 90 (90a through 90d).

EXAMPLE 10

This liquid crystal display device 100 includes the cooling unit 90 and the cooling control section 280. The cooling unit 90 cools the display region 10a independently for each of the plurality of areas obtained as a result of dividing the display region 10a. The cooling control section 280 controls the cooling unit 90 based on the light receiving information a1 through d1 obtained by the first light receiving sensors 122, such that the cooling is performed independently for each of the plurality of areas. According to this liquid crystal display device 100, any of the plurality of areas A through D obtained as a result of dividing the display region 10a can be selectively cooled in accordance with the intensity of the external light directed to the display region 10a. Therefore, even when the display region 10a is irradiated with highly intense external light and the temperature of a part thereof is raised, the part having such a raised temperature can be selectively cooled. Therefore, according to this liquid crystal display device 100, the light transmissivity of the liquid crystal panel 10 or the brightness of the irradiation sections 22 (see FIG. 45) of the backlight unit 20 can be prevented from being changed due to a partial temperature rise.

One application of a liquid crystal display device is an information display. An information display is generally located outdoors. Therefore, when the display region 10a is irradiated with highly intense external light, the temperature of the display region 10a is liable to be raised. This liquid crystal display device 100 can selectively cool the part in which the temperature is raised. Therefore, this liquid crystal display device 100 is especially preferably usable for an information display.

The responsiveness of the liquid crystal molecules in the liquid crystal layer 13 may be destabilized when being excessively cooled, as well as when being heated. Therefore, when the entirety of the liquid crystal panel 10 is equally cooled, the responsiveness of the liquid crystal molecules may be destabilized in a part of the liquid crystal panel 10, and as a result, disturbance may occur in the displayed image. When, for example, the entirety of the liquid crystal panel 10 is equally cooled while the temperature of a part of the liquid crystal panel 10 is raised, the responsiveness of a part of the liquid crystal molecules is destabilized. Therefore, disturbance may occur in the displayed image.

However, with this liquid crystal display device 100, the cooling unit 90 may be controlled based on the light receiving information a1 through d1 obtained by the first light receiving sensors 122. Therefore, excessive cooling on the liquid crystal panel 10 can be suppressed, and thus the disturbance of the displayed image can be prevented. When, for example, the temperature of a part of the liquid crystal panel 10 is raised, the part of the liquid crystal panel 10 in which the temperature is raised can be selectively cooled. Therefore, the displayed image can be prevented from being disturbed.

With this liquid crystal display device 100, the cooling unit 90 is driven when necessary. This contributes to alleviating the noise made by the driving noise of the cooling unit 90 or saving the power for driving the cooling unit 90.

Hereinafter, the liquid crystal display device 100 including the cooling unit 90 and the cooling control section 280 having such a structure will be described.

Like in the above-described embodiments, with this liquid crystal display device 100, the first light receiving sensors 122 may be located in a dispersed manner in the display region 10a. With such an arrangement, the first light receiving sensors 122 can obtain light receiving information on the external light directed to the display region 10a, at various sites of the display region 10a. In this case, the first light receiving sensors 122 may be respectively located in areas where the plurality of pixels 30 are located as seen in a plan view of the liquid crystal panel 10. With such an arrangement, the light receiving information a1 through d1 on the external light directed to the display region 10a can be obtained independently for each pixel.

With this liquid crystal display device 100, as shown in each of FIG. 47 and FIG. 48, the cooling unit 90 includes a tank 92, a transfer pump 94, and a plurality of cooling pipes 98. The tank 92 stores a cooling medium. The transfer pump 94 transfers the cooling medium stored in the tank 92. The plurality of cooling pipes 98a through 98d are respectively located for the plurality of areas A through D obtained as a result of dividing the display region 10a. To each of the plurality of cooling pipes 98a through 98d, the cooling medium is supplied by the transfer pump 94. The cooling unit 90 can cool the plurality of areas A through D obtained as a result of dividing the display region 10*a* by means of the cooling medium supplied to each of the plurality of cooling pipes 98*a* through 98*d*.

The cooling medium to be supplied to the cooling pipes 98*a* through 98*d* is preferably a liquid having a function of a cooling medium and is, for example, pure water, an antifreeze liquid (ethylene glycol, etc.) or the like. The cooling medium does not need to be a liquid and may be anything else having a function of a cooling medium, and is for example, cooled air.

Now, with reference to FIG. 47, an example of the cooling unit 90 will be described. The tank 92 and the transfer pump 94 are communicated to each other via a circulation-type pipe 93. The transfer pump 94 draws out the cooling medium from the tank 92 and causes the cooling medium to circulate in the pipe 93. The circulation-type pipe 93 is branched downstream the circulating pump 94, and the plurality of cooling pipes 98*a* through 98*d* are located downstream the branch position. In this embodiment, the cooling pipes 98*a* through 98*d* are located on the rear side of the irradiation sections 22 (see FIG. 45). Downstream the cooling pipes 98*a* through 98*d*, the branched portions of the pipe 93 are integrated together. The integrated pipe 93 is connected to the tank 92.

With this cooling unit 90, the cooling medium stored in the tank 92 is drawn out by the transfer pump 94 and supplied to the cooling pipes 98*a* through 98*d*. By means of the cooling medium supplied to the cooling pipes 98*a* through 98*d*, the cooling unit 90 cools the vicinity of the cooling pipes 98*a* through 98*d* respectively located for the areas A through D. The cooling medium supplied to the cooling pipes 98*a* through 98*d* is integrated into one pipe 93 and is recovered to the tank 92.

The cooling unit 90 shown in FIG. 47 includes a plurality of valves 96*a* through 96*d* for blocking the cooling medium from being supplied respectively to the plurality of cooling pipes 98*a* through 98*d*. In this embodiment, the valves 96*a* through 96*d* are connected to the cooling control section 280 via signal lines. The cooling control section 280 controls the plurality of valves 96*a* through 96*d* respectively based on the light receiving information a1 through d1 obtained by the first light receiving sensors 122, and thus adjusts the supply of the cooling medium to the plurality of cooling pipes 98*a* through 98*d*. With this liquid crystal display device 100, the cooling can be performed independently for each of the areas A through D by the adjustment of the supply of the cooling medium to the cooling pipes 98*a* through 98*d*.

Figure 58:
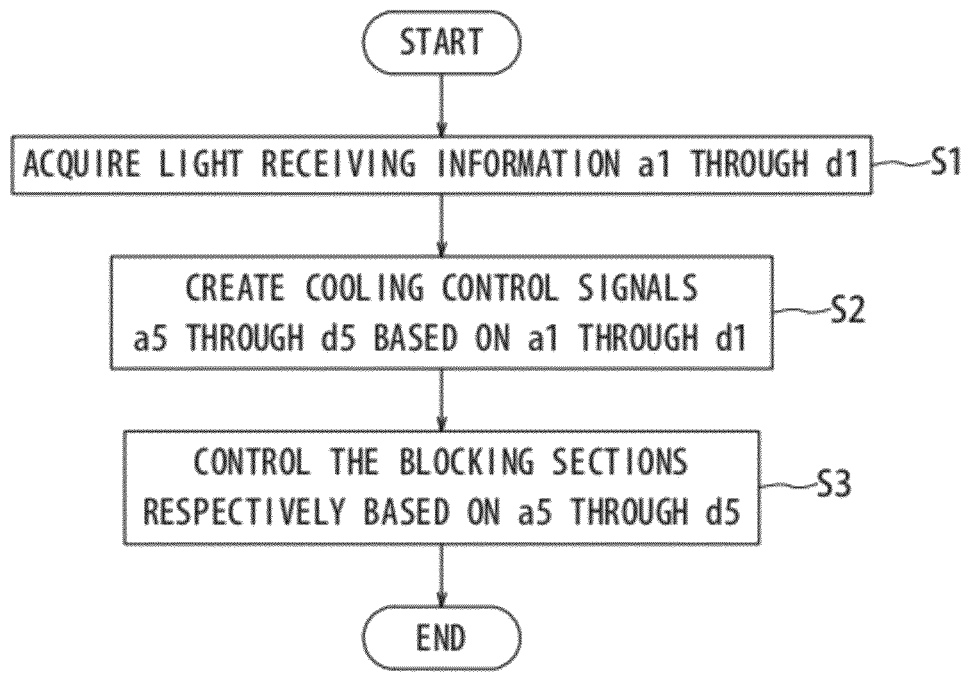
FIG. 58 schematically shows control performed by a cooling control section.

As shown in FIG. 47, the plurality of valves 96*a* through 96*d* may be, for example, located upstream the corresponding cooling pipes 98*a* through 98*d* in the flow path (pipe 93) of the cooling medium. In this case, the valves 96*a* through 96*d* are connected to the cooling control section 280 via signal lines. As shown in FIG. 58, the cooling control section 280 acquires the light receiving information a1 through d1 obtained by the first light receiving sensors 122 (S1). The cooling control section 280 creates cooling control signals a5 through d5 based on the light receiving information a1 through d1 (S2). The cooling control signals a5 through d5 are sent to the valves 96*a* through 96*d*. The valves 96*a* through 96*d* are independently opened or closed respectively based on the cooling control signals a5 through d5 (S3), and thus the supply of the cooling medium to the cooling pipes 98*a* through 98*d* located downstream the valves 96*a* through 96*d* is adjusted. In this manner, the liquid crystal display device 100 performs the cooling independently for the plurality of areas A through D, based on the light receiving information a1 through d1 obtained by the first light receiving sensors 122.

The cooling unit 90 only needs to be capable of cooling the plurality of areas A through D obtained as a result of dividing the display region 10*a*, and is not limited to having the above-described structure.

For example, as shown in FIG. 48, cooling units 90*a* through 90*d* for circulating the cooling medium independently from each other may be used as cooling units for the areas A through D obtained as a result of dividing the display region 10*a*. In this case, the cooling control section 280 controls the transfer pumps 94*a* through 94*d* of the cooling units 90*a* through 90*d* respectively based on the light receiving information a1 through d1 obtained by the first light receiving sensors 122, and thus adjusts the supply of the cooling medium to each of the cooling pipes 98*a* through 98*d*. In this case, the cooling units 90*a* through 90*d* do not include the valves 96*a* through 96*d* unlike in FIG. 47, but can selectively supply the cooling medium to the cooling pipes 98*a* through 98*d*.

The cooling unit is not limited to those described above.

Figure 49:
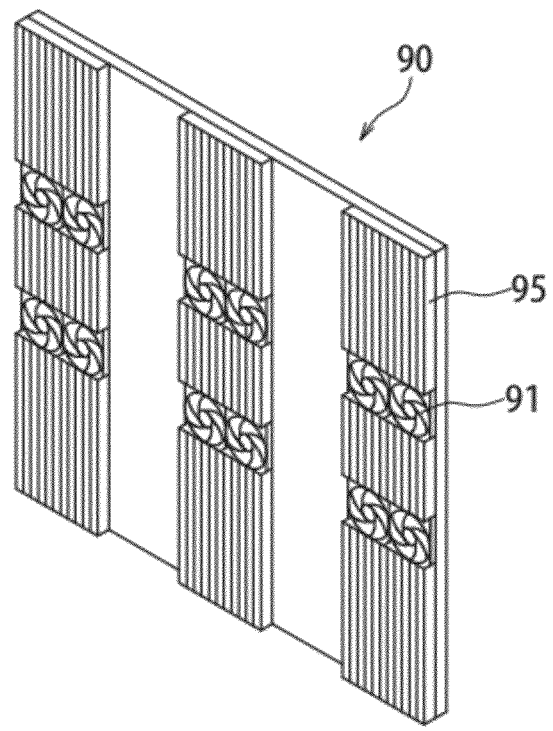
FIG. 49 is a solid figure showing an example of cooling unit.
Figure 50:
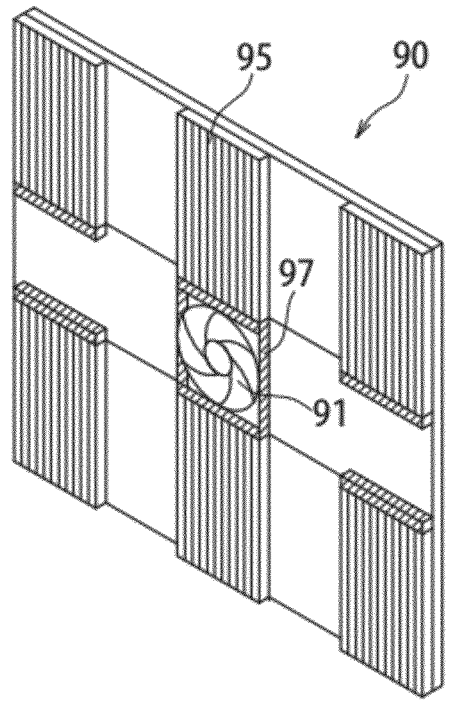
FIG. 50 is a solid figure showing an example of cooling unit.

In another embodiment, as shown in each of FIG. 49 and FIG. 50, the cooling unit 90 may include, for example, a cooling fan 91. The cooling fan 91 ventilates the inside of the liquid crystal display device 100. In the embodiment shown in each of FIG. 49 and FIG. 50, the cooling unit 90 further includes heat sinks 95 respectively located for a plurality of areas obtained as a result of dividing the display region 10*a*. The heat sinks 95 are communicated to the outside of the liquid crystal display device 100 via the cooling fan 91. In this embodiment, the liquid crystal display device 100 includes the cooling fan 91 for ventilating the inside thereof and the heat sinks 95 communicated to the outside thereof via the cooling fan 91. In this case, the cooling unit 90 drives the cooling fan 91 to discharge high-temperature air residing inside the heat sinks 95 to the outside of the liquid crystal display device 100, and thus performs the cooling. According to this liquid crystal display device 100, the heat sinks 95 are located respectively for the plurality of areas A through D obtained as a result of dividing the display region 10*a*. Therefore, the cooling can be performed independently for each of the plurality of areas A through D.

In this case, the cooling fan 91 and the heat sinks 95 may be located, for example, on the rear surface of the irradiation sections 22. The site at which the cooling fan 91 is provided may be opened to the outside of the liquid crystal display device 100. The heat sinks 95 are members having an inner void and may be structured such that the air residing in the inner void is discharged to the outside of the liquid crystal display device 100 when the cooling fan 91 is driven.

As shown in FIG. 49, for example, a plurality of cooling fans 91 may be provided respectively in correspondence with the heat sinks 95. In this case, the cooling control section 280 may activate the plurality of cooling fans 91 independently from each other to ventilate the inside of the heat sinks 95 independently from each other, based on the light receiving information obtained by the first light receiving sensors 122.

In this case, when the plurality of cooling fans 91 are independently activated, the air residing in the inner voids of the heat sinks 95 is independently ventilated. As described above, the heat sinks 95 are located for the areas A through D respectively. Therefore, by the independent ventilation of the heat sinks 95, the cooling is performed independently for each of the plurality of areas A through D obtained as a result of dividing the display region 10*a*. Owing to this, each of the plurality of areas A through D can be cooled more efficiently.

As shown in FIG. 50, the heat sinks 95 may each include an open/close section 97 for closing the inner void thereof from the cooling fan 91. In this case, the cooling control section 280 (see FIG. 47 or FIG. 48) controls the open/close sections 97 respectively based on the light receiving information a1 through d1 obtained by the first light receiving sensors 122, such that the inside of the heat sinks 95 is ventilated independently from each other. According to this liquid crystal display device 100, the open/close sections 97 are controlled based on the light receiving information a1 through d1 obtained by the first light receiving sensors 122, and as a result, the inside of the heat sinks 95 is ventilated independently from each other to perform the cooling independently for each of the areas A through D. With this liquid crystal display device 100, the open/close section 97 is opened or closed, and as a result, the inside of the heat sinks 95 is ventilated independently from each other. Therefore, it is not necessary to provide a plurality of cooling fans 91 by the number of the heat sinks 95. This contributes to decreasing the number of components of the liquid crystal display device 100 or to suppressing the noise caused when the cooling fans 91 are driven.

In the case where the liquid crystal display device 100 includes the liquid crystal panel control section 220 for controlling driving of each of the plurality of pixels 30, the cooling unit 90 may cool the liquid crystal panel control section 220 in addition to the plurality of areas obtained as a result of dividing the display region 10a. In this case, it is preferable that the cooling control section 280 controls the cooling unit 90 to perform the cooling in accordance with the driving state of the liquid crystal panel control section 220 (panel control section) in addition to performing the cooling independently for each of the areas, based on the light receiving information a1 through d1 obtained by the first light receiving sensors 122.

As described above, the liquid crystal panel control section 220 includes a CPU, a GPU, a chip set or the like. The CPU, the GPU, the chip set or the like generates heat when the pixels 30 are controlled to be driven. Therefore, when the pixels 30 are controlled to be driven, the temperature in the vicinity of the liquid crystal panel control section 220 may be raised. This temperature rise may possibly reduce the responsiveness of the liquid crystal molecules in a part of the liquid crystal layer 13 which is in the vicinity of the liquid crystal panel control section 220. According to this liquid crystal display device 100, the plurality of areas A through D obtained as a result of dividing the display region 10a are cooled, and also the vicinity of the liquid crystal panel control section 220 is cooled. Therefore, the reduction of the responsiveness of the liquid crystal molecules can be prevented.

When the liquid crystal panel control section 220 generates heat, the temperature of the liquid crystal panel control section 220 itself is raised. In this case, the control on the driving of the pixels 30 by the liquid crystal panel control section 220 is destabilized, which may possibly cause disturbance to the entirety of the displayed image. According to this liquid crystal display device 100, the liquid crystal panel control section 220 can be cooled, and thus the control on the driving of the pixels 30 can be stabilized.

The above-described control method carried out by the backlight control section 240 (see, for example, FIG. 2 and FIG. 9 through FIG. 16) is applicable to the control method carried out by the cooling control section 280. Hereinafter, the control method carried out by the cooling control section 280 will be described.

The liquid crystal display device 100 including the cooling control section 280 shown in each of FIG. 47 and FIG. 48 may include, for example, the second light receiving sensors 124 (see FIG. 30). As shown in FIG. 2 and FIG. 9 through FIG. 16, the second light receiving sensors 124, for example, receive the illumination light emitted by the backlight unit 20, at a plurality of positions in the display region 10a.

In this case, as shown in FIG. 47 or FIG. 48, the cooling control section 280 may control the cooling unit 90 based on the light receiving information a3 through d3 (see FIG. 31) on the illumination light obtained by the second light receiving sensors 124 in addition to based on the light receiving information a1 through d1 obtained by the first light receiving sensors 122. In this case, the cooling control section 280 can correct the control on the cooling unit 90 based on the light receiving information a3 through d3 obtained by the second light receiving sensors 124.

With the liquid crystal display device 100, the cooling control section 280 may control the cooling unit 90 based on a difference between the light receiving information a1 through d1 obtained by the first light receiving sensors 122 and the light receiving information a3 through d3 obtained by the second light receiving sensors 124. With such an arrangement, the cooling control section 280 can control the cooling unit 90 based on the correct light receiving information on the external light directed to the display region 10a in the state where the light receiving information a3 through d3 on the illumination light is excluded from the obtained light receiving information a1 through d1.

As shown in FIG. 31, the liquid crystal display device 100 including the second light receiving sensors 124 may include the error current calculation section 208. The error current calculation section 208 compares the light receiving information a3 through d3 obtained by the second light receiving sensors 124 at a plurality of predefined timings, and thus calculates error currents generated in the second light receiving sensors by an external factor other than the light. In this case, the cooling control section 280 controls the cooling unit 90 based on the error currents calculated by the error current calculation section 208 in addition to based on the light receiving information a1 through d1 obtained by the first light receiving sensors 122. In this manner, the cooling control section 280 can control the cooling unit 90 based on more accurate light receiving information in the state where the error currents caused by an external factor other than the light are excluded.

The illumination light emitted by the irradiation sections 22 of the backlight unit 20 may be changed when being cooled by the cooling unit 90. Therefore, the liquid crystal display device 100 including the second light receiving sensors 124 may include the backlight control section 240 for controlling the irradiation sections 22 respectively based on the light receiving information a3 through d3 on the illumination light. According to such a structure, the liquid crystal display device 100 can control the irradiation sections 22 based on the light receiving information a3 through d3 on the illumination light from the irradiation sections 22 which has been changed by the cooling and thus correct the brightness of the illumination light.

The liquid crystal display device 100 including the cooling control section 280 as shown in each of FIG. 47 and FIG. 48 may include the intermittent driving control section 205 (see FIG. 33), like the liquid crystal display device 100 including the backlight control section 240. As described above, the intermittent driving control section 205 switches the light-out period, in which the backlight unit 20 is off, to a light-up period, in which a backlight unit 20 is on, or vice versa alternately, such that there is the light-out period in a time duration in which an image is displayed on the display region 10a until being switched to another image.

With the liquid crystal display device 100 including the intermittent driving control section 205, the cooling control section 280 may control the cooling unit 90 based on the light receiving information a1 through d1 obtained by the first light receiving sensors 122 during the light-out period of the backlight unit 20. With such an arrangement, the cooling unit 90 can be controlled based on the light receiving information a1 through d1 on the external light directed to the display region 10a in the state where the illumination light is excluded from the light receiving information a1 through d1 obtained by the first light receiving sensors 122.

The cooling unit 90 may be controlled based on a difference between the light receiving information a1 through d1 obtained by the first light receiving sensors 122 during the light-up period of the backlight unit 20 and the light receiving information a3 through d3 (light receiving information on the illumination light) obtained by the first light receiving sensors 122 during the light-out period. It is preferable that with the liquid crystal display device 100 including the intermittent driving control section 205, the cooling control section 280 performs such control based on the light receiving information a1 through d1 obtained by the first light receiving sensors 122 during the light-up period of the backlight unit 20. With such an arrangement, the cooling control section 280 can control the cooling unit 90 based on the brightness of the illumination light emitted by the backlight unit 20.

The liquid crystal display device 100 including the intermittent driving control section 205 may further include the second light receiving sensors 124 (see FIG. 30 and FIG. 31) described above. In this case, the cooling control section 280 may control the cooling unit 90 based on the currents generated in the second light receiving sensors 124 during the light-out period of the backlight unit 20 in addition to based on the light receiving information a1 through d1 obtained by the first light receiving sensors 122. With such an arrangement, the cooling control section 280 can accurately control the cooling unit 90 in the state where the error caused by an external factor other than the light is excluded.

The liquid crystal display device 100 including the intermittent driving control section 205 may also include the backlight control section 240 for controlling the irradiation sections 22 respectively based on the light receiving information a3 through d3 on the illumination light. In this case, the liquid crystal display device 100 can control the irradiation sections 22 based on the light receiving information a3 through d3 on the illumination light from the irradiation sections 22 which has been changed by the cooling and thus correct the brightness of the illumination light, like the liquid crystal display device 100 including the second light receiving sensors 124.

The liquid crystal display device 100 including the cooling control section 280 having such a structure may include the third light receiving sensors 126 (see FIG. 32) described above, like the liquid crystal display device 100 including the backlight control section 240. The third light receiving sensors 126 are blocked from the external light directed to the display region 10a and the light generated from the liquid crystal display device 100 (e.g., illumination light). Owing to this, the third light receiving sensors 126 can detect the error currents generated by an external factor other than the light. In this case, the cooling control section 280 may control the cooling unit 90 based on the currents a3 through d3 generated in the third light receiving sensors 126 in addition to based on the light receiving information a1 through d1 obtained by the first light receiving sensors 122. With such an arrangement, the cooling control section 280 can accurately control the cooling unit 90 in the state where the error currents generated by an external factor other than the light are excluded.

The liquid crystal display device 100 including the cooling control section 280 may include the backlight control section 240 described above. In the backlight control section 240, a reference value is predefined for the light receiving information a1 through d1, obtained by the first light receiving sensors 122, respectively on the areas A through D. The backlight control section 240 compares the light receiving information a1 through d1 respectively on the areas A through D against the reference value, and thus controls each of the plurality of irradiation sections 22 such that any of the areas A through D for which light receiving information exceeding the reference value has been obtained is irradiated with illumination light brighter than the illumination light directed to the other areas. Such control can prevent the contrast from being reduced in a part of the displayed image, but is liable to disperse the temperature distribution of the display region 10a because the brightness of the illumination light emitted by the irradiation sections 22 is different area by area. According to this liquid crystal display device 100, the cooling unit 90 is controlled based on the light receiving information a1 through d1 obtained by the first light receiving sensors 122. Therefore, the part to be irradiated with brighter illumination light is cooled with priority. Owing to this, the brightness of the illumination light is adjusted independently for each of the areas, and thus the dispersion of the temperature distribution can be prevented.

The liquid crystal display device 100 for cooling the display region 10a independently for each of the plurality of areas may include the image changing section 250, in which a reference value is predefined for the light receiving information a1 through d1 obtained by the first light receiving sensors 122 as described above. For example, based on the light receiving information a1 through d1 obtained by the first light receiving sensors 122, the image changing section 250 may set the image display area 10a1, in which an image is to be displayed, in a part of the display region 10a other than the part for which the light receiving information a1 through d1 exceeding the reference value has been obtained. In this case, it is preferable that the cooling control section 280 controls the cooling unit 90 to stop cooling the part of the display region 10a in which the image is not displayed anymore as a result of the image to be displayed on the display region 10a being changed by the image changing section 250. In this case, the part in which no image is displayed is not cooled. Therefore, the power for cooling of the liquid crystal display device 100 can be saved, and also the noise caused when the cooling unit 90 is driven can be suppressed low. According to this liquid crystal display device 100, the part in which no image is displayed is not cooled. Therefore, the liquid crystal panel 10 can be prevented from being excessively cooled.

Under a predefined condition, the image changing section 250 may stop the driving performed by the liquid crystal display device in order to display an image on the display region 10a. Herein, the "predefined condition" is that, for example, the ratio of an area size of a part for which light receiving information a1 through d1 exceeding a certain threshold value has been obtained exceeds a certain level with respect to the area size of the display region 10a, or that external light of an intensity exceeding a certain threshold value is detected in the central portion of the display region 10a (see, for example, FIG. 42). In such a case, the image changing section 250 may stop the liquid crystal display device. In such a case, the display region is difficult to see entirely, and an area suitable to display an image is divided. Therefore, the image may not be displayed appropriately.

In such a case, it is preferable that the cooling unit 90 (see FIG. 47 or FIG. 48) stops cooling the part in which no image is displayed anymore as a result of the image to be displayed on the display region 10a being changed by the image changing section 250. With such an arrangement, the energy can be saved.

The liquid crystal display device 100 including the cooling unit 90 and the cooling control section 280 may use the mode switching performed by the switching section 290 described above. In this case, the switching section 290 switches a cooling mode to a non-cooling mode or vice versa. Herein, the "cooling mode" means a state where the cooling unit 90 is controlled based on the light receiving information a1 through d1 obtained by the first light receiving sensors 122. The "non-cooling mode" means a state where the cooling mode is not carried out.

It is preferable that this liquid crystal display device 100 includes, for example, the timer 292 in which a time zone when the cooling mode is to be carried out is preset. In this case, the switching section 290 switches the cooling mode to the non-cooling mode or vice versa based on the time zone preset in the timer 292. Owing to this, the cooling mode is selected only in the time zone when the external light directed to the display region 10a is high or in a time zone when the intensity of the external light is liable to be changed. Thus, the control of changing the image to be displayed on the display region 10a can be performed.

The liquid crystal display device 100 may include the light receiving sensors for switching, which receive the external light directed to the display region 10a at a plurality of positions in the display region 10a. As the light receiving sensors for switching, the first light receiving sensors 122 is usable, for example. In this case, the switching section 290 switches the cooling mode to the non-cooling mode or vice versa based on the light receiving information a1 through d1 obtained by the light receiving sensors for switching. Owing to this, the switching section 290 can select the cooling mode when the intensity of the external light directed to the display region 10a is high, and can select the non-cooling mode when the intensity of the external light is low. As described above, as the light receiving sensors for switching, the first light receiving sensors 122 can be used.

The cooling control section 280 may control the cooling unit 90 in the case where, for example, light receiving information exceeding the reference value is obtained by the first light receiving sensors 122 continuously for a predefined time duration. There are cases where the external light directed to the display region 10a is temporarily blocked by, for example, a person passing in front of the liquid crystal display device, and as a result, the light receiving information a1 through d1 obtained by the first light receiving sensors 122 is temporarily changed. In such a case, the cooling control section 280 prevents the cooling unit 90 from being driven and thus can prevent excessive cooling.

In this example, the liquid crystal display device 100 including the liquid crystal panel 10 as the display panel and also including the backlight unit 20 having the irradiation sections 22 for irradiating the rear surface of the liquid crystal panel 10 with light has been described. The cooling unit 90 included in this liquid crystal display device 100 cools the liquid crystal panel 10 and the backlight unit 20 independently for the plurality of areas A through D obtained as a result of dividing the display region 10a. Such area-by-area cooling performed by the cooling control section 280 is usable for other display devices (e.g., organic EL display devices, plasma display panels, etc.) and the like in addition to the liquid crystal display device 100.

The first light receiving sensors 122 for sending the light receiving information a1 through d1 to the cooling control section 280 may be modified in various manners, like the first light receiving sensors 122 for sending the light receiving information a1 through d1 to the backlight control section 240 described above.

So far, the liquid crystal display device 100 has been described as an example of display device according to one embodiment of the present invention.

The liquid crystal display device 100 described above is usable for a TV receiver. In this case, the liquid crystal display device 100 includes a broadcast receiving section 201a for receiving TV broadcast. The broadcast receiving section 201a receives TV broadcast and outputs a video signal. In this case, the control section 200 displays TV video (image) on the display region 10a based on the video signal of the TV broadcast which is output from the broadcast receiving section 201a. As shown in FIG. 4, the control section 200 may be structured to have the broadcast receiving section 201a as a part of the signal input section 201 and to display an image based on the TV broadcast received by the broadcast receiving section 201a. With such an arrangement, the control section 200 for performing control based on the TV broadcast controls the liquid crystal panel 10 and the backlight unit 20 to display the TV video on the display region 10a.

Figure 51:
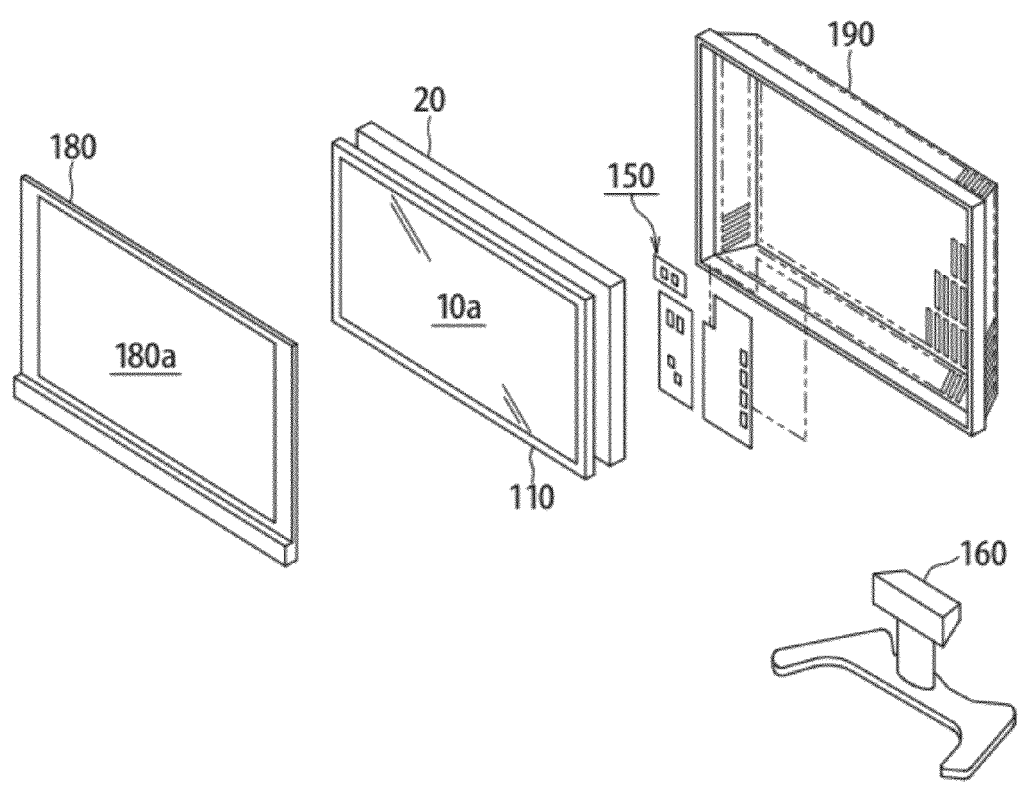
FIG. 51 is an exploded view of a TV receiver using a liquid crystal display device according to an embodiment of the present invention.

For using the liquid crystal display device 100 having such a structure as a TV receiver, it is preferable, for example, as shown in FIG. 51, the liquid crystal display device 100 is held, like being wrapped, by a first housing 180 and a second housing 190. The first housing 180 has an opening 180a corresponding to the display region 10a. The second housing 190 covers the rear surface of the liquid crystal display device 100, and includes an operation circuit 150 for operating the liquid crystal display device 100. To the second housing 190, a supporting member 160 for supporting the liquid crystal display device 100 is attached. The application of the liquid crystal display device 100 according to this embodiment of the present invention is not limited to a TV receiver, and the liquid crystal display device 100 is applicable to any image display device which uses an image sent from any of various video devices, as video information.

Figure 52:
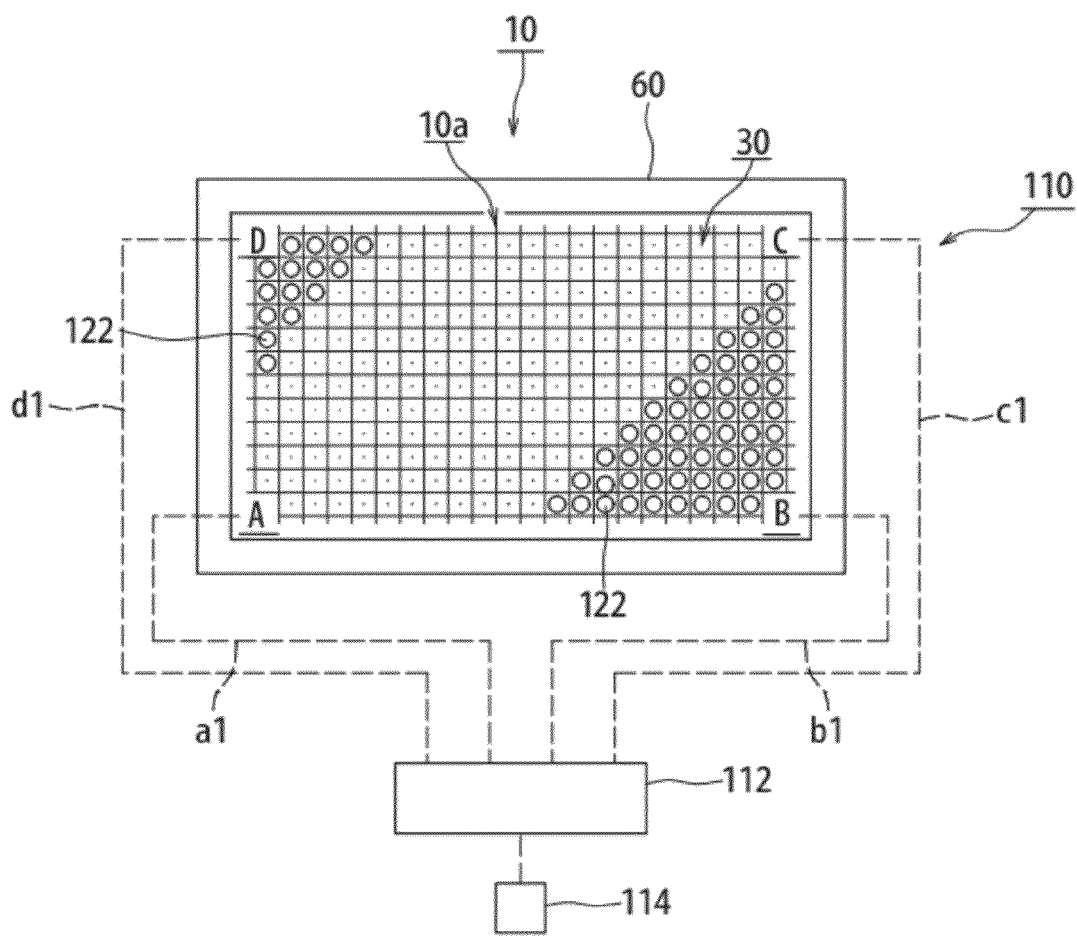
FIG. 52 is a block diagram schematically showing a liquid crystal module.

During the production of the liquid crystal display device 100 described above, a liquid crystal module 110 is produced. As shown in FIG. 52, the liquid crystal module 110 includes the liquid crystal panel 10, the first light receiving sensors 122, a computation section 112, and an output terminal 114. As described above, the liquid crystal panel 10 has a plurality of pixels 30 located in the display region 10a. The first light receiving sensors 122 receive the external light directed to the liquid crystal panel 10, at a plurality of positions. The computation section 112 creates a signal for adjusting the illumination light directed to the display region 10a, independently for each of the plurality of areas A through D obtained as a result of dividing the display region 10a, based on the light receiving information a1 through d1 obtained by the first light receiving sensors. The output terminal 114 outputs the signal created by the computation section 112. The computation section 112 performs prescribed processing in accordance with a program based on the light receiving information a1 through d1 obtained by the first light receiving sensors 122. The computation section 112 can change the signal to be created when the program is changed.

When this liquid crystal module 110 is used, the production of various types of liquid crystal display devices which perform prescribed processing based on the light receiving information a1 through d1 obtained by the first light receiving sensors 122 is made easy. For example, a liquid crystal display device for controlling the irradiation sections 22, a liquid crystal display device for changing the image to be displayed on the display region 10a, a liquid crystal display device for performing cooling independently for each of the areas obtained as a result of dividing the display region 10a, based on the light receiving information a1 through d1 obtained by the first light receiving sensors 122, can be easily produced. When, for example, the output terminal 114 is connected to a control device (e.g., backlight control section 240) for controlling the brightness of the illumination light emitted by an external illumination device such as the backlight unit 20, the external illumination device can be controlled based on the signal created by the computation section 112. In this case, the external illumination device adjusts the illumination light directed to the liquid crystal module 110 independently for each of the plurality of areas, based on the light receiving information a1 through d1 obtained by the first light receiving sensors 122.

When the output terminal 114 is connected to the image changing section 250, the liquid crystal module 110 including the image changing section 250 (see FIG. 38 or FIG. 46) may be produced. In this case, in the image changing section 250, a reference value is predefined for the light receiving information a1 through d1 obtained by the first light receiving sensors 122. When light receiving information exceeding the reference value is obtained by the first light receiving sensors 122, the liquid crystal panel 10 is controlled based on the light receiving information a1 through d1 and thus the image to be displayed on the display region 10a is changed.

When the output terminal 114 is connected to the cooling control section 280 (see FIG. 47 or FIG. 48), the liquid crystal module 110 including the cooling unit 90 or cooling units 90a through 90d (see FIG. 47 or FIG. 48) and the cooling control section 280 may be produced. In this case, the cooling unit 90 or cooling units 90a through 90d cool the liquid crystal panel 10, independently for each of the plurality of areas A through D obtained as a result of dividing the display region 10a. The cooling control section 280 controls the cooling unit 90 or cooling units 90a through 90d to perform the cooling independently for each of the areas A through D, based on the light receiving information a1 through d1 obtained by the first light receiving sensors 122.

During the production of the liquid crystal display device 100, the liquid crystal panel 10 including the first light receiving sensors 122 can be produced. The liquid crystal panel 10 including the first light receiving sensors 122 includes the plurality of pixels 30 in the display region 10a. The first light receiving sensors 122 are located so as to receive the external light directed to the display region 10a, at a plurality of positions in the display region 10a. The liquid crystal panel 10 including the first light receiving sensors 122 can check the dispersion of the apparent luminance distribution caused in the display region due to the influence of the external light directed to the display region 10a. When this liquid crystal panel 10 including the first light receiving sensors 122 is used, the liquid crystal display device 100 for controlling the irradiation sections 22 respectively based on the light receiving information a1 through d1 obtained by the first light receiving sensors 122 can be produced. By use of the liquid crystal panel 10, the liquid crystal display device 100 including the image changing section 250 (see FIG. 38 or FIG. 46) or the cooling control section 280 (see FIG. 47 or FIG. 48) can be produced.

Figure 53:
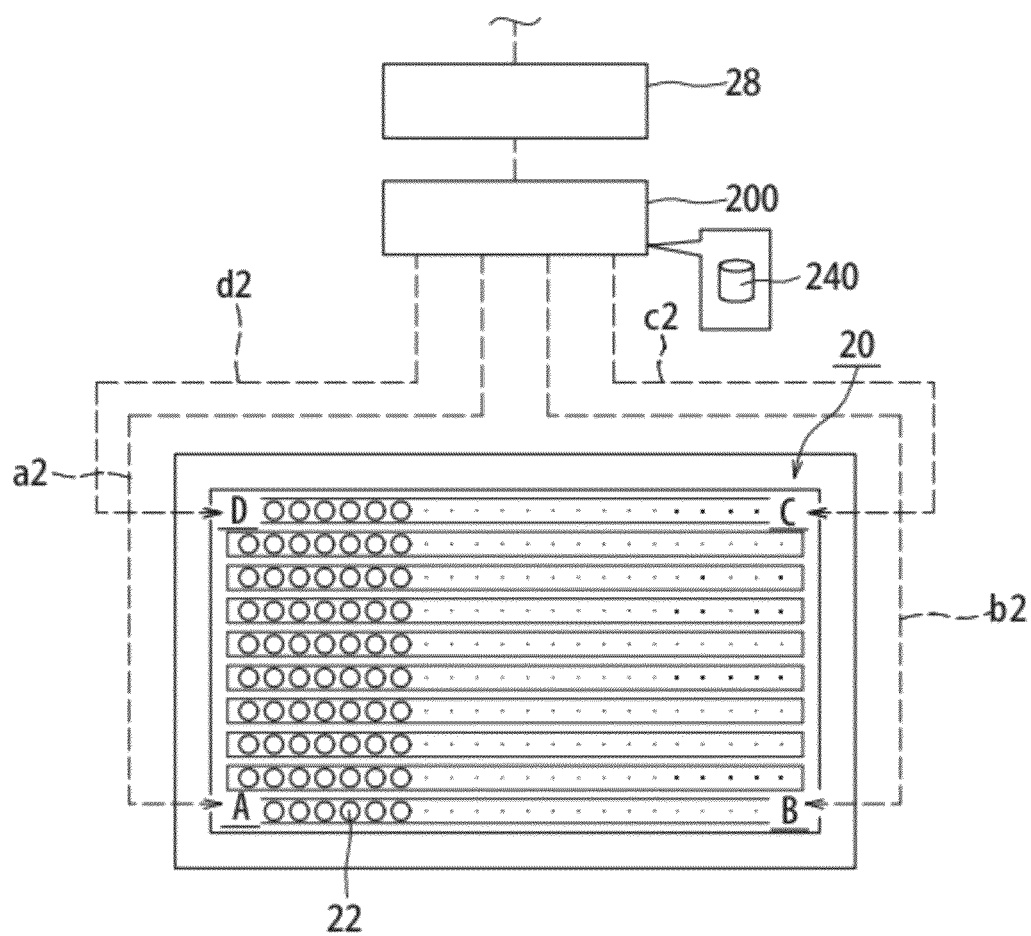
FIG. 53 is a block diagram schematically showing a backlight unit.

During the production of the liquid crystal display device 100, as shown in FIG. 53, the backlight unit 20 (backlight unit for a liquid crystal display device) may be produced. The backlight unit 20 (backlight unit for a liquid crystal display device) is located so as to face the rear surface of the liquid crystal panel 10. As shown in FIG. 53, the backlight unit 20 includes the plurality of irradiation sections 22, the input terminal 28, and the backlight control section 240. The plurality of irradiation sections 22 irradiate the rear surface of the liquid crystal panel 10 with illumination light. To the input terminal 28, the light receiving information a1 through d1 obtained by the light receiving sensors is input. The backlight control section 240 controls the irradiation sections 22 respectively based on the light receiving information a1 through d1 input from the input terminal 28, such that the brightness of the illumination light is adjusted part by part. It is preferable that the input terminal 28 of the backlight unit 20 (backlight unit for a liquid crystal display device) is connected to, for example, the output terminal 114 of the liquid crystal module 110 described above (see FIG. 52). With such an arrangement, the light receiving information a1 through d1 obtained by the first light receiving sensors 122 is input to the input terminal 28 via the output terminal 114 of the liquid crystal module 110 (see FIG. 52). According to the backlight unit 20 (backlight unit for a liquid crystal display device), the liquid crystal display device 100 for controlling the irradiation sections 22 respectively based on such light receiving information a1 through d1 can be produced.

The backlight unit 20 (backlight unit for a liquid crystal display device) including the image changing section 250 (see FIG. 38 or FIG. 46) can be produced. In this case, in the image changing section 250, a reference value is predefined for the light receiving information a1 through d1 obtained by the first light receiving sensors 122. When light receiving information a1 through d1 exceeding the reference value is obtained by the first light receiving sensors 122, the irradiation sections 22 are controlled based on the light receiving information a1 through d1.

The backlight unit 20 (backlight unit for a liquid crystal display device) including the cooling control section 280 (see FIG. 47 or FIG. 48) and the cooling unit 90 can be produced. In this case, the cooling unit 90 is controlled to cool the irradiation sections 22 independently for each of the plurality of areas A through D obtained as a result of dividing the display region 10a, based on the light receiving information a1 through d1 obtained by the first light receiving sensors 122.

So far, various examples of the liquid crystal display device 100 have been described. Elements of the examples can be appropriately combined together. In the above embodiment, the liquid crystal display device is mainly shown. Unless otherwise specified, the present invention is not limited to a liquid crystal display device, and is applicable to any of various display devices. Such display devices include, for example, organic EL display devices, plasma display panels and the like, in addition to liquid crystal display devices.

It is preferable that as shown in FIG. 54 through FIG. 57, a method for controlling the display panel (liquid crystal panel 10) having a plurality of pixels located in the display region includes a first step (S1) and a second step (S2) described below.

First step (S1): acquiring light receiving information (a1 through d1) on the external light directed to the display panel (liquid crystal panel 10), at a plurality of positions in the display region (10a)

Second step (S2): when light receiving information exceeding a predefined reference value is obtained in the first step (S1), changing the image to be displayed on the display region (10a) based on the light receiving information (a1 through d1)

As shown in FIG. 47, the display device (liquid crystal display device 100) includes, for example, a display panel (liquid crystal panel 10) having a plurality of pixels located in the display region (10a) and a cooling unit (90) for performing cooling independently for each of the plurality of areas (A through D) obtained as a result of dividing the display region (10*a*). It is preferable that a method for controlling such a display device (liquid crystal display device 100) includes, for example, a first step (S1) and a second step (S2) as shown in FIG. 58.

First step (S1): acquiring light receiving information (a1 through d1) on the external light directed to the display panel (liquid crystal panel 10), at a plurality of positions in the display region (10*a*)

Second step (S2): controlling the cooling unit (90) to perform cooling independently for each of the plurality of areas (A through D) obtained as a result of dividing the display region (a through d), based on the light receiving information (a through d) obtained in the first step (S1)

DESCRIPTION OF REFERENCE CHARACTERS

10 Liquid crystal panel
10*a* Display region
10*a*1 Image display area
13 Liquid crystal layer
15 Seal
16 Spacer
17 Polarizing plate
20 Backlight unit
22 Irradiation section
22*a* Point light source (light emitting diode)
22*b* Linear light source (cathode fluorescent lamp)
22*c*1 Waveguide plate
22*c*2 Light source
24 Backlight chassis
25 Reflector plate
25*a* Surface
26 Optical sheet
28 Input terminal
30 Pixel
40 Array substrate
41 Glass plate
42 Pixel electrode
42*a* Electrode
43 Bus line (data signal line)
44 Flattening layer
46 Alignment film
47 Thin film transistor
47*a* Gate electrode
47*b* Source electrode
47*c* Drain electrode
48 Scanning signal line
50 Color filter substrate
51 Glass plate
52 Black matrix
53 Coloring layer
54 Flattening layer
55 Counter electrode
56 Alignment film
60 Bezel
61 Electrode
62 Storage capacitance line
63 Frame
80 Inner reflector plate
81 Gate driver
82 Source driver
81*a*, 82*a* Liquid crystal panel control signal
90 Cooling unit
91 Cooling fin
92 Tank
93 Pipe
94 Circulating pump
95 Heat sink
96 Cooling valve
97 Blocking section
98 Cooling pipe
100 Liquid crystal display device
110 Liquid crystal module
112 Computation section
114 Output terminal
120 Light receiving sensor supporting member
122 First light receiving sensor
124 Second light receiving sensor
126 Third light receiving sensor
128 Light blocking member
130 Electricity storage section
132 Electric circuit
134 Multiplexer
150 Operation circuit
160 Supporting member
170 Temperature sensor
180 First housing
190 Second housing
200 Control section
201 Signal input section
201*a* Broadcast receiving section
203 Power source
205 Intermittent driving control section
206 Power input section
220 Liquid crystal panel control section
222 Timing controller
240 Backlight control section
242 Power input section
250 Image changing section
280 Cooling control section
290 Switching section
292 Timer
294 Switching control section
300 External system
302 Image signal
$C_{CS}$ Storage capacitance
$C_{LC}$ Capacitor

The invention claimed is:

1. A display device, comprising:
a display panel having a plurality of pixels located in a display region thereof;
first light receiving sensors for receiving external light directed to the display panel, at a plurality of positions in the display region; and
an image changing section having a reference value predefined therein for light receiving information obtained by the first light receiving sensors, wherein when light receiving information exceeding the reference value is obtained by the first light receiving sensors, the image changing section changes an image to be displayed on the display region, based on the light receiving information,
wherein based on the light receiving information obtained by the first light receiving sensors, the image changing section sets an image display area where an image is to be displayed, in a part of the display region other than a part for which light receiving information exceeding the reference value has been obtained.

2. The display device of claim 1, wherein the image changing section changes a size of the image to be displayed in accordance with the image display area which is set in the part of the display region other than the part for which the light receiving information exceeding the reference value has been obtained.

3. The display device of claim 1, wherein:
the image changing section has a plurality of image signals input thereto, which include a partial image signal representing a partial display image to be displayed on a part of the display region; and
the image changing section adopts the partial image signal as a signal for causing an image to be displayed on the image display area, based on the size of the image display area, and displays the partial display image on the display region.

4. The display device of claim 1, wherein when the light receiving information exceeding the reference value is obtained by the first light receiving sensors, the image changing section changes the image to be displayed on the display region to a prepared image.

5. The display device of claim 1, wherein when a ratio of an area size of the part for which the light receiving information exceeding the reference value has been obtained exceeds a certain level with respect to the area size of the display region, the image changing section stops displaying an image on the display region.

6. The display device of claim 1, wherein when light receiving information on external light of an intensity exceeding the predefined reference value is obtained for a central portion of the display region, the image changing section stops displaying an image on the display region.

7. The display device of claim 1, wherein the image changing section finds a difference between light receiving information obtained by the first light receiving sensor predefined as acting as a reference, among the first light receiving sensors, and light receiving information obtained by the other first light receiving sensors, and changes the image to be displayed on the display region based on the difference in the light receiving information.

8. A liquid crystal display device comprising:
a liquid crystal panel having a plurality of pixels located in a display region thereof;
a backlight unit including irradiation sections for irradiating a rear surface of the liquid crystal panel with illumination light;
first light receiving sensors for receiving external light directed to the liquid display panel, at a plurality of positions in the display region; and
an image changing section having a reference value predefined therein for light receiving information obtained by the first light receiving sensors, wherein when light receiving information exceeding the reference value is obtained by the first light receiving sensors, the image changing section changes an image to be displayed on the display region, based on the light receiving information,
wherein based on the light receiving information obtained by the first light receiving sensors, the image changing section sets an image display area where an image is to be displayed, in a part of the display region other than a part for which light receiving information exceeding the reference value has been obtained,
wherein the image changing section has a reference value predefined therein for light receiving information obtained by the first light receiving sensors, wherein when light receiving information exceeding the reference value is obtained by the first light receiving sensors, the image changing section controls the liquid crystal panel and/or the backlight unit based on the light receiving information, to change an image to be displayed on the display region.

9. The liquid crystal display device of claim 8, wherein:
the backlight unit includes a plurality of irradiation sections for irradiating a rear surface of the liquid crystal panel with light; and
based on the light receiving information obtained by the first light receiving sensors, the image changing section sets an image display area where an image is to be displayed, in a part of the display region other than a part for which light receiving information exceeding the reference value has been obtained, and turns on the irradiation sections for irradiating the image display area with illumination light and turns off the other irradiation sections.

* * * * *